United States Patent
Meswani et al.

(10) Patent No.: US 11,822,926 B2
(45) Date of Patent: Nov. 21, 2023

(54) DEVICE LINK MANAGEMENT

(71) Applicant: Nvidia Corporation, Santa Clara, CA (US)

(72) Inventors: Mitesh Meswani, Austin, TX (US); Kapil Dev, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/570,586

(22) Filed: Sep. 13, 2019

(65) Prior Publication Data
US 2021/0081209 A1 Mar. 18, 2021

(51) Int. Cl.
| | | |
|---|---|---|
| *G06T 1/20* | (2006.01) | |
| *G06F 9/38* | (2018.01) | |
| *G06F 9/48* | (2006.01) | |
| *G06F 9/50* | (2006.01) | |
| *G06N 3/08* | (2023.01) | |

(52) U.S. Cl.
CPC .......... *G06F 9/3877* (2013.01); *G06F 9/4881* (2013.01); *G06F 9/5027* (2013.01); *G06N 3/08* (2013.01)

(58) Field of Classification Search
CPC ..... G06F 13/4022; G06F 9/5083; G06T 1/20; G09G 2330/021; G09G 2360/08; G09G 5/363
See application file for complete search history.

(56) References Cited

U.S. PATENT DOCUMENTS

| | | | |
|---|---|---|---|
| 2008/0307240 A1 | 12/2008 | Dahan | |
| 2017/0031430 A1* | 2/2017 | Ansorregui | G06F 1/3206 |
| 2017/0269666 A1 | 9/2017 | Patil | |
| 2018/0307295 A1* | 10/2018 | Tameem | G06F 1/3296 |

FOREIGN PATENT DOCUMENTS

| | | |
|---|---|---|
| CN | 107515663 | 12/2017 |
| EP | 3220231 | 9/2017 |
| GB | 2540804 | 2/2017 |
| WO | 2018/013023 | 1/2018 |

OTHER PUBLICATIONS

International Search Report and Written Opinion issued in PCT Application No. PCT/US20/48036 dated Dec. 18, 2020.
Brihi A et al: "Dynamic Voltage and Frequency Scaling in Multimedia Servers", 2014 IEEE 28th International Conference on Advanced Information Networking and Applications, IEEE, Mar. 25, 2013 (Mar. 25, 2013), pp. 374-380, XP032678529, ISSN: 1550-445X, DOI: 10.1109/AINA.2013.136 [retrieved on Jun. 13, 2013] the whole document.

* cited by examiner

*Primary Examiner* — Hau H Nguyen
(74) *Attorney, Agent, or Firm* — Davis Wright Tremaine LLP

(57) ABSTRACT

Apparatuses, systems, and techniques to optimize device communications disclosed. In at least one embodiment, one or more neural networks are used to determine optimal power and frequency states for communication links between processing devices.

23 Claims, 41 Drawing Sheets

DEVICE LINK MANAGEMENT

FIELD

At least one embodiment pertains to processing resources used to execute computer-readable instructions. For example, at least one embodiment pertains to managing communication links between processors or computing devices according to various novel techniques described herein.

BACKGROUND

For large or complex computing tasks, multiple processors are often used that each handle a portion of a given task. In many systems communication links between devices and other components will operate at full power, which results in excess power consumption when no data is being transferred over these links. Further, these systems can allow for adjustments in bandwidth by changing a number of links utilized, but such adjustments do not control a data transfer rate and thus utilize a relatively consistent data transfer rate which is suboptimal for various processing tasks.

BRIEF DESCRIPTION OF THE DRAWINGS

Various embodiments in accordance with the present disclosure will be described with reference to the drawings, in which.

DETAILED DESCRIPTION

Figure 1A:
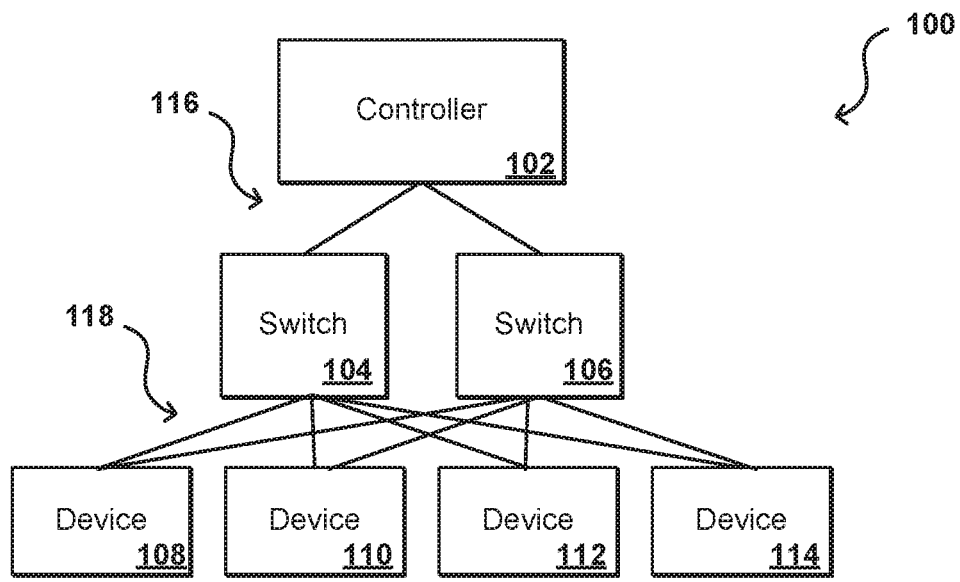
FIGS. 1A and 1B illustrate device connections that can be utilized, according to at least one embodiment.
Figure 1B:
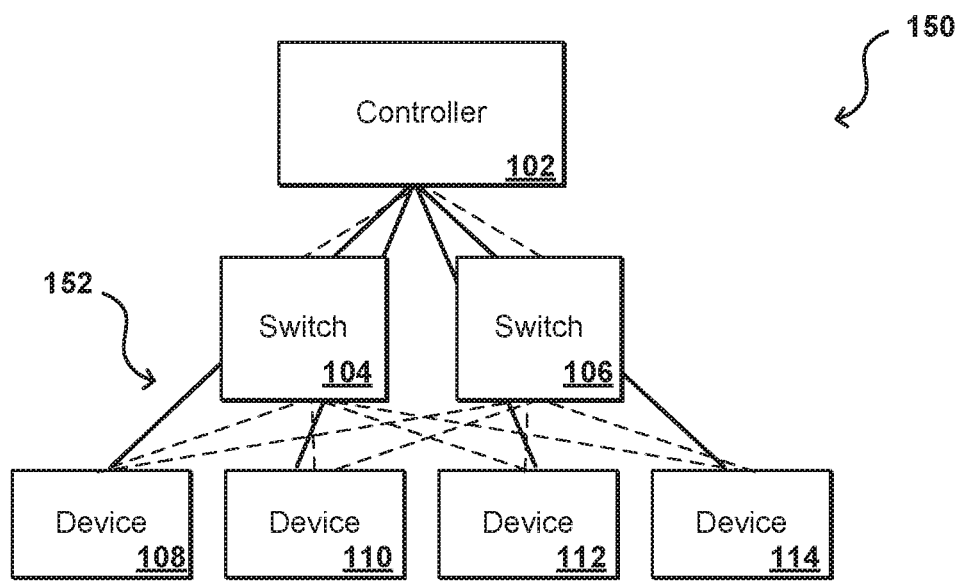

In at least one embodiment, a computing device includes a number of devices 108, 110, 112, 114 connected via communication links 118 for communication via two switches 104, 106 as illustrated in configuration 100 of FIG. 1A. In at least one embodiment, a device controller 102 can communicate with these devices 108, 110, 112, 114 through either of switches 104, 106 using illustrated communication links 116, 118 as these devices are fully connected. In at least one embodiment, controller 102 can also communicate with devices 108, 110, 112, 114 through a set of backchannel communication links 152 as illustrated in configuration 150 of FIG. 1B. In at least one embodiment, each of these communication links 116, 118, 152 (or channels) will have multiple power states and operating frequencies. In at least one embodiment, these power states and operating frequencies will impact aspects such as an achieved bandwidth, latency, and/or power consumption.

Figure 2:
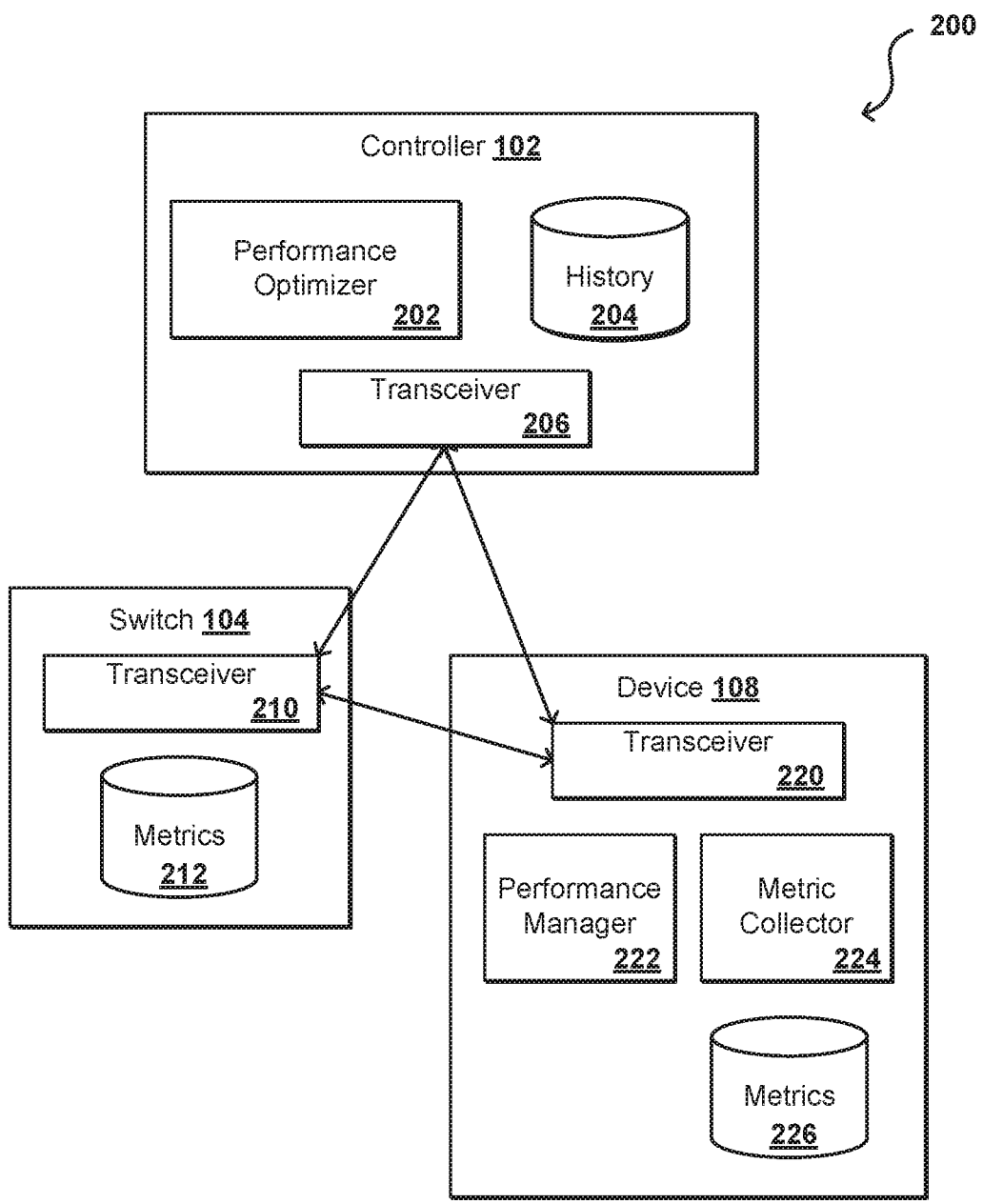
FIG. 2 illustrates components for device communication, according to at least one embodiment.

In at least one embodiment, each device 108, 110, 112, 114 can be a processor, such as a central processing unit (CPU) or graphics processing unit (GPU). In at least one embodiment, these devices can execute instructions for one or more applications. In at least one embodiment, each of these devices can include a set of subcomponents as illustrated in configuration 200 of FIG. 2. In at least one embodiment, FIG. 2 illustrates a single switch, device, and controller for ease of explanation, but multiple switches and devices can be connected as discussed with respect to FIGS. 1A and 1B, and reference numbers are carried over between figures to illustrate this capability. In at least one embodiment, more than four devices can be managed by a controller, or a hierarchy of controllers that each controls a subset of communication links where controller hubs can communicate global information and make different inter-node decisions.

In at least one embodiment, device 108 includes a transceiver that functions as a primary communication interface to enable sending and/or receiving of data to, and from, switch 104 and sending and/or receiving commends from controller 102. In at least one embodiment, device 108 also includes a device performance metric collector 224. In at least one embodiment, metric collector 224 is an IP block, or IP core, with buffers that can collect key performance metrics representing device activity, and can store these metrics to at least one repository 226. In at least one embodiment, key performance metrics on a GPU device include GPU instruction throughput, GPU frequency, GPU memory bandwidth (BW), streaming multiprocessor (SM) utilization, cache hit rates, and power values. In at least one embodiment, metric collector 224 can interface with on-die, or in-device, power estimators and performance monitors. In at least one embodiment, devices can send metrics or statistics to connected switches, such as switch 104, which can in turn forward to controller 102 for making decisions relevant to devices. In at least one embodiment, these decisions can include operational adjustment decisions, as may include turbo-boost decisions and dynamic voltage and frequency scaling (DVFS) decisions. In at least one embodiment, a performance manager 222 can function as a local controller that can perform operations such as to adjust a frequency and a voltage, as may be in response to a command sent by controller 102 to improve performance. In at least one embodiment, device 108 includes transceiver 220, a metric collector 224 or IP block with buffers to collect performance metrics, and performance manager 222. In at least one embodiment, upon a system startup or reboot device 108 can have default DVFS algorithms, of which controller 102 will be aware. In at least one embodiment, metrics will be collected over time and analyzed, and controller 102 can send appropriate commands to modify device performance. In at least one embodiment, devices can include other types of devices connected by communication links and are not limited to specific examples provided herein.

In at least one embodiment, switch 104 can store data representing a history of traffic transferring between pairs of devices, such as pairs of GPUs. In at least one embodiment, history data can include information such as a number of bytes, frequency of transfer, and one or more data toggle patterns. In at least one embodiment, switch 104 can also receive and store device performance metrics. In at least one embodiment, switch 104 has two main sub-blocks, including transceiver 210 that functions as a primary communication interface to send and receive data to, and from, controller 102 and device 108, as well as other switches and devices. In at least one embodiment, switch 104 includes metrics table 212 for storing device performance metrics and inter-device communication history, as well as information about recent power states of relevant devices and switches. In at least one embodiment, switch 104 periodically forwards its tables to controller 102, which can use this information to make adjustment decisions for relevant connected devices.

In at least one embodiment, controller 102 can periodically collect key performance metrics from devices, such as device 108, and communication metrics from switches, such as switch 104. In at least one embodiment, this information can be used to train a model to generate inferences about adjustments to be made to operational aspects such as operating frequency and power state of any two pairs of communication links between devices. In at least one embodiment, controller 102 contains at least three sub-blocks, including a transceiver 206 that functions as a primary communication interface for sending and receiving data and commands with respect to connected switches and devices. In at least one embodiment, controller 102 includes a history database 204 for storing historical performance data, as may include tables of p-stats, device performance metric statistics, and communication history. In at least one embodiment, controller 102 also includes a performance optimizer 202, which can review both current and historical data to make decisions with respect to adjusting performance, such as may relate to turbo boosting or DVFS. In at least one embodiment, if performance optimizer 202 determines that a current trained model is not sufficiently accurate in its inferences, optimizer 202 can also implement or request retraining, or further training, of this model.

In at least one embodiment, each switch can store history data relating to traffic transferred between, for example, pairs of devices. In at least one embodiment, this history data an include information such as number of bytes, frequency of transfer, and data toggle patterns. In at least one embodiment, linked devices can also store history data regarding operating frequencies, voltages, and power values. In at least one embodiment, this historical data will periodically be shared by backchannels 152 to a hardware controller 102, which can use this information to make decisions about operating frequency and power state for communication links between devices.

In at least one embodiment, such an approach can be used to attempt to optimize, over time, performance of these devices and links between these devices. In at least one embodiment, this includes adapting a power state and operational frequency of these links and devices in order to maximize overall performance. In at least one embodiment, for a general purpose application, performance could be measured through instruction throughput. In at least one embodiment, for a type of application as may relate to deep learning or neural network-type workloads, controller 102 could monitor durations and intervals between consecutive transactions that utilize certain links. In at least one embodiment, for a deep learning-type workload, devices may exchange neural network weights and gradients at regular epochs. In at least one embodiment, an amount of computation done between any two epochs can be constant. In at least one embodiment, an amount of data, as may include model weights and gradients to update those weights, transferred between any two devices at epoch times can also be constant. In at least one embodiment, monitoring a time between different epochs could be used to represent an overall performance gain or loss of this system. In at least one embodiment, software may also be allowed to pass hints or anticipated workload information. In at least one embodiment, runtime and compilers can make advanced analysis, and a set of APIs ca be provided that enable these runtimes and compilers to communicate information about a desired communication link efficiency or other such aspect. In at least one embodiment, controller 102 can take note of these hints from various devices or sources and can make globally-optimal decisions. In at least one embodiment, a distinction between hints and manual control result from software not making any explicit power throttling decision, instead augmenting a controller knowledge base to make better decisions in hardware.

In at least one embodiment, controller 102 can use a performance or power sensitivity with respect to different settings for devices and communication links, which can help to decide a power-state and/or operational frequency of communication links between two or more devices (e.g., GPUs). In at least one embodiment, different algorithms can be used that may help to achieve other goals. In at least one embodiment, a performance optimizer 202 can perform optimizations such as turbo-boosting and DVFS adjustment. In at least one embodiment, for turbo-boosting inference can be made that devices operating at higher frequencies may be more likely to benefit from higher data transfer rates when communicating, and vice versa. In at least one embodiment, a turbo-boosting algorithm can determine to turbo-boost links between highly active devices, as well as to throttle-down remaining links. In at least one embodiment, such an approach can benefit devices benefitting from a higher transfer rate while saving power for other devices that may not benefit, or at least do not need a higher transfer rate. In at least one embodiment, for a turbo-boosting approach, device performance metrics can be taken as input and a determination can be made as to whether a given device, such as a GPU, is highly active by analyzing its instruction throughput. In at least one embodiment, data including link metrics can be analyzed and a determination made as to whether certain devices are communicating frequently. In at least one embodiment, devices and links determined to be highly active can be selected for turbo boosting. In at least one embodiment, if all devices for a given controller have a similar activity level, which may occur for various applications, then DVFS may be performed instead of turbo-boosting. In at least one embodiment, two or more algorithms can be used to attempt to determine an appropriate, or optimal, DVFS setting. In at least one embodiment, adjustments to DVFS settings can help adjust power and speed settings on devices in order to optimize resource allotment for various tasks and maximize power savings when those resources are not needed. In at least one embodiment, a binary search algorithm can be used where controller 102 goes through a binary search of possible power states. In at least one embodiment, such an algorithm can, in a worst case, find an optimal setting in log(n) time, with n being a number of configurations before selecting an optimal configuration. In at least one embodiment, controller 102 does not require any input for this algorithm. In at least one embodiment, a binary search can set a frequency point and measure an outcome by seeing whether device instruction throughput changed. In at least one embodiment, this search would happen until device instruction throughput is stable within a specified tolerance or range.

In at least one embodiment, a neural network can be used to inference an optimal DVFS value. In at least one embodiment, a neural network can take as input device statistics, inter-device communication history, and performance metrics and infer a suitable DVFS or e-state for associated devices and links. In at least one embodiment, if output of this trained neural network is not leading to improvement in performance, as may be measured using an instruction throughput or a duration between epochs, this neural network may benefit from being re-trained and re-calibrated. In at least one embodiment, to balance overhead of training versus accuracy, these neural networks can be saved in memory of relevant controllers after training for N samples and then inferencing for M×N time samples.

In at least one embodiment, a neural network used to predict DVFS needs to be trained before use to perform DVFS for devices and links. In at least one embodiment, data from relevant links and GPU frequencies can be used to train a neural network to predict outcomes of link power and frequency states. In at least one embodiment, to pre-train a model with input and outcomes, binary search can be used with a modification that device and link performance metrics will be stored and outcome of binary search recorded. In at least one embodiment, this can be performed over hundreds of DGX machines for a large mix of workloads. In at least one embodiment, this data can then be used to train a model that can be formed from a baseline. In at least one embodiment, a baseline model can be deployed and used for inferencing to set DVFS. In at least one embodiment, if it is detected that GPU performance, as measured by instruction throughput, is decreased due to a DVFS setting, it may indicate that model refinement is needed. In at least one embodiment, another set of binary search can be performed and device and link metrics stored as was done during pre-training. In at least one embodiment, additional input and outcome data can be used to further train and improve this model. In at least one embodiment, once a model becomes stable, a DVFS setting would not result in degradation in performance, as measured by device instruction throughput.

In at least one embodiment, intra-node-local and, in multi-node connections, inter-node-global information can be leveraged to make quick decisions and fast reaction times on hardware. In at least one embodiment, large multimode GPU machines can benefit from such approaches, where a lower overall operating power cost can be obtained with respect to contained switches, such as NVLink® switches or NVSwitches® from NVIDIA Corporation. In at least one embodiment, more active GPUs in such a device can be dynamically turbo-boosted in order to obtain improved overall performance. In at least one embodiment, these approaches can be applied to deployments that connect nodes using these types of links but over an Ethernet or InfiniBand (IB) standard-based system. In at least one embodiment, these approaches can scale out to large nodes used in industries and applications relating to high performance computing (HPC) where a power budget may be calculated for thousands of nodes and power savings of a few hundred watts per node can translate into large savings at scale.

In at least one embodiment, a workload can be a distributed workload that is distributed over a number of devices, such as GPUs, in a system. In at least one embodiment, there will be communications between these GPUs to perform or process this workload. In at least one embodiment, such a workload may be related to training of a neural network, where this workload can include calculating or updating weights for a network. In at least one embodiment, each GPU will undergo a series of processing phases and data transfer phases. In at least one embodiment, during a processing phase a given GPU will not communicate data over a connected link. In at least one embodiment, a controller can attempt to adjust a power state of those links while there will be no data communication over those links. In at least one embodiment, a controller can also attempt to have those links operating at an optimal or maximum speed, or target speed, when data transfer or communication is to occur over those links. In at least one embodiment, for a deep learning workload, various GPUs can perform a compute operation related to calculating weights, and then these GPUs will need to exchange data and weights generated for their respective portions of this calculation. In at least one embodiment, after weights and data are exchanged, these GPUs can perform a next batch of computations for network training. In at least one embodiment, a frequency of communication versus computation can depend upon a problem that is trying to be solved, or overall operation or calculation to be performed. In at least one embodiment, a GPU may sit idle until it receives data from another GPU that is needed to process a next iteration. In at least one embodiment, latency of communication can thus decrease efficiency of these GPUs. In at least one embodiment, communications links such as NVLinks are powered to a maximum at all times for which data transfer is anticipated. In at least one embodiment, turbo-boosting can be utilized to improve latency, with power state management being utilized to improve power efficiency. In at least one embodiment, a data center might include thousands of machines that each take several kilowatts of power, with switches contributing to around 1 kilowatt per machine. In at least one embodiment, if even a portion of these links can be down-throttled then there will be a significant reduction in power savings and operating costs. In at least one embodiment, a hardware controller-based system can attempt to automatically detect in hardware when turbo-boosting should be applied and when lower power should be activated. In at least one embodiment, a hardware controller can analyze available data to make such determinations. In at least one embodiment, a hardware controller determining that a device needs to operate at lower latency can provide link turbo-boosting to improve performance. In at least one embodiment, a hardware controller identifying a link that is not active, or has little activity, can cause that link to operate at a lower frequency state, or lower DVFS, in order to reduce operating voltage to conserve power. In at least one embodiment, such an approach can help to cause links that need performance to operate at a higher potential and links that are idle to operate at a lower frequency point.

In at least one embodiment, statistics can be generated that are representative of a monitored behavior of a system. In at least one embodiment, these statistics are generated using various monitors built into this system, such as into specific devices such as GPUs, as may include performance counters, frequency monitors, voltage monitors, compute intensity monitors, and data transfer rate monitors. In at least one embodiment, data from these monitors can be analyzed while an application is running, in order to monitor communication happening between relevant devices. In at least one embodiment, this data can be stored as history data as discussed above, which can be analyzed to determine how to optimize a relevant system, such as to change a frequency of a link based in part upon what a connected device is doing, or how it is operating, at a particular time. In at least one embodiment, collected data can include a number of bytes being transferred, as well as a frequency of those transfers. In at least one embodiment, a determination can be made that a given link transfers a high frequency of small message, while another link transfers only large messages but relatively infrequently. In at least one embodiment, a hardware controller can analyze historical data to determine that a given pair of devices is very active, and that they are transferring data at a very fast rate or frequency, and can determine that links between these two devices should be turbo-boosted. In at least one embodiment, if there are two devices that are not particularly active, or active below a determined activity threshold, and those devices communicate relatively infrequently, a hardware controller can determine to potentially down-throttle links between those devices. In at least one embodiment, a hardware controller can store information regarding levels of activity in monitored devices and activity in respective links and use this data to make optimization decision.

In at least one embodiment, one or more interfaces (e.g., application programming interfaces (APIs), can be provided to enable software or an application to provide hints as to activity levels. In at least one embodiment, an application can utilize these interfaces to provide information for optimizing relevant workloads. In at least one embodiment, an application can indicate frequencies or operational states at which relevant links should operate. In at least one embodiment, however, decisions as to operation can still be make in hardware, but can consider input from software to be executed, or have operations performed, by relevant devices.

In at least one embodiment, there may be multiple operating points for turbo-boosting operations. In at least one embodiment, turbo-boosting may either be turned on or off. In at least one embodiment, where multiple operating points exist, turbo-boosting may also be set to a specific amount of turbo-boosting, whether adjusted to one of a set of boosting values or dynamically adjusted over a boosting value range. In at least one embodiment, a link can be turbo-boosted up to a highest frequency that can be achieved at a maximum thermally-allowed point. In at least one embodiment, a link may be able to be boosted by 30%-40%, as may depend in part upon a baseline setting. In at least one embodiment, turbo-boosting may only be applied for a relatively short period of time, and may not be able to be applied during an entire operation or calculation. In at least one embodiment, turbo-boosting decisions are made in a hardware controller, but actual turbo-boosting hardware would sit at transceivers for specific links. In at least one embodiment, a hardware controller would send instructions to relevant devices or switches to boost or lower an operating frequency of a link. In at least one embodiment, where a switch is connected to a device by a specific link to have operation adjusted, a hardware controller can send a command to both this switch and this device for this link. In at least one embodiment, a hardware controller monitors and sends commands to devices and switches on a single machine, which can help to avoid a device becoming a bottleneck to other devices in a network or data center.

In at least one embodiment, operational frequency can be adjusted using any of a number of different algorithms or approaches. In at least one embodiment, a neural network can be trained to adjust operational frequency in order to improve performance and power efficiency under various operating conditions. In at least one embodiment, such a network can be trained using data relating to monitored frequencies, data transfer rates, and device power states. In at least one embodiment, a trained network can infer an optimal frequency allowed by this hardware, which also will not negatively impact impacting performance. In at least one embodiment, a deep learning model can be trained for a specific machine or type of machine, or can be trained for a network of such machines.

Figure 3:
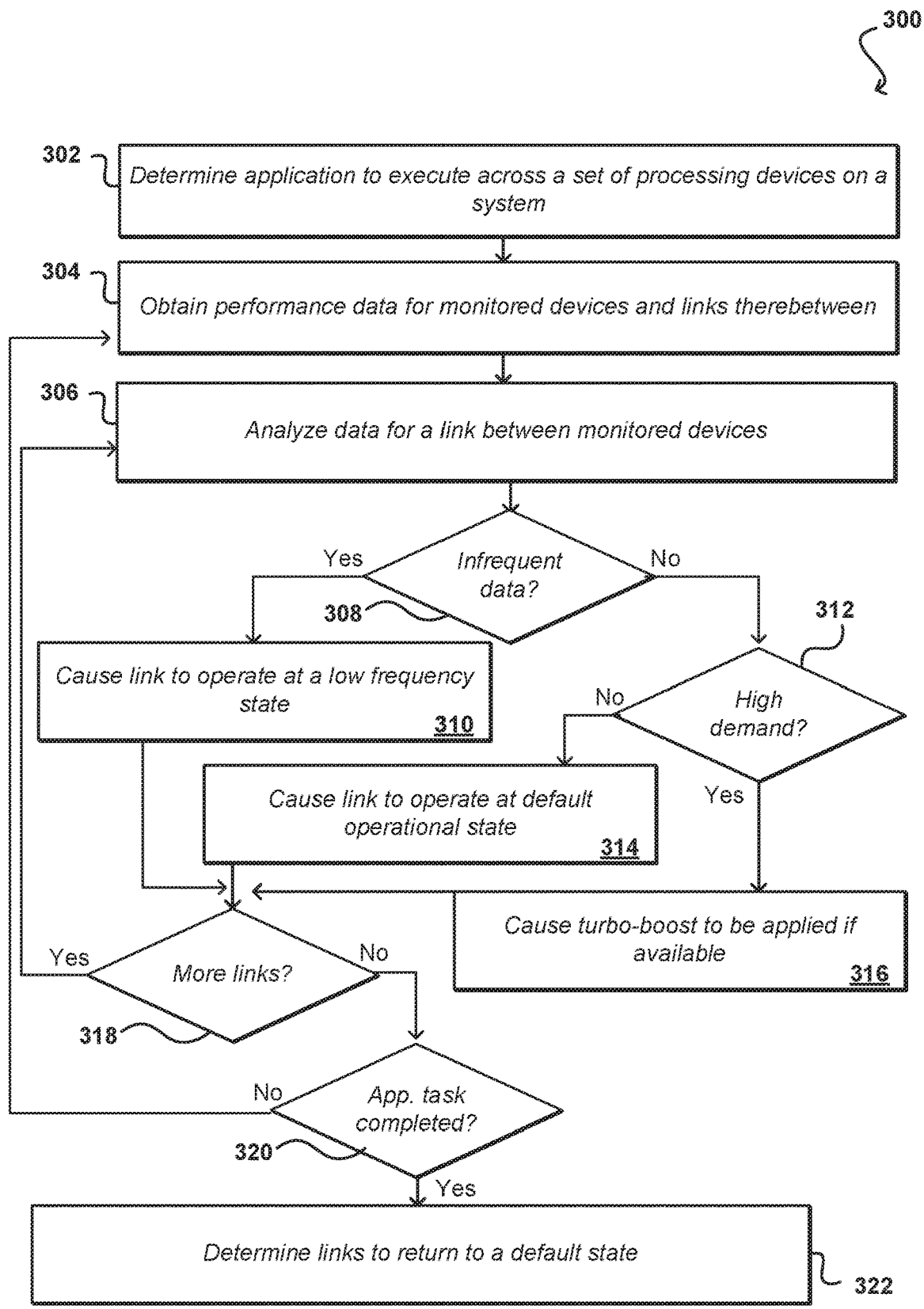
FIG. 3 illustrates a process for managing operational states of communication links, according to at least one embodiment.

In at least one embodiment, a process 300 for link management can be utilized as illustrated in FIG. 3. In at least one embodiment, an application to be executed across a set of processing devices on a system is determined 302. In at least one embodiment, other tasks to be executed across a set of processing devices can be considered as well, as may require portions to be executed by different processors with results to be communicated there between. In at least one embodiment, processing devices are graphics processing units (GPUs) connected by pairs of communication links and one or more switches having properties managed by a hardware controller. In at least one embodiment, performance data is obtained 304 for these monitored devices, switches, and/or links. In at least one embodiment, monitored data can be collected and stored locally, and periodically transferred to a hardware controller for analysis. In at least one embodiment, data for individual links, or pairs of links, between devices can be analyzed 306. In at least one embodiment, for a given link, a determination can be made 308 as to whether data is infrequently transmitted over a link, at least with small enough packet sizes that a high frequency connection is not required. In at least one embodiment, a determination of infrequent data can lead a hardware controller to cause 310 that link, or pair of links, to operate at a low frequency state. In at least one embodiment, there may be multiple frequency states, and lower frequency states may be utilized sequentially until an optimal frequency point is reached.

In at least one embodiment, if data is not transferred infrequently, or if a size of data transferred would not suit itself to lower frequency operation, then a determination can be made 312 as to whether there is a high demand on that link, such as where one or both connected devices are operating at full capacity or with a high load. In at least one embodiment, determinations of demand and frequency can be determined together. In at least one embodiment, determination by a hardware controller that demand on a link is not excessive, or above a normal operating threshold or range, can cause 314 a link, or pair of links, to operate at a default operational state, such as at a default frequency state and with a default power state. In at least one embodiment, there may be multiple frequency states or power states, and default values may vary based upon type of device or application. In at least one embodiment, a determination of high demand can cause 316 turbo-boost to be applied to a given link, or pair or set of links for a device. In at least one embodiment, turbo-boost will only be applied if available, as turbo-boost may only be applied in certain systems for a limited amount of time, then need another amount of time before it can be applied again. In at least one embodiment, turbo-boosting of one or more links may require a temporary reduction in frequency of other related links to ensure that a maximum frequency capacity is not exceeded. In at least one embodiment, if it is determined 318 that there are more links to be analyzed then this process can continue. In at least one embodiment, once all links have been updated and a current set of processing tasks has completed, another determination can be made 320 as to whether an application task has completed. In at least one embodiment, if this task has not completed then links can be analyzed and updated for a next round of processing. In at least one embodiment, if this task has completed then a hardware controller can determine 322 to return some or all of these links to a default state. In at least one embodiment, this may include at least turning off turbo-boost for any links, and may include increasing a power or frequency state for links that may require higher performance for a subsequent task or application.

Figure 4:
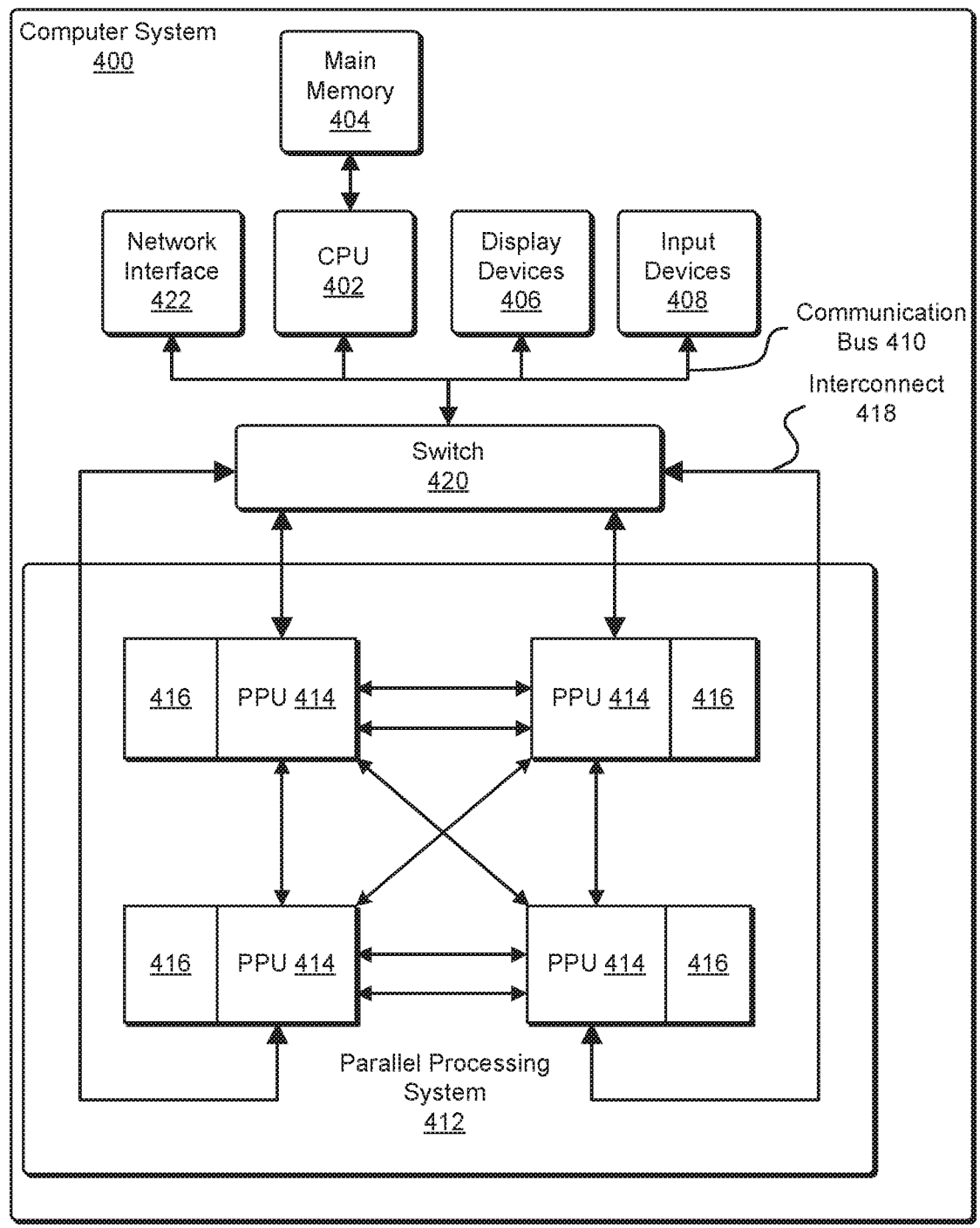
FIG. 4 illustrates a computer system, according to at least one embodiment.

FIG. 4 illustrates a computer system 400, according to at least one embodiment. In at least one embodiment, computer system 400 is configured to implement various processes and methods described throughout this disclosure. In at least one embodiment, parallel processing units 414 can communicate through interconnect 418 and at least one switch 420 for purposes of processing portions of a task as discussed above.

In at least one embodiment, computer system 400 comprises, without limitation, at least one central processing unit ("CPU") 402 that is connected to a communication bus 410 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 400 includes, without limitation, a main memory 404 and control logic (e.g., implemented as hardware, software, or a combination thereof) and data are stored in main memory 404 which may take form of random access memory ("RAM"). In at least one embodiment, a network interface subsystem ("network interface") 422 provides an interface to other computing devices and networks for receiving data from and transmitting data to other systems from computer system 400.

In at least one embodiment, computer system 400, in at least one embodiment, includes, without limitation, input devices 408, parallel processing system 412, and display devices 406 which can be implemented using a conventional cathode ray tube ("CRT"), liquid crystal display ("LCD"), light emitting diode ("LED"), plasma display, or other suitable display technologies. In at least one embodiment, user input is received from input devices 408 such as keyboard, mouse, touchpad, microphone, and more. In at least one embodiment, each of foregoing modules can be situated on a single semiconductor platform to form a processing system.

Inference and Training Logic

Figure 5A:
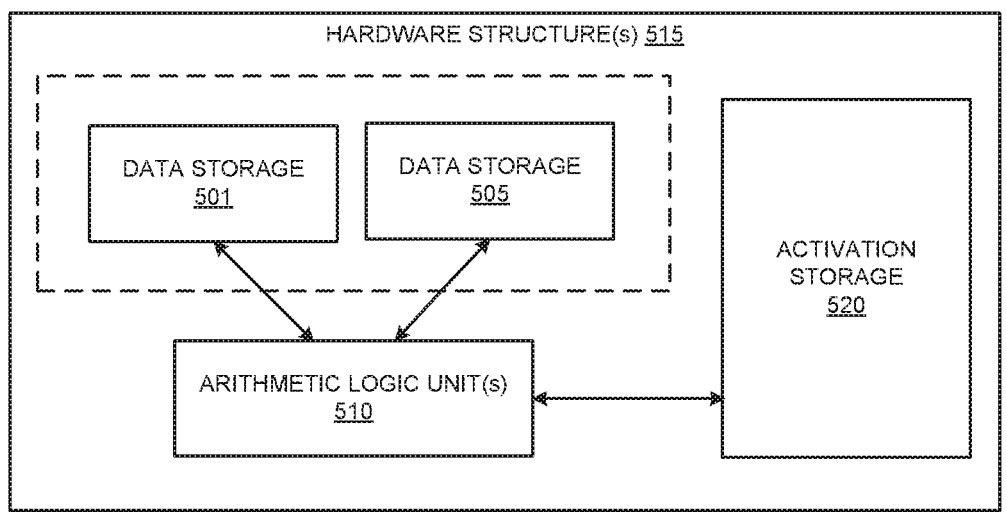
FIG. 5A illustrates inference and/or training logic, according to at least one embodiment.

FIG. 5A illustrates inference and/or training logic 515 used to perform inferencing and/or training operations associated with one or more embodiments. Details regarding inference and/or training logic 515 are provided below in conjunction with FIGS. 5A and/or 5B.

In at least one embodiment, inference and/or training logic 515 may include, without limitation, code and/or data storage 501 to store forward and/or output weight and/or input/output data, and/or other parameters to configure neurons or layers of a neural network trained and/or used for inferencing in aspects of one or more embodiments. In at least one embodiment, training logic 515 may include, or be coupled to code and/or data storage 501 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which this code corresponds. In at least one embodiment, code and/or data storage 501 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 501 may be included with other on-chip or off-chip data storage, including a processor's L1, L2, or L3 cache or system memory.

In at least one embodiment, any portion of code and/or data storage 501 may be internal or external to one or more processors or other hardware logic devices or circuits. In at least one embodiment, code and/or code and/or data storage 501 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 501 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 515 may include, without limitation, a code and/or data storage 505 to store backward and/or output weight and/or input/output data corresponding to neurons or layers of a neural network trained and/or used for inferencing in aspects of one or more embodiments. In at least one embodiment, code and/or data storage 505 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 515 may include, or be coupled to code and/or data storage 505 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which this code corresponds. In at least one embodiment, any portion of code and/or data storage 505 may be included with other on-chip or off-chip data storage, including a processor's L1, L2, or L3 cache or system memory. In at least one embodiment, any portion of code and/or data storage 505 may be internal or external to on one or more processors or other hardware logic devices or circuits. In at least one embodiment, code and/or data storage 505 may be cache memory, DRAM, SRAM, non-volatile memory (e.g., Flash memory), or other storage. In at least one embodiment, choice of whether code and/or data storage 505 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 501 and code and/or data storage 505 may be separate storage structures. In at least one embodiment, code and/or data storage 501 and code and/or data storage 505 may be same storage structure. In at least one embodiment, code and/or data storage 501 and code and/or data storage 505 may be partially same storage structure and partially separate storage structures. In at least one embodiment, any portion of code and/or data storage 501 and code and/or data storage 505 may be included with other on-chip or off-chip data storage, including a processor's L1, L2, or L3 cache or system memory.

In at least one embodiment, inference and/or training logic 515 may include, without limitation, one or more arithmetic logic unit(s) ("ALU(s)") 510, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 520 that are functions of input/output and/or weight parameter data stored in code and/or data storage 501 and/or code and/or data storage 505. In at least one embodiment, activations stored in activation storage 520 are generated according to linear algebraic and or matrix-based mathematics performed by ALU(s) 510 in response to performing instructions or other code, wherein weight values stored in code and/or data storage 505 and/or code and/or data storage 501 are used as operands along with other values, such as bias values, gradient information, momentum values, or other parameters or hyperparameters, any or all of which may be stored in code and/or data storage 505 or code and/or data storage 501 or another storage on or off-chip.

In at least one embodiment, ALU(s) 510 are included within one or more processors or other hardware logic devices or circuits, whereas in another embodiment, ALU(s) 510 may be external to a processor or other hardware logic device or circuit that uses them (e.g., a co-processor). In at least one embodiment, ALUs 510 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 501, code and/or data storage 505, and activation storage 520 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 520 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 520 may be cache memory, DRAM, SRAM, non-volatile memory (e.g., Flash memory), or other storage. In at least one embodiment, activation storage 520 may be completely or partially within or external to one or more processors or other logical circuits. In at least one embodiment, choice of whether activation storage 520 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 515 illustrated in FIG. 5A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5A may be used in conjunction with central processing unit ("CPU") hardware, graphics processing unit ("GPU") hardware or other hardware, such as field programmable gate arrays ("FPGAs").

Figure 5B:
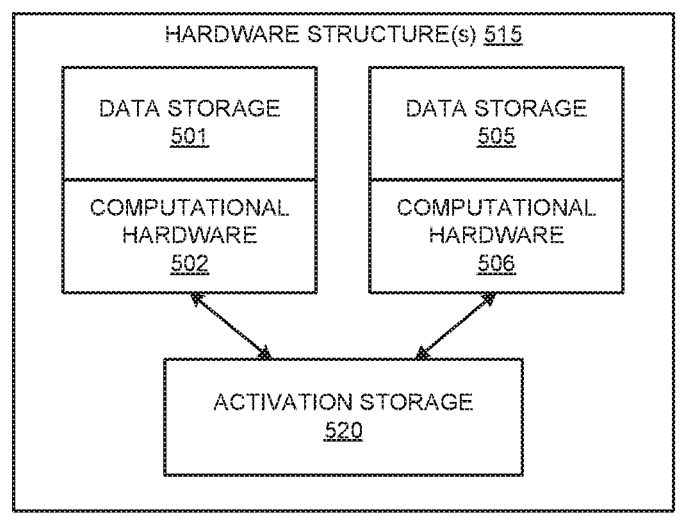
FIG. 5B illustrates inference and/or training logic, according to at least one embodiment.

FIG. 5B illustrates inference and/or training logic 515, according to at least one or more embodiments. In at least one embodiment, inference and/or training logic 515 may include, without limitation, hardware logic in which computational resources are dedicated or otherwise exclusively used in conjunction with weight values or other information corresponding to one or more layers of neurons within a neural network. In at least one embodiment, inference and/or training logic 515 illustrated in FIG. 5B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 515 illustrated in FIG. 5B may be used in conjunction with central processing unit (CPU) hardware, graphics processing unit (GPU) hardware or other hardware, such as field programmable gate arrays (FPGAs). In at least one embodiment, inference and/or training logic 515 includes, without limitation, code and/or data storage 501 and code and/or data storage 505, which may be used to store code (e.g., graph code), weight values and/or other information, including bias values, gradient information, momentum values, and/or other parameter or hyperparameter information. In at least one embodiment illustrated in FIG. 5B, each of code and/or data storage 501 and code and/or data storage 505 is associated with a dedicated computational resource, such as computational hardware 502 and computational hardware 506, respectively. In at least one embodiment, each of computational hardware 502 and computational hardware 506 comprises one or more ALUs that perform mathematical functions, such as linear algebraic functions, only on information stored in code and/or data storage 501 and code and/or data storage 505, respectively, result of which is stored in activation storage 520.

In at least one embodiment, each of code and/or data storage 501 and 505 and corresponding computational hardware 502 and 506, respectively, correspond to different layers of a neural network, such that resulting activation from one "storage/computational pair 501/502" of code and/or data storage 501 and computational hardware 502 is provided as an input to "storage/computational pair 505/506" of code and/or data storage 505 and computational hardware 506, in order to mirror conceptual organization of a neural network. In at least one embodiment, each of storage/computational pairs 501/502 and 505/506 may correspond to more than one neural network layer. In at least one embodiment, additional storage/computation pairs (not shown) subsequent to or in parallel with storage computation pairs 501/502 and 505/506 may be included in inference and/or training logic 515.

Data Center

Figure 6:
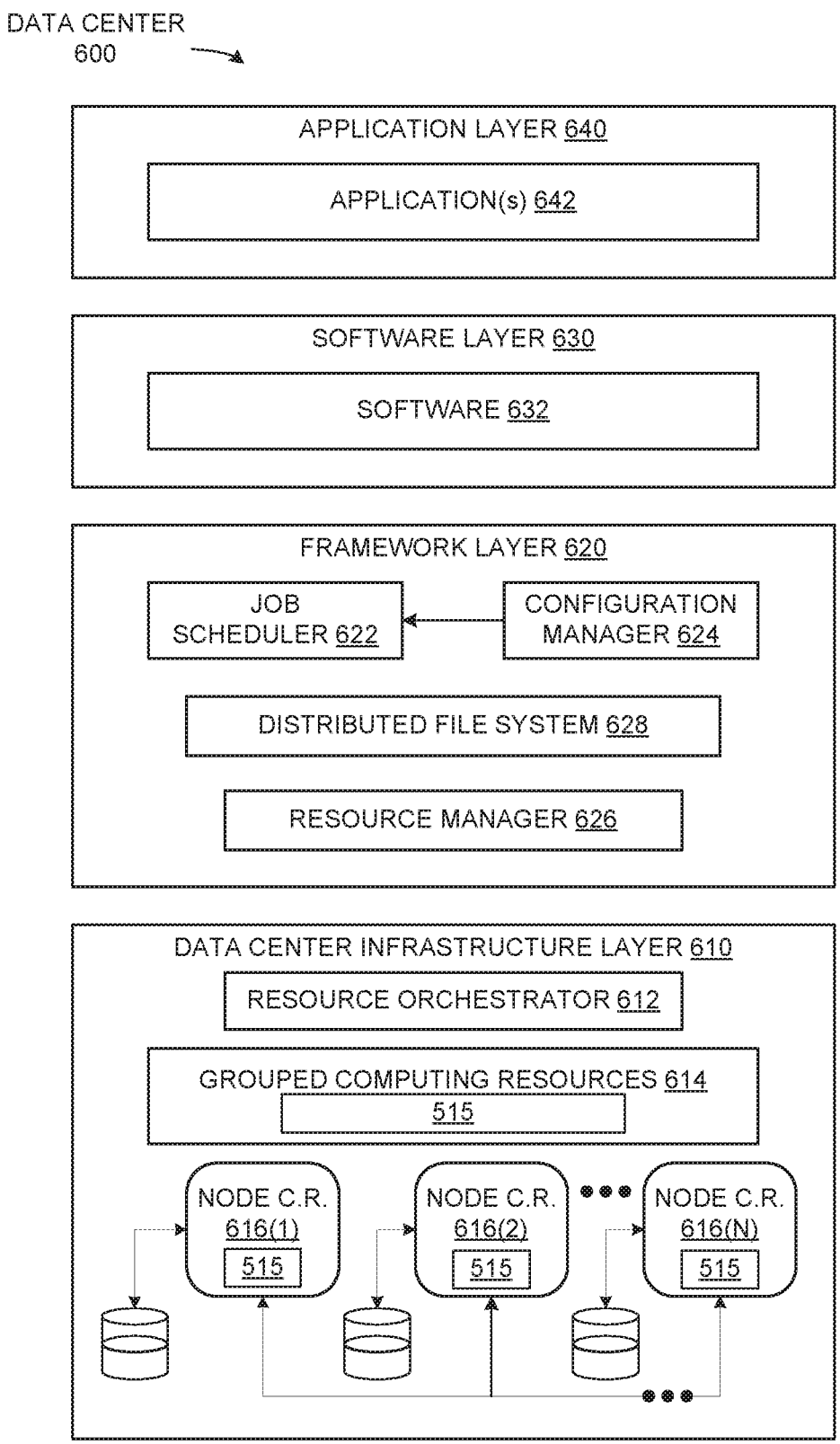
FIG. 6 illustrates an example data center system, according to at least one embodiment.

FIG. 6 illustrates an example data center 600, in which at least one embodiment may be used. In at least one embodiment, data center 600 includes a data center infrastructure layer 610, a framework layer 620, a software layer 630, and an application layer 640.

In at least one embodiment, as shown in FIG. 6, data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). Separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 612 may configure or otherwise control one or more node C.R.s 616(1)-616(N) and/or grouped computing resources 614. In at least one embodiment, resource orchestrator 612 may include a software design infrastructure ("SDI") management entity for data center 600. In at least one embodiment, resource orchestrator may include hardware, software or some combination thereof.

In at least one embodiment, as shown in FIG. 6, framework layer 620 includes a job scheduler 622, a configuration manager 624, a resource manager 626 and a distributed file system 628. In at least one embodiment, framework layer 620 may include a framework to support software 632 of software layer 630 and/or one or more application(s) 642 of application layer 640. In at least one embodiment, software 632 or application(s) 642 may respectively include web-based service software or applications, such as those provided by Amazon Web Services, Google Cloud and Microsoft Azure. In at least one embodiment, framework layer 620 may be, but is not limited to, a type of free and open-source software web application framework such as Apache Spark™ (hereinafter "Spark") that may utilize distributed file system 628 for large-scale data processing (e.g., "big data"). In at least one embodiment, job scheduler 622 may include a Spark driver to facilitate scheduling of workloads supported by various layers of data center 600. In at least one embodiment, configuration manager 624 may be capable of configuring different layers such as software layer 630 and framework layer 620 including Spark and distributed file system 628 for supporting large-scale data processing. In at least one embodiment, resource manager 626 may be capable of managing clustered or grouped computing resources mapped to or allocated for support of distributed file system 628 and job scheduler 622. In at least one embodiment, clustered or grouped computing resources may include grouped computing resource 614 at data center infrastructure layer 610. In at least one embodiment, resource manager 626 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 628 of framework layer 620. one or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 628 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 624, resource manager 626, and resource orchestrator 612 may implement any number and type of self-modifying actions based on any amount and type of data acquired in any technically feasible fashion. In at least one embodiment, self-modifying actions may relieve a data center operator of data center 600 from making possibly bad configuration decisions and possibly avoiding underutilized and/or poor performing portions of a data center.

In at least one embodiment, data center 600 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 600. In at least one embodiment, trained machine learning models corresponding to one or more neural networks may be used to infer or predict information using resources described above with respect to data center 600 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 6 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Computer Systems

Figure 7:
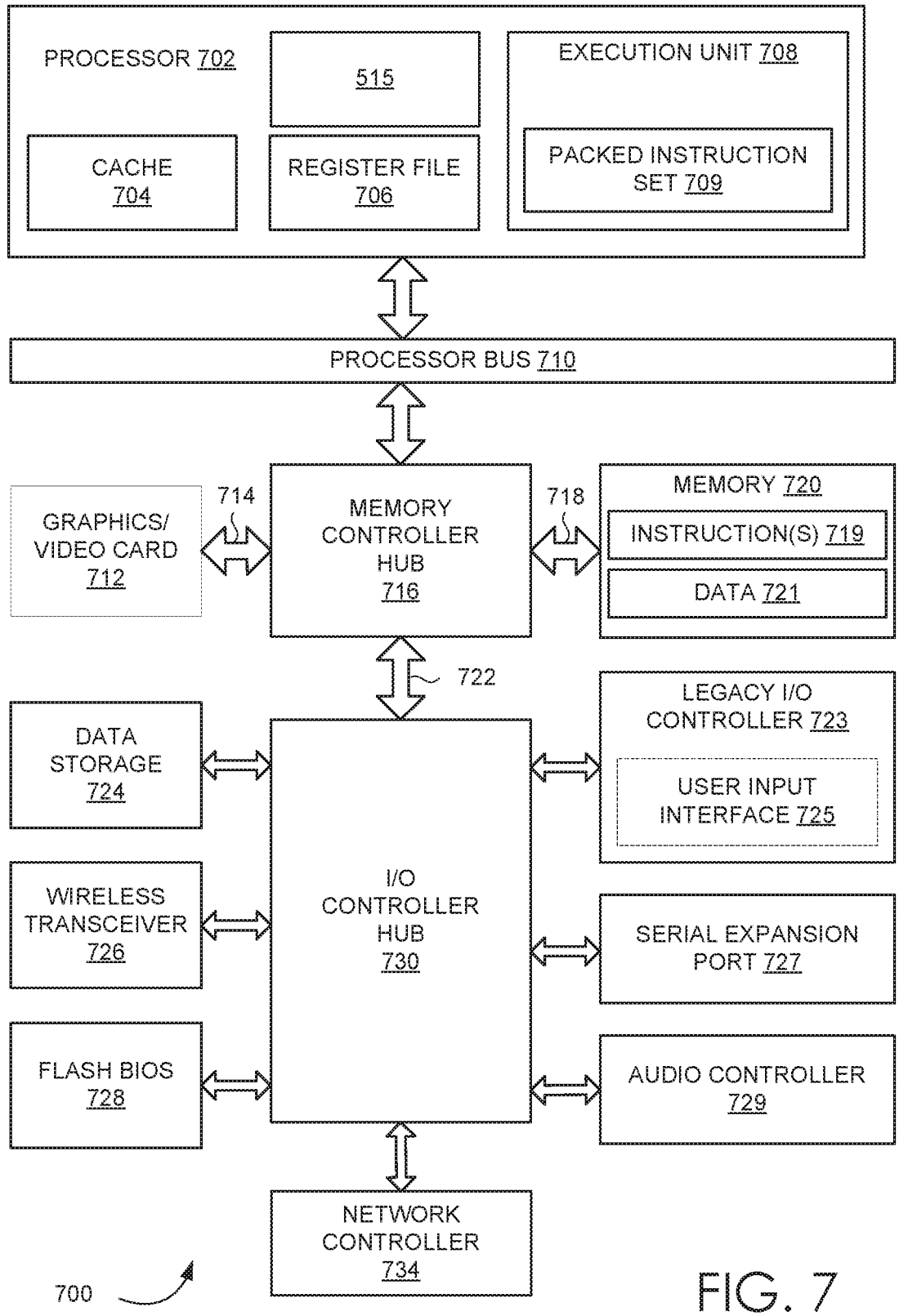
FIG. 7 illustrates a computer system, according to at least one embodiment.

FIG. 7A is a block diagram illustrating an exemplary computer system, which may be a system with interconnected devices and components, a system-on-a-chip (SOC) or some combination thereof 700 formed with a processor that may include execution units to execute an instruction, according to at least one embodiment. In at least one embodiment, computer system 700 may include, without limitation, a component, such as a processor 702 to employ execution units including logic to perform algorithms for process data, in accordance with present disclosure, such as in embodiment described herein. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 700 may include, without limitation, processor 702 that may include, without limitation, one or more execution units 708 to perform machine learning model training and/or inferencing according to techniques described herein. In at least one embodiment, computer system 700 is a single processor desktop or server system, but in another embodiment computer system 700 may be a multiprocessor system. In at least one embodiment, processor 702 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. Other embodiments may also include a combination of both internal and external caches depending on particular implementation and needs. In at least one embodiment, register file 706 may store different types of data in various registers including, without limitation, integer registers, floating point registers, status registers, and instruction pointer register.

In at least one embodiment, execution unit 708, including, without limitation, logic to perform integer and floating point operations, also resides in processor 702. In at least one embodiment, processor 702 may also include a microcode ("ucode") read only memory ("ROM") that stores microcode for certain macro instructions. In at least one embodiment, execution unit 708 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 708 may also be used in microcontrollers, embedded processors, graphics devices, DSPs, and other types of logic circuits. In at least one embodiment, computer system 700 may include, without limitation, a memory 720. In at least one embodiment, memory 720 may be implemented as a Dynamic Random Access Memory ("DRAM") device, a Static Random Access Memory ("SRAM") device, flash memory device, or other memory device. In at least one embodiment, memory 720 may store instruction(s) 719 and/or data 721 represented by data signals that may be executed by processor 702.

In at least one embodiment, system logic chip may be coupled to processor bus 710 and memory 720. In at least one embodiment, system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, system logic chip may provide a graphics port for coupling to a graphics controller. In at least one embodiment, MCH 716 may be coupled to memory 720 through a high bandwidth memory path 718 and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, local I/O bus may include, without limitation, a high-speed I/O bus for connecting peripherals to memory 720, chipset, and processor 702. Examples may include, without limitation, an audio controller 729, a firmware hub ("flash BIOS") 728, a wireless transceiver 726, a data storage 724, a legacy I/O controller 723 containing user input and keyboard interfaces 725, a serial expansion port 727, such as Universal Serial Bus ("USB"), and a network controller 734. data storage 724 may comprise a hard disk drive, a floppy disk drive, a CD-ROM device, a flash memory device, or other mass storage device.

In at least one embodiment, FIG. 7A illustrates a system, which includes interconnected hardware devices or "chips", whereas in other embodiments, FIG. 7A may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 700 are interconnected using compute express link (CXL) interconnects.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 7A for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 8:
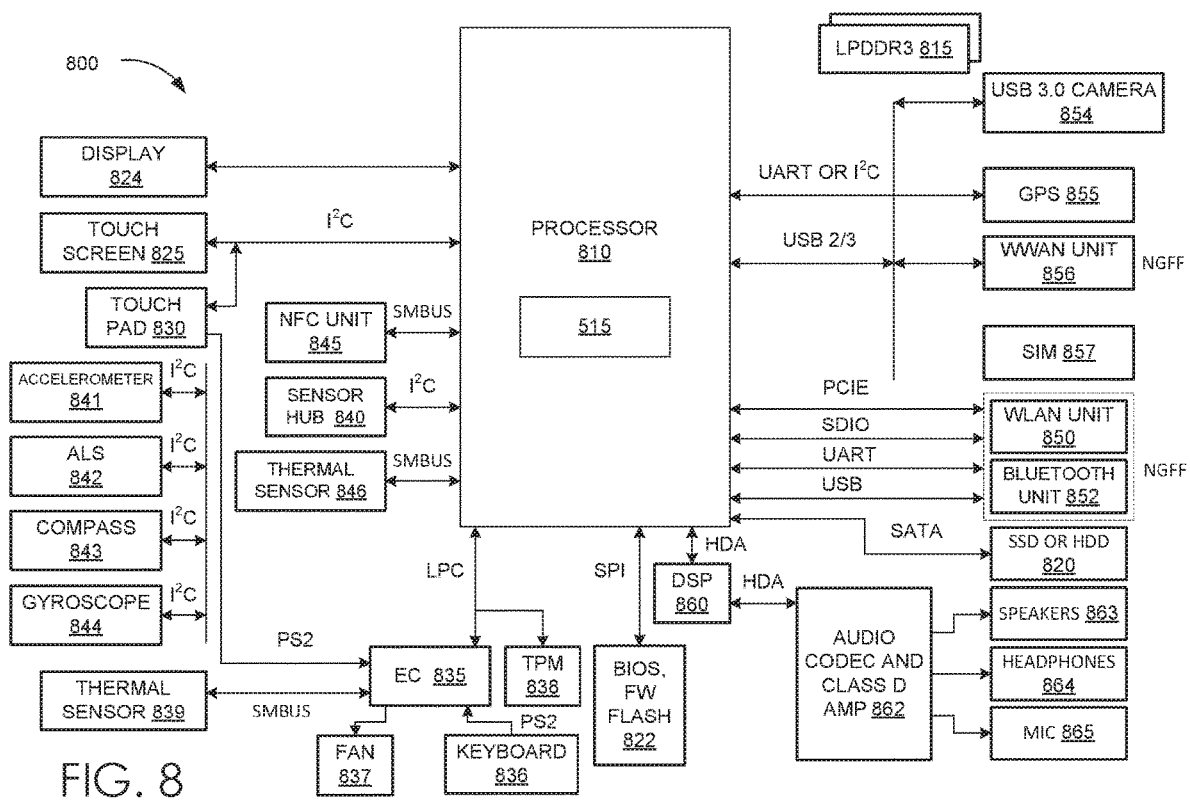
FIG. 8 illustrates a computer system, according to at least one embodiment.

FIG. 8 is a block diagram illustrating an electronic device 800 for utilizing a processor 810, according to at least one embodiment. In at least one embodiment, electronic device 800 may be, for example and without limitation, a notebook, a tower server, a rack server, a blade server, a laptop, a desktop, a tablet, a mobile device, a phone, an embedded computer, or any other suitable electronic device.

In at least one embodiment, system 800 may include, without limitation, processor 810 communicatively coupled to any suitable number or kind of components, peripherals, modules, or devices. In at least one embodiment, processor 810 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices illustrated in FIG. 8 may be interconnected with proprietary interconnects, standardized interconnects (e.g., PCIe) or some combination thereof. In at least one embodiment, one or more components of FIG. 8 are interconnected using compute express link (CXL) interconnects.

In at least one embodiment, FIG. 8 may include a display 824, a touch screen 825, a touch pad 830, a Near Field Communications unit ("NFC") 845, a sensor hub 840, a thermal sensor 846, an Express Chipset ("EC") 835, a Trusted Platform Module ("TPM") 838, BIOS/firmware/flash memory ("BIOS, FW Flash") 822, a DSP 860, a drive 820 such as a Solid State Disk ("SSD") or a Hard Disk Drive ("HDD"), a wireless local area network unit ("WLAN") 850, a Bluetooth unit 852, a Wireless Wide Area Network unit ("WWAN") 856, a Global Positioning System (GPS) 855, a camera ("USB 3.0 camera") 854 such as a USB 3.0 camera, and/or a Low Power Double Data Rate ("LPDDR") memory unit ("LPDDR3") 815 implemented in, for example, LPDDR3 standard. These components may each be implemented in any suitable manner.

In at least one embodiment, other components may be communicatively coupled to processor 810 through components discussed above. In at least one embodiment, an accelerometer 841, Ambient Light Sensor ("ALS") 842, compass 843, and a gyroscope 844 may be communicatively coupled to sensor hub 840. In at least one embodiment, thermal sensor 839, a fan 837, a keyboard 846, and a touch pad 830 may be communicatively coupled to EC 835. In at least one embodiment, speaker 863, headphones 864, and microphone ("mic") 865 may be communicatively coupled to an audio unit ("audio codec and class d amp") 862, which may in turn be communicatively coupled to DSP 860. In at least one embodiment, audio unit 864 may include, for example and without limitation, an audio coder/decoder ("codec") and a class D amplifier. In at least one embodiment, SIM card ("SIM") 857 may be communicatively coupled to WWAN unit 856. In at least one embodiment, components such as WLAN unit 850 and Bluetooth unit 852, as well as WWAN unit 856 may be implemented in a Next Generation Form Factor ("NGFF").

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 8 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 9:
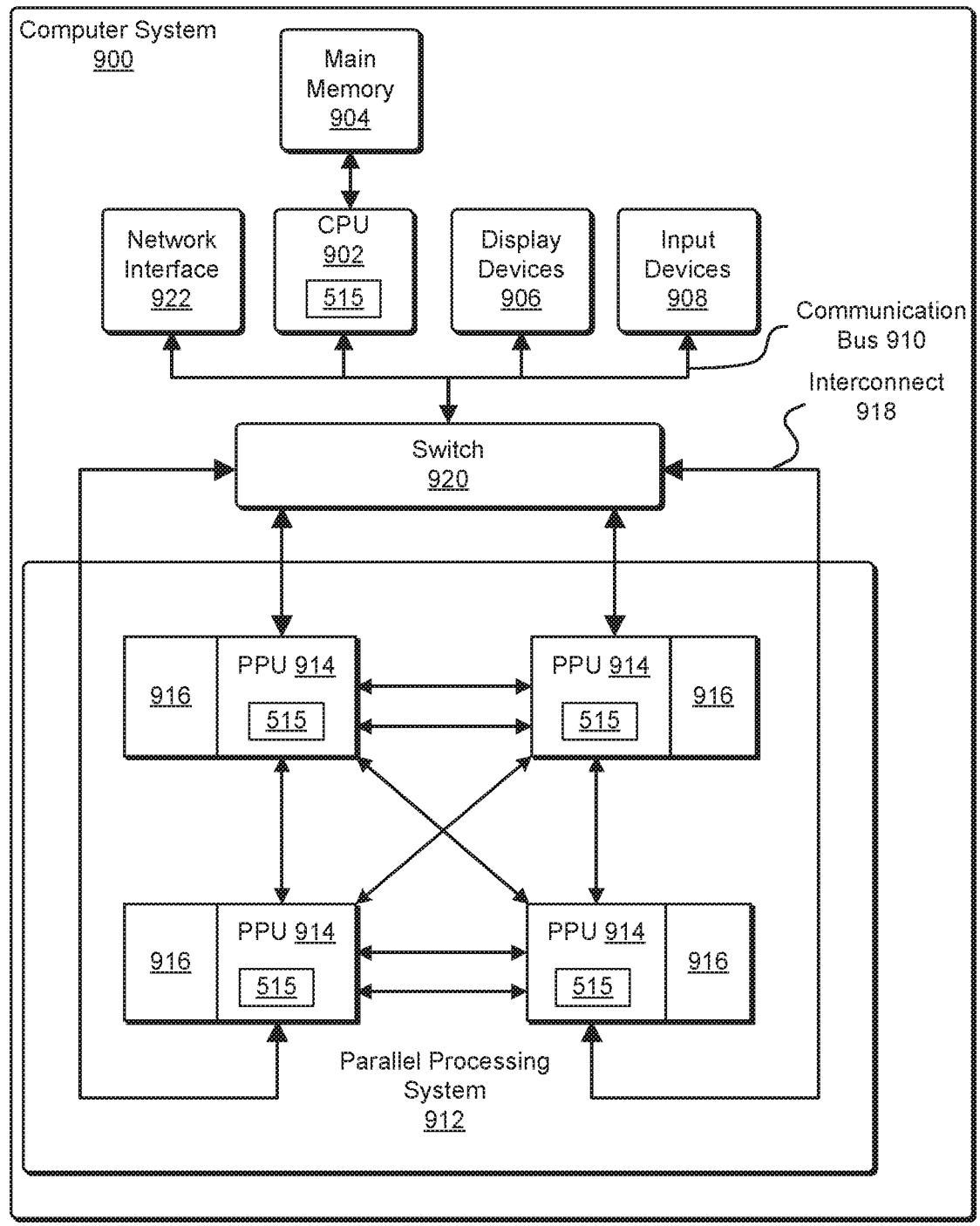
FIG. 9 illustrates a computer system, according to at least one embodiment.

FIG. 9 illustrates a computer system 900, according to at least one embodiment. In at least one embodiment, computer system 900 is configured to implement various processes and methods described throughout this disclosure.

In at least one embodiment, computer system 900 comprises, without limitation, at least one central processing unit ("CPU") 902 that is connected to a communication bus 910 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 900 includes, without limitation, a main memory 904 and control logic (e.g., implemented as hardware, software, or a combination thereof) and data are stored in main memory 904 which may take form of random access memory ("RAM"). In at least one embodiment, a network interface subsystem ("network interface") 922 provides an interface to other computing devices and networks for receiving data from and transmitting data to other systems from computer system 900.

In at least one embodiment, computer system 900, in at least one embodiment, includes, without limitation, input devices 908, parallel processing system 912, and display devices 906 which can be implemented using a conventional cathode ray tube ("CRT"), liquid crystal display ("LCD"), light emitting diode ("LED"), plasma display, or other suitable display technologies. In at least one embodiment, user input is received from input devices 908 such as keyboard, mouse, touchpad, microphone, and more. In at least one embodiment, each of foregoing modules can be situated on a single semiconductor platform to form a processing system.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 9 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 10:
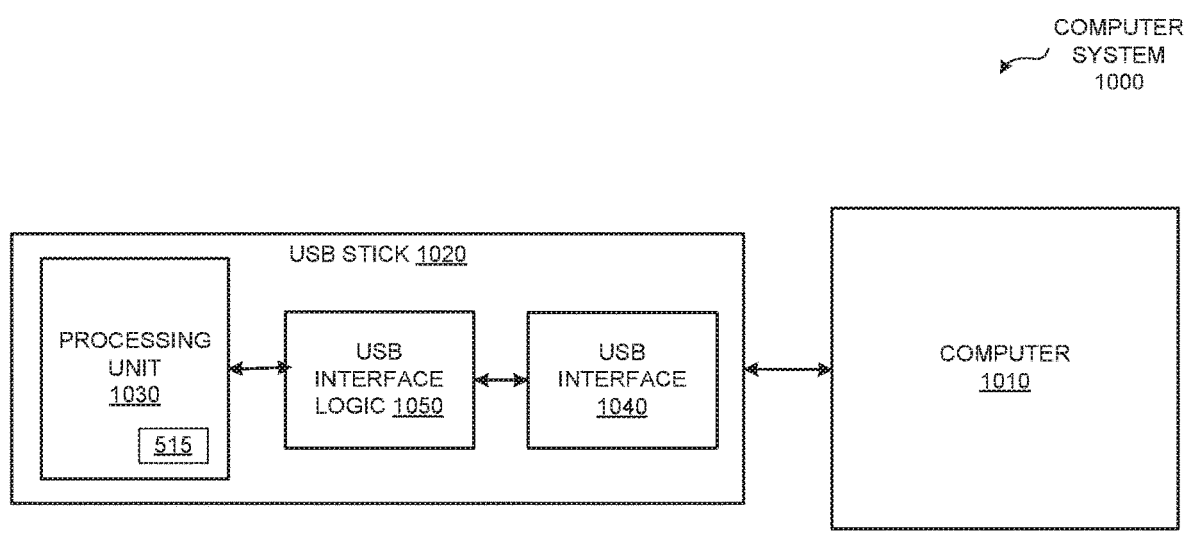
FIG. 10 illustrates a computer system, according at least one embodiment.

FIG. 10 illustrates a computer system 1000, according to at least one embodiment. In at least one embodiment, computer system 1000 includes, without limitation, a computer 1010 and a USB stick 1020. In at least one embodiment, computer 1010 may include, without limitation, any number and type of processor(s) (not shown) and a memory (not shown). In at least one embodiment, computer 1010 includes, without limitation, a server, a cloud instance, a laptop, and a desktop computer.

In at least one embodiment, USB stick 1020 includes, without limitation, a processing unit 1030, a USB interface 1040, and USB interface logic 1050. In at least one embodiment, processing unit 1030 may be any instruction execution system, apparatus, or device capable of executing instructions. In at least one embodiment, processing unit 1030 may include, without limitation, any number and type of processing cores (not shown). In at least one embodiment, processing core 1030 comprises an application specific integrated circuit ("ASIC") that is optimized to perform any amount and type of operations associated with machine learning. For instance, in at least one embodiment, processing core 1030 is a tensor processing unit ("TPC") that is optimized to perform machine learning inference operations. In at least one embodiment, processing core 1030 is a vision processing unit ("VPU") that is optimized to perform machine vision and machine learning inference operations.

In at least one embodiment, USB interface 1040 may be any type of USB connector or USB socket. For instance, in at least one embodiment, USB interface 1040 is a USB 3.0 Type-C socket for data and power. In at least one embodiment, USB interface 1040 is a USB 3.0 Type-A connector. In at least one embodiment, USB interface logic 1050 may include any amount and type of logic that enables processing unit 1030 to interface with or devices (e.g., computer 1010) via USB connector 1040.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 10 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 11A:
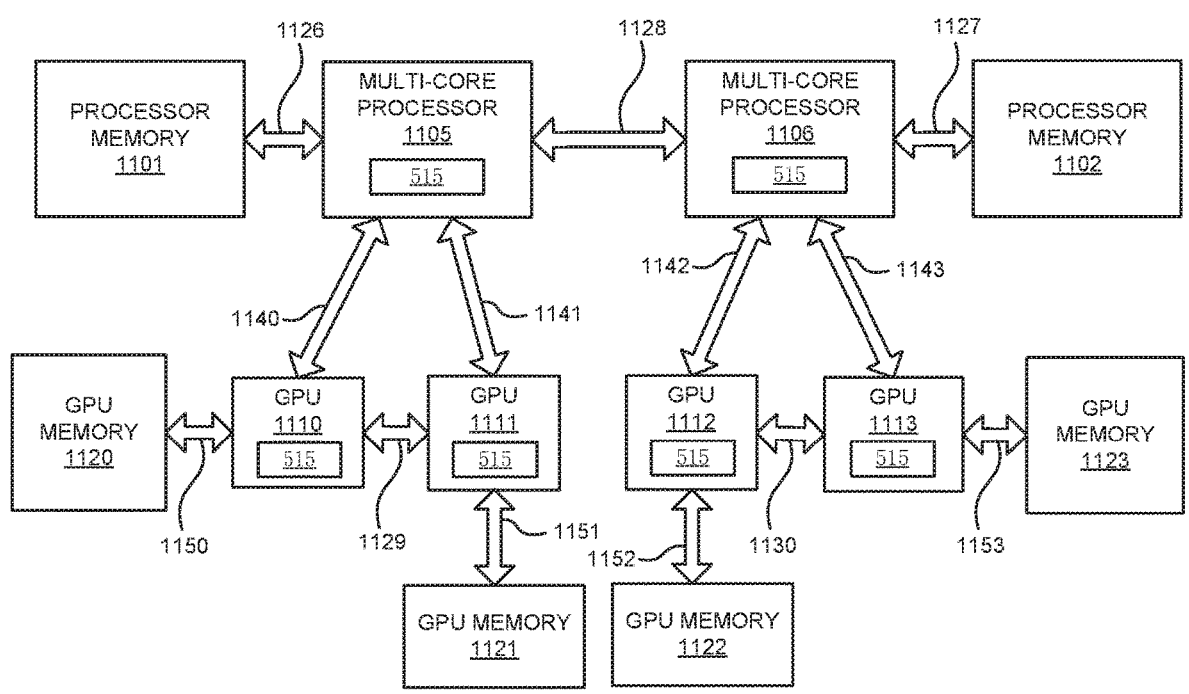
FIG. 11A illustrates a computer system, according to at least one embodiment.

FIG. 11A illustrates an exemplary architecture in which a plurality of GPUs 1110-1113 is communicatively coupled to a plurality of multi-core processors 1105-1106 over high-speed links 1140-1143 (e.g., buses, point-to-point interconnects, etc.). In one embodiment, high-speed links 1140-1143 support a communication throughput of 4 GB/s, 30 GB/s, 80

GB/s or higher. Various interconnect protocols may be used including, but not limited to, PCIe 4.0 or 5.0 and NVLink 2.0.

In addition, and in one embodiment, two or more of GPUs 1110-1113 are interconnected over high-speed links 1129-1130, which may be implemented using same or different protocols/links than those used for high-speed links 1140-1143. Similarly, two or more of multi-core processors 1105-1106 may be connected over high speed link 1128 which may be symmetric multi-processor (SMP) buses operating at 20 GB/s, 30 GB/s, 120 GB/s or higher. Alternatively, all communication between various system components shown in FIG. 11A may be accomplished using same protocols/links (e.g., over a common interconnection fabric).

In one embodiment, each multi-core processor 1105-1106 is communicatively coupled to a processor memory 1101-1102, via memory interconnects 1126-1127, respectively, and each GPU 1110-1113 is communicatively coupled to GPU memory 1120-1123 over GPU memory interconnects 1150-1153, respectively. Memory interconnects 1126-1127 and 1150-1153 may utilize same or different memory access technologies. By way of example, and not limitation, processor memories 1101-1102 and GPU memories 1120-1123 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of processor memories 1101-1102 may be volatile memory and another portion may be non-volatile memory (e.g., using a two-level memory (2LM) hierarchy).

As described below, although various processors 1105-1106 and GPUs 1110-1113 may be physically coupled to a particular memory 1101-1102, 1120-1123, respectively, a unified memory architecture may be implemented in which a same virtual system address space (also referred to as "effective address" space) is distributed among various physical memories. For example, processor memories 1101-1102 may each comprise 64 GB of system memory address space and GPU memories 1120-1123 may each comprise 32 GB of system memory address space (resulting in a total of 256 GB addressable memory in this example).

Figure 11B:
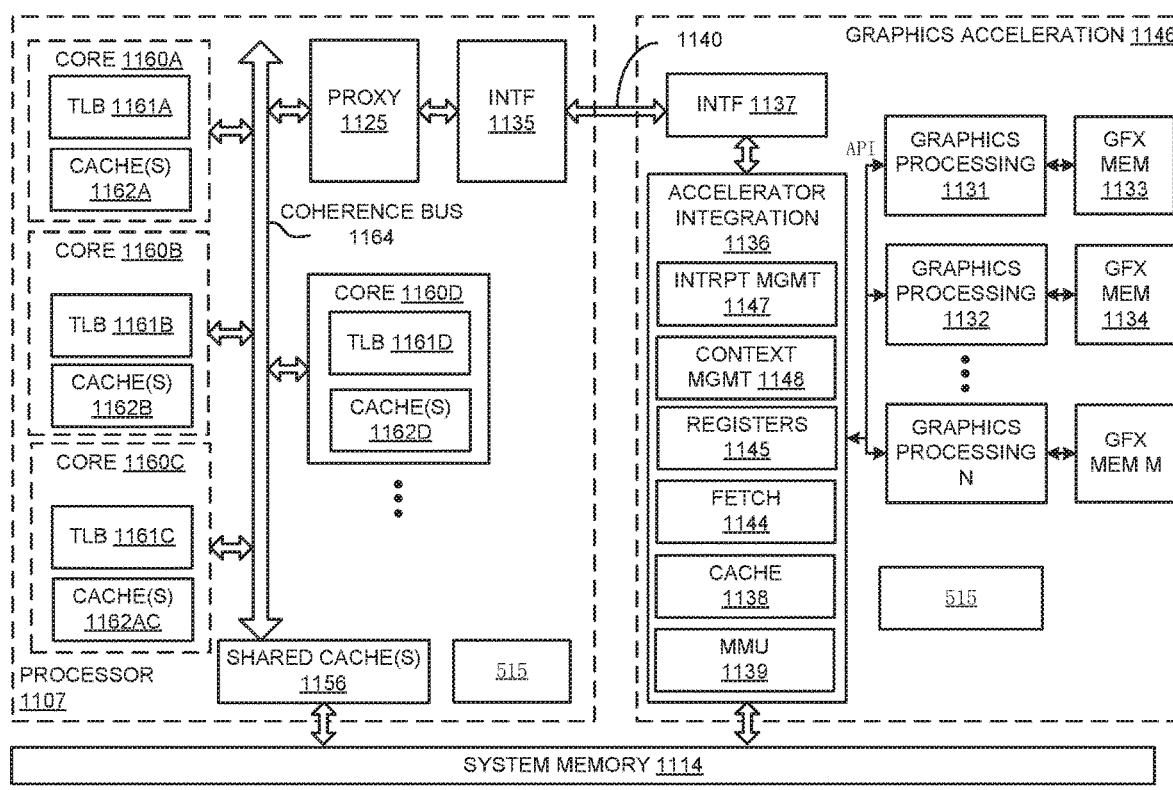
FIG. 11B illustrates a computer system, according to at least one embodiment.

FIG. 11B illustrates additional details for an interconnection between a multi-core processor 1107 and a graphics acceleration module 1146 in accordance with one exemplary embodiment. Graphics acceleration module 1146 may include one or more GPU chips integrated on a line card which is coupled to processor 1107 via high-speed link 1140. Alternatively, graphics acceleration module 1146 may be integrated on a same package or chip as processor 1107.

In at least one embodiment, illustrated processor 1107 includes a plurality of cores 1160A-1160D, each with a translation lookaside buffer 1161A-1161D and one or more caches 1162A-1162D. In at least one embodiment, cores 1160A-1160D may include various other components for executing instructions and processing data which are not illustrated. Caches 1162A-1162D may comprise level 1 (L1) and level 2 (L2) caches. In addition, one or more shared caches 1156 may be included in caches 1162A-1162D and shared by sets of cores 1160A-1160D. For example, one embodiment of processor 1107 includes 24 cores, each with its own L1 cache, twelve shared L2 caches, and twelve shared L3 caches. In this embodiment, one or more L2 and L3 caches are shared by two adjacent cores. Processor 1107 and graphics acceleration module 1146 connect with system memory 1114, which may include processor memories 1101-1102 of FIG. 11A.

Coherency is maintained for data and instructions stored in various caches 1162A-1162D, 1156 and system memory 1114 via inter-core communication over a coherence bus 1164. For example, each cache may have cache coherency logic/circuitry associated therewith to communicate to over coherence bus 1164 in response to detected reads or writes to particular cache lines. In one implementation, a cache snooping protocol is implemented over coherence bus 1164 to snoop cache accesses.

In one embodiment, a proxy circuit 1125 communicatively couples graphics acceleration module 1146 to coherence bus 1164, allowing graphics acceleration module 1146 to participate in a cache coherence protocol as a peer of cores 1160A-1160D. In particular, an interface 1135 provides connectivity to proxy circuit 1125 over high-speed link 1140 (e.g., a PCIe bus, NVLink, etc.) and an interface 1137 connects graphics acceleration module 1146 to link 1140.

In one implementation, an accelerator integration circuit 1136 provides cache management, memory access, context management, and interrupt management services on behalf of a plurality of graphics processing engines 1131, 1132, N of graphics acceleration module 1146. Graphics processing engines 1131, 1132, N may each comprise a separate graphics processing unit (GPU). Alternatively, graphics processing engines 1131, 1132, N may comprise different types of graphics processing engines within a GPU such as graphics execution units, media processing engines (e.g., video encoders/decoders), samplers, and blit engines. In at least one embodiment, graphics acceleration module 1146 may be a GPU with a plurality of graphics processing engines 1131-1132, N or graphics processing engines 1131-1132, N may be individual GPUs integrated on a common package, line card, or chip.

In one embodiment, accelerator integration circuit 1136 includes a memory management unit (MMU) 1139 for performing various memory management functions such as virtual-to-physical memory translations (also referred to as effective-to-real memory translations) and memory access protocols for accessing system memory 1114. MMU 1139 may also include a translation lookaside buffer (TLB) (not shown) for caching virtual/effective to physical/real address translations. In one implementation, a cache 1138 stores commands and data for efficient access by graphics processing engines 1131-1132, N. In one embodiment, data stored in cache 1138 and graphics memories 1133-1134, M is kept coherent with core caches 1162A-1162D, 1156, and system memory 1114. As mentioned above, this may be accomplished via proxy circuit 1125 on behalf of cache 1138 and memories 1133-1134, M (e.g., sending updates to cache 1138 related to modifications/accesses of cache lines on processor caches 1162A-1162D, 1156, and receiving updates from cache 1138).

A set of registers 1145 store context data for threads executed by graphics processing engines 1131-1132, N and a context management circuit 1148 manages thread contexts. For example, context management circuit 1148 may perform save and restore operations to save and restore contexts of various threads during contexts switches (e.g., where a first thread is saved and a second thread is stored so that a second thread can be executed by a graphics processing engine). For example, on a context switch, context management circuit 1148 may store current register values to a designated region in memory (e.g., identified by a context pointer). It may then restore register values when returning to a context. In one embodiment, an interrupt management circuit 1147 receives and processes interrupts received from system devices.

In one implementation, virtual/effective addresses from a graphics processing engine 1131 are translated to real/physical addresses in system memory 1114 by MMU 1139. One embodiment of accelerator integration circuit 1136 supports multiple (e.g., 4, 8, 16) graphics accelerator modules 1146 and/or other accelerator devices. Graphics accelerator module 1146 may be dedicated to a single application executed on processor 1107 or may be shared between multiple applications. In one embodiment, a virtualized graphics execution environment is presented in which resources of graphics processing engines 1131-1132, N are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1136 performs as a bridge to a system for graphics acceleration module 1146 and provides address translation and system memory cache services. In addition, accelerator integration circuit 1136 may provide virtualization facilities for a host processor to manage virtualization of graphics processing engines 1131-1132, N, interrupts, and memory management.

Because hardware resources of graphics processing engines 1131-1132, N are mapped explicitly to a real address space seen by host processor 1107, any host processor can address these resources directly using an effective address value. One function of accelerator integration circuit 1136, in one embodiment, is physical separation of graphics processing engines 1131-1132, N so that they appear to a system as independent units.

In at least one embodiment, one or more graphics memories 1133-1134, M are coupled to each of graphics processing engines 1131-1132, N, respectively. Graphics memories 1133-1134, M store instructions and data being processed by each of graphics processing engines 1131-1132, N. Graphics memories 1133-1134, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 1140, biasing techniques are used to ensure that data stored in graphics memories 1133-1134, M is data which will be used most frequently by graphics processing engines 1131-1132, N and preferably not used by cores 1160A-1160D (at least not frequently). Similarly, a biasing mechanism attempts to keep data needed by cores (and preferably not graphics processing engines 1131-1132, N) within caches 1162A-1162D, 1156 of cores and system memory 1114.

Figure 11C:
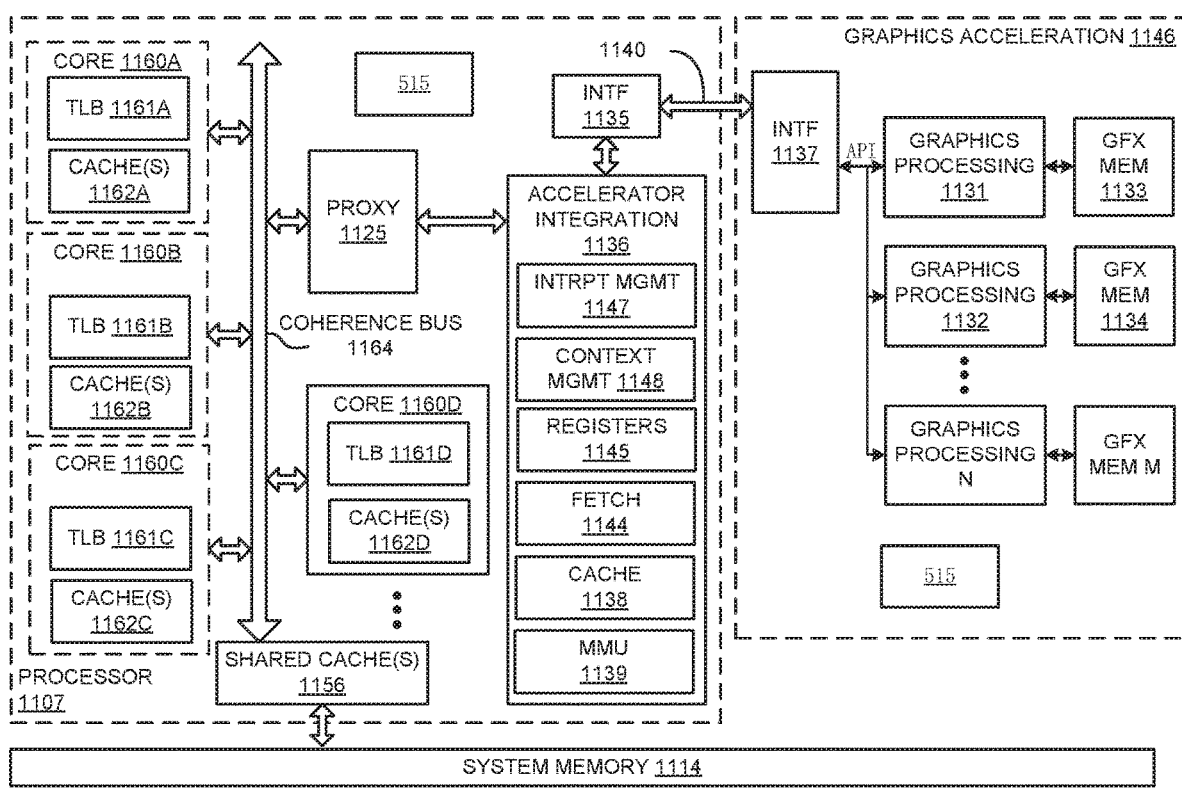
FIG. 11C illustrates a computer system, according to at least one embodiment.

FIG. 11C illustrates another exemplary embodiment in which accelerator integration circuit 1136 is integrated within processor 1107. In at least this embodiment, graphics processing engines 1131-1132, N communicate directly over high-speed link 1140 to accelerator integration circuit 1136 via interface 1137 and interface 1135 (which, again, may be utilize any form of bus or interface protocol). Accelerator integration circuit 1136 may perform same operations as those described with respect to FIG. 11B, but potentially at a higher throughput given its close proximity to coherence bus 1164 and caches 1162A-1162D, 1156. At least one embodiment supports different programming models including a dedicated-process programming model (no graphics acceleration module virtualization) and shared programming models (with virtualization), which may include programming models which are controlled by accelerator integration circuit 1136 and programming models which are controlled by graphics acceleration module 1146.

In at least one embodiment, graphics processing engines 1131-1132, N are dedicated to a single application or process under a single operating system. In at least one embodiment, a single application can funnel other application requests to graphics processing engines 1131-1132, N, providing virtualization within a VM/partition.

In at least one embodiment, graphics processing engines 1131-1132, N, may be shared by multiple VM/application partitions. In at least one embodiment, shared models may use a system hypervisor to virtualize graphics processing engines 1131-1132, N to allow access by each operating system. For single-partition systems without a hypervisor, graphics processing engines 1131-1132, N are owned by an operating system. In at least one embodiment, an operating system can virtualize graphics processing engines 1131-1132, N to provide access to each process or application.

In at least one embodiment, graphics acceleration module 1146 or an individual graphics processing engine 1131-1132, N selects a process element using a process handle. In at least one embodiment, process elements are stored in system memory 1114 and are addressable using an effective address to real address translation techniques described herein. In at least one embodiment, a process handle may be an implementation-specific value provided to a host process when registering its context with graphics processing engine 1131-1132, N (that is, calling system software to add a process element to a process element linked list). In at least one embodiment, a lower 16-bits of a process handle may be an offset of a process element within a process element linked list.

Figure 11D:
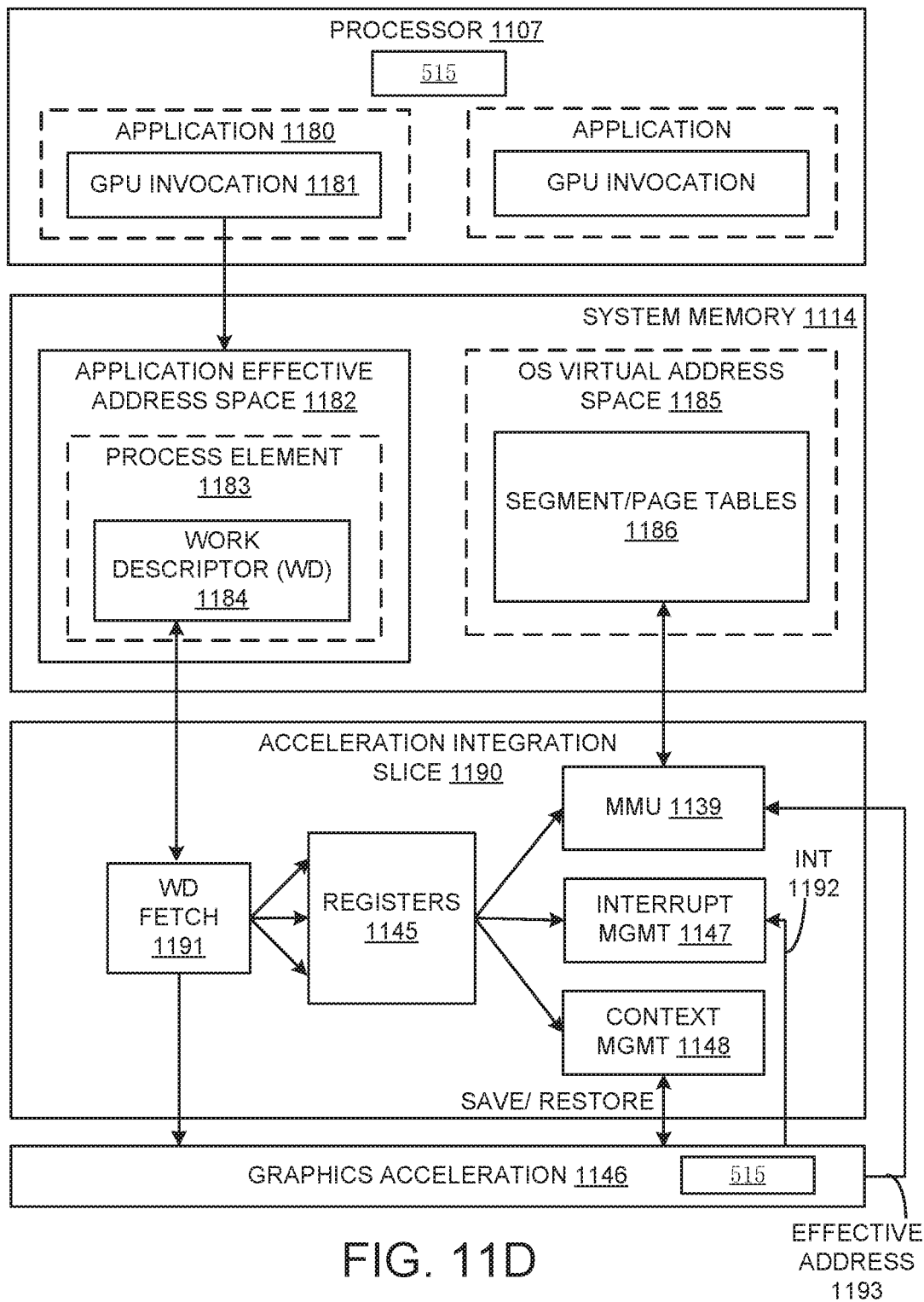
FIG. 11D illustrates a computer system, according to at least one embodiment.

FIG. 11D illustrates an exemplary accelerator integration slice 1190. As used herein, a "slice" comprises a specified portion of processing resources of accelerator integration circuit 1136. Application effective address space 1182 within system memory 1114 stores process elements 1183. In one embodiment, process elements 1183 are stored in response to GPU invocations 1181 from applications 1180 executed on processor 1107. A process element 1183 contains process state for corresponding application 1180. A work descriptor (WD) 1184 contained in process element 1183 can be a single job requested by an application or may contain a pointer to a queue of jobs. In at least one embodiment, WD 1184 is a pointer to a job request queue in an application's address space 1182.

Graphics acceleration module 1146 and/or individual graphics processing engines 1131-1132, N can be shared by all or a subset of processes in a system. In at least one embodiment, an infrastructure for setting up process state and sending a WD 1184 to a graphics acceleration module 1146 to start a job in a virtualized environment may be included.

In at least one embodiment, a dedicated-process programming model is implementation-specific. In this model, a single process owns graphics acceleration module 1146 or an individual graphics processing engine 1131. Because graphics acceleration module 1146 is owned by a single process, a hypervisor initializes accelerator integration circuit 1136 for an owning partition and an operating system initializes accelerator integration circuit 1136 for an owning process when graphics acceleration module 1146 is assigned.

In operation, a WD fetch unit 1191 in accelerator integration slice 1190 fetches next WD 1184 which includes an indication of work to be done by one or more graphics processing engines of graphics acceleration module 1146.

Data from WD 1184 may be stored in registers 1145 and used by MMU 1139, interrupt management circuit 1147, and/or context management circuit 1148 as illustrated. For example, one embodiment of MMU 1139 includes segment/page walk circuitry for accessing segment/page tables 1186 within OS virtual address space 1185. Interrupt management circuit 1147 may process interrupt events 1192 received from graphics acceleration module 1146. When performing graphics operations, an effective address 1193 generated by a graphics processing engine 1131-1132, N is translated to a real address by MMU 1139.

In one embodiment, a same set of registers 1145 are duplicated for each graphics processing engine 1131-1132, N and/or graphics acceleration module 1146 and may be initialized by a hypervisor or operating system. Each of these duplicated registers may be included in an accelerator integration slice 1190. Exemplary registers that may be initialized by a hypervisor are shown in Table 1.

TABLE 1

Hypervisor Initialized Registers

| | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In one embodiment, each WD 1184 is specific to a particular graphics acceleration module 1146 and/or graphics processing engines 1131-1132, N. It contains all information required by a graphics processing engine 1131-1132, N to do work or it can be a pointer to a memory location where an application has set up a command queue of work to be completed.

Figure 11E:
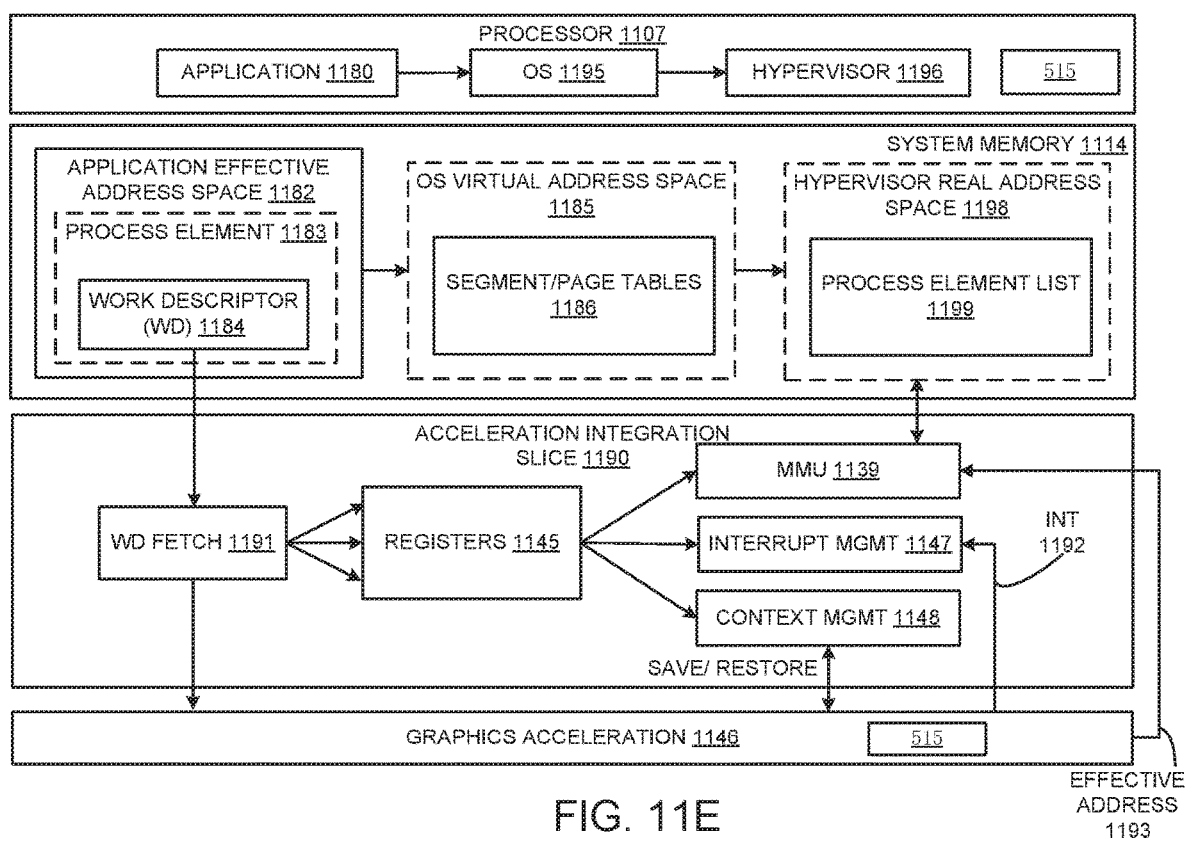
FIGS. 11E and 11F illustrate a shared programming model, according to at least one embodiment.

FIG. 11E illustrates additional details for one exemplary embodiment of a shared model. This embodiment includes a hypervisor real address space 1198 in which a process element list 1199 is stored. Hypervisor real address space 1198 is accessible via a hypervisor 1196 which virtualizes graphics acceleration module engines for operating system 1195.

In at least one embodiment, shared programming models allow for all or a subset of processes from all or a subset of partitions in a system to use a graphics acceleration module 1146. There are two programming models where graphics acceleration module 1146 is shared by multiple processes and partitions: time-sliced shared and graphics-directed shared.

In this model, system hypervisor 1196 owns graphics acceleration module 1146 and makes its function available to all operating systems 1195. For a graphics acceleration module 1146 to support virtualization by system hypervisor 1196, graphics acceleration module 1146 may adhere to the following: 1) An application's job request must be autonomous (that is, state does not need to be maintained between jobs), or graphics acceleration module 1146 must provide a context save and restore mechanism. 2) An application's job request is guaranteed by graphics acceleration module 1146 to complete in a specified amount of time, including any translation faults, or graphics acceleration module 1146 provides an ability to preempt processing of a job. 3) Graphics acceleration module 1146 must be guaranteed fairness between processes when operating in a directed shared programming model.

In at least one embodiment, application 1180 is required to make an operating system 1195 system call with a graphics acceleration module 1146 type, a work descriptor (WD), an authority mask register (AMR) value, and a context save/restore area pointer (CSRP). In at least one embodiment, graphics acceleration module 1146 type describes a targeted acceleration function for a system call. In at least one embodiment, graphics acceleration module 1146 type may be a system-specific value. In at least one embodiment, WD is formatted specifically for graphics acceleration module 1146 and can be in a form of a graphics acceleration module 1146 command, an effective address pointer to a user-defined structure, an effective address pointer to a queue of commands, or any other data structure to describe work to be done by graphics acceleration module 1146. In one embodiment, an AMR value is an AMR state to use for a current process. In at least one embodiment, a value passed to an operating system is similar to an application setting an AMR. If accelerator integration circuit 1136 and graphics acceleration module 1146 implementations do not support a User Authority Mask Override Register (UAMOR), an operating system may apply a current UAMOR value to an AMR value before passing an AMR in a hypervisor call. Hypervisor 1196 may optionally apply a current Authority Mask Override Register (AMOR) value before placing an AMR into process element 1183. In at least one embodiment, CSRP is one of registers 1145 containing an effective address of an area in an application's effective address space 1182 for graphics acceleration module 1146 to save and restore context state. This pointer is optional if no state is required to be saved between jobs or when a job is preempted. In at least one embodiment, context save/restore area may be pinned system memory.

Upon receiving a system call, operating system 1195 may verify that application 1180 has registered and been given authority to use graphics acceleration module 1146. Operating system 1195 then calls hypervisor 1196 with information shown in Table 3.

TABLE 3

OS to Hypervisor Call Parameters

| | |
|---|---|
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

Upon receiving a hypervisor call, hypervisor 1196 verifies that operating system 1195 has registered and been given authority to use graphics acceleration module 1146. Hypervisor 1196 then puts process element 1183 into a process element linked list for a corresponding graphics acceleration module 1146 type. A process element may include information shown in Table 4.

TABLE 4

Process Element Information

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 Virtual address of storage segment table pointer (SSTP)
7 A logical interrupt service number (LISN)
8 Interrupt vector table, derived from hypervisor call parameters
9 A state register (SR) value
10 A logical partition ID (LPID)
11 A real address (RA) hypervisor accelerator utilization record pointer
12 Storage Descriptor Register (SDR)

In at least one embodiment, hypervisor initializes a plurality of accelerator integration slice 1190 registers 1145.

Figure 11F:
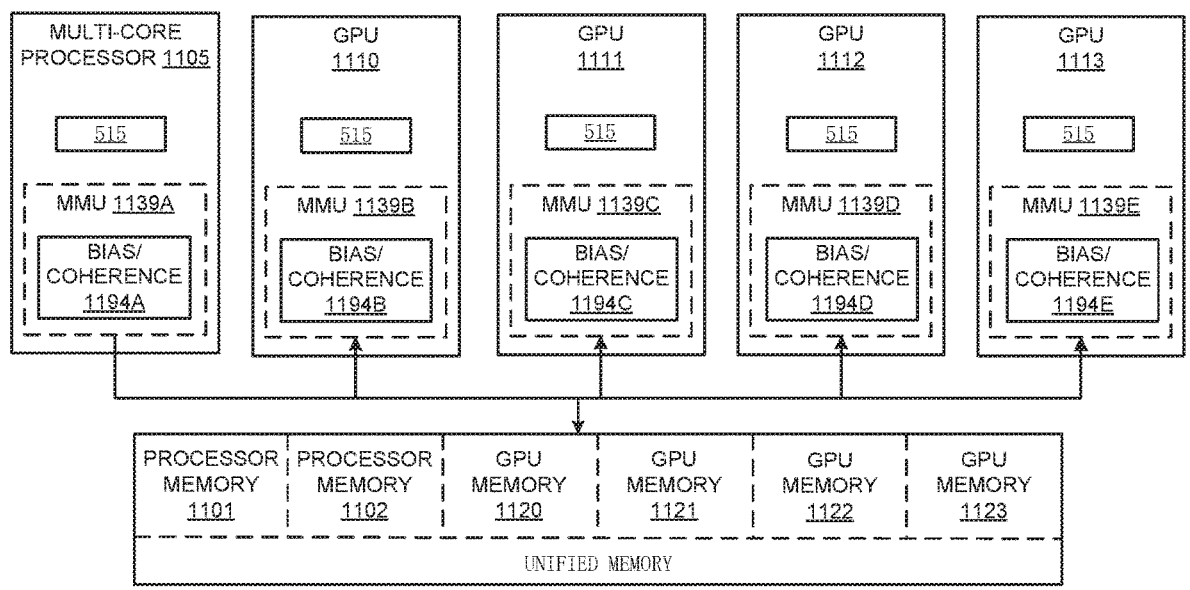

As illustrated in FIG. 11F, in at least one embodiment, a unified memory is used, addressable via a common virtual memory address space used to access physical processor memories 1101-1102 and GPU memories 1120-1123. In this implementation, operations executed on GPUs 1110-1113 utilize a same virtual/effective memory address space to access processor memories 1101-1102 and vice versa, thereby simplifying programmability. In one embodiment, a first portion of a virtual/effective address space is allocated to processor memory 1101, a second portion to second processor memory 1102, a third portion to GPU memory 1120, and so on. In at least one embodiment, an entire virtual/effective memory space (sometimes referred to as an effective address space) is thereby distributed across each of processor memories 1101-1102 and GPU memories 1120-1123, allowing any processor or GPU to access any physical memory with a virtual address mapped to that memory.

In one embodiment, bias/coherence management circuitry 1194A-1194E within one or more of MMUs 1139A-1139E ensures cache coherence between caches of one or more host processors (e.g., 1105) and GPUs 1110-1113 and implements biasing techniques indicating physical memories in which certain types of data should be stored. While multiple instances of bias/coherence management circuitry 1194A-1194E are illustrated in FIG. 11F, bias/coherence circuitry may be implemented within an MMU of one or more host processors 1105 and/or within accelerator integration circuit 1136.

One embodiment allows GPU-attached memory 1120-1123 to be mapped as part of system memory, and accessed using shared virtual memory (SVM) technology, but without suffering performance drawbacks associated with full system cache coherence. In at least one embodiment, an ability for GPU-attached memory 1120-1123 to be accessed as system memory without onerous cache coherence overhead provides a beneficial operating environment for GPU offload. This arrangement allows host processor 1105 software to setup operands and access computation results, without overhead of tradition I/O DMA data copies. Such traditional copies involve driver calls, interrupts and memory mapped I/O (MMIO) accesses that are all inefficient relative to simple memory accesses. In at least one embodiment, an ability to access GPU attached memory 1120-1123 without cache coherence overheads can be critical to execution time of an offloaded computation. In cases with substantial streaming write memory traffic, for example, cache coherence overhead can significantly reduce an effective write bandwidth seen by a GPU 1110-1113. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. A bias table may be used, for example, which may be a page-granular structure (i.e., controlled at a granularity of a memory page) that includes 1 or 2 bits per GPU-attached memory page. In at least one embodiment, a bias table may be implemented in a stolen memory range of one or more GPU-attached memories 1120-1123, with or without a bias cache in GPU 1110-1113 (e.g., to cache frequently/recently used entries of a bias table). Alternatively, an entire bias table may be maintained within a GPU.

In at least one embodiment, a bias table entry associated with each access to GPU-attached memory 1120-1123 is accessed prior to actual access to a GPU memory, causing the following operations. First, local requests from GPU 1110-1113 that find their page in GPU bias are forwarded directly to a corresponding GPU memory 1120-1123. Local requests from a GPU that find their page in host bias are forwarded to processor 1105 (e.g., over a high-speed link as discussed above). In one embodiment, requests from processor 1105 that find a requested page in host processor bias complete a request like a normal memory read. Alternatively, requests directed to a GPU-biased page may be forwarded to GPU 1110-1113. In at least one embodiment, a GPU may then transition a page to a host processor bias if it is not currently using a page. In at least one embodiment, bias state of a page can be changed either by a software-based mechanism, a hardware-assisted software-based mechanism, or, for a limited set of cases, a purely hardware-based mechanism.

One mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, cache flushing operation is used for a transition from host processor 1105 bias to GPU bias, but is not for an opposite transition.

In one embodiment, cache coherency is maintained by temporarily rendering GPU-biased pages uncacheable by host processor 1105. To access these pages, processor 1105 may request access from GPU 1110 which may or may not grant access right away. Thus, to reduce communication between processor 1105 and GPU 1110 it is beneficial to ensure that GPU-biased pages are those which are required by a GPU but not host processor 1105 and vice versa.

Inference and/or training logic 515 are used to perform one or more embodiments. Details regarding the inference and/or training logic 515 are provided below in conjunction with FIGS. 5A and/or 5B.

In at least one embodiment, such components can be used to manage communication links connecting processing devices. In at least one embodiment, this can include determining frequency states and power states for communication links between processors.

Figure 12:
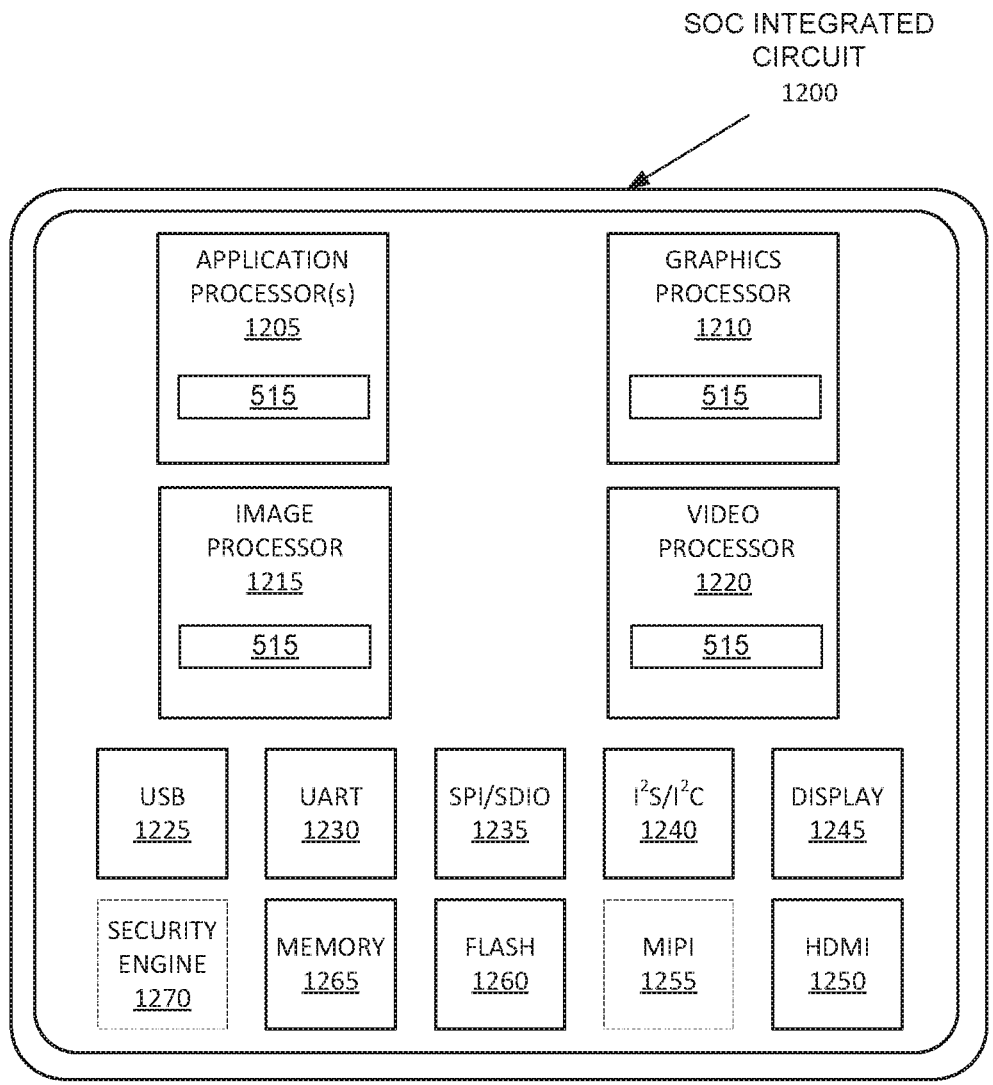
FIG. 12 illustrates exemplary integrated circuits and associated graphics processors, according to at least one embodiment.

FIG. 12 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to at least one embodiment. In at least one embodiment, integrated circuit 1200 includes one or more application processor(s) 1205 (e.g., CPUs), at least one graphics processor 1210, and may additionally include an image processor 1215 and/or a video processor 1220, any of which may be a modular IP core. In at least one embodiment, integrated circuit 1200 includes peripheral or bus logic including a USB controller 1225, UART controller 1230, an SPI/SDIO controller 1235, and an I²S/I²C controller 1240. In at least one embodiment, integrated circuit 1200 can include a display device 1245 coupled to one or more of a high-definition multimedia interface (HDMI) controller 1250 and a mobile industry processor interface (MIPI) display interface 1255. In at least one embodiment, storage may be provided by a flash memory subsystem 1260 including flash memory and a flash memory controller. In at least one embodiment, memory interface may be provided via a memory controller 1265 for access to SDRAM or SRAM memory devices. In at least one embodiment, some integrated circuits additionally include an embedded security engine 1270.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in integrated circuit 1200 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 13A:
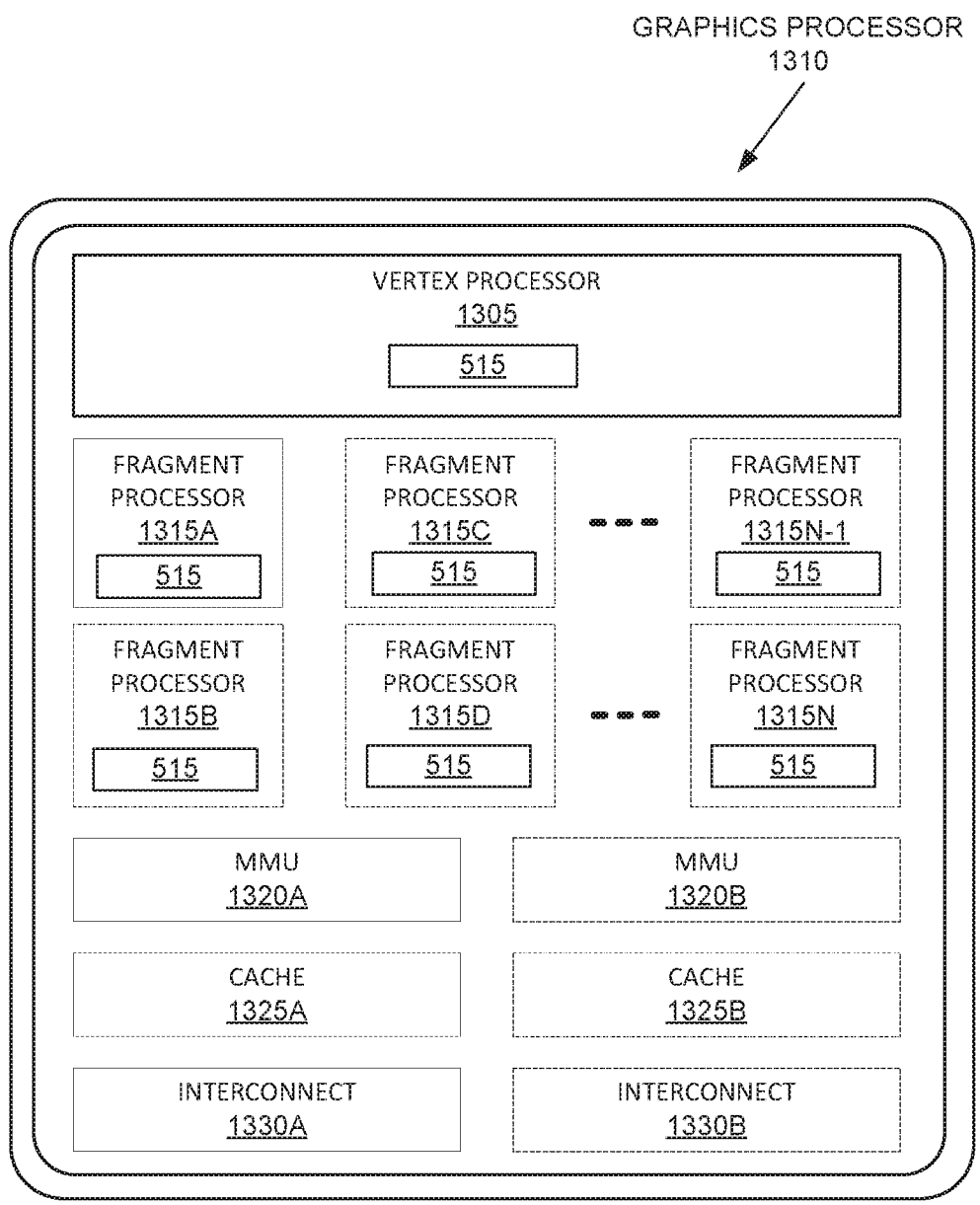
FIGS. 13A-13B illustrate exemplary integrated circuits and associated graphics processors, according to at least one embodiment.
Figure 13B:
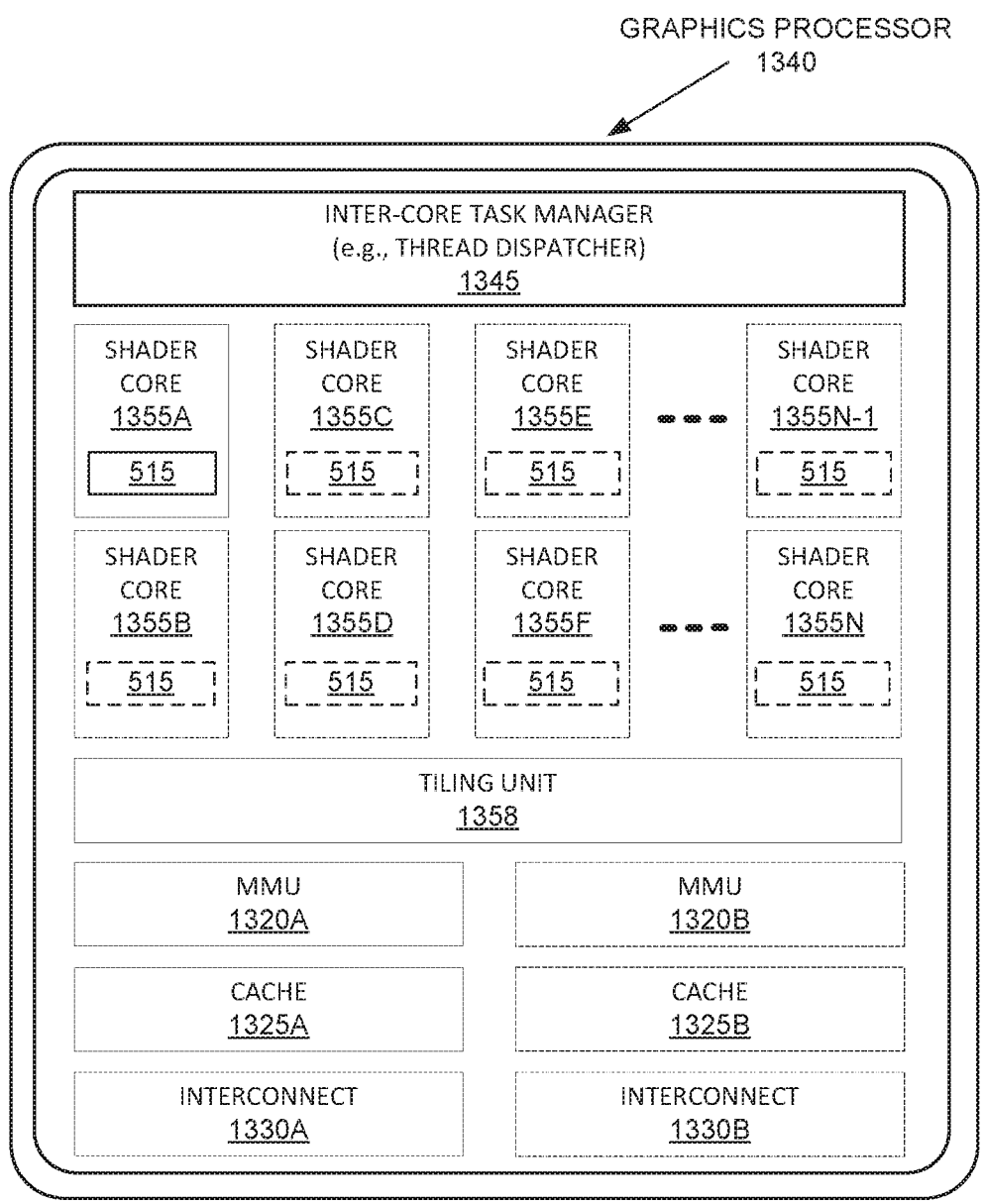

FIGS. 13A-13B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to at least one embodiment. FIG. 13B illustrates an additional exemplary graphics processor 1340 of a system on a chip integrated circuit that may be fabricated using one or more IP cores, according to at least one embodiment. In at least one embodiment, graphics processor 1310 of FIG. 13A is a low power graphics processor core. In at least one embodiment, graphics processor 1340 of FIG. 13B is a higher performance graphics processor core. In at least one embodiment, each of graphics processors 1310, 1340 can be variants of graphics processor 1210 of FIG. 12.

In at least one embodiment, graphics processor 1310 includes a vertex processor 1305 and one or more fragment processor(s) 1315A-1315N (e.g., 1315A, 1315B, 1315C, 1315D, through 1315N-1, and 1315N). In at least one embodiment, graphics processor 1310 can execute different shader programs via separate logic, such that vertex processor 1305 is optimized to execute operations for vertex shader programs, while one or more fragment processor(s) 1315A-1315N execute fragment (e.g., pixel) shading operations for fragment or pixel shader programs. In at least one embodiment, vertex processor 1305 performs a vertex processing stage of a 3D graphics pipeline and generates primitives and vertex data. In at least one embodiment, fragment processor(s) 1315A-1315N use primitive and vertex data generated by vertex processor 1305 to produce a framebuffer that is displayed on a display device. In at least one embodiment, fragment processor(s) 1315A-1315N are optimized to execute fragment shader programs as provided for in an OpenGL API, which may be used to perform similar operations as a pixel shader program as provided for in a Direct 3D API.

In at least one embodiment, graphics processor 1310 additionally includes one or more memory management units (MMUs) 1320A-1320B, cache(s) 1325A-1325B, and circuit interconnect(s) 1330A-1330B. In at least one embodiment, one or more MMU(s) 1320A-1320B provide for virtual to physical address mapping for graphics processor 1310, including for vertex processor 1305 and/or fragment processor(s) 1315A-1315N, which may reference vertex or image/texture data stored in memory, in addition to vertex or image/texture data stored in one or more cache(s) 1325A-1325B. In at least one embodiment, one or more MMU(s) 1320A-1320B may be synchronized with other MMUs within system, including one or more MMUs associated with one or more application processor(s) 1205, image processors 1215, and/or video processors 1220 of FIG. 12, such that each processor 1205-1220 can participate in a shared or unified virtual memory system. In at least one embodiment, one or more circuit interconnect(s) 1330A-1330B enable graphics processor 1310 to interface with other IP cores within SoC, either via an internal bus of SoC or via a direct connection.

In at least one embodiment, graphics processor 1340 includes one or more MMU(s) 1320A-1320B, cache(s) 1325A-1325B, and circuit interconnect(s) 1330A-1330B of graphics processor 1310 of FIG. 13A. In at least one embodiment, graphics processor 1340 includes one or more shader core(s) 1355A-1355N (e.g., 1355A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in integrated circuit 13A and/or 13B for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 14A:
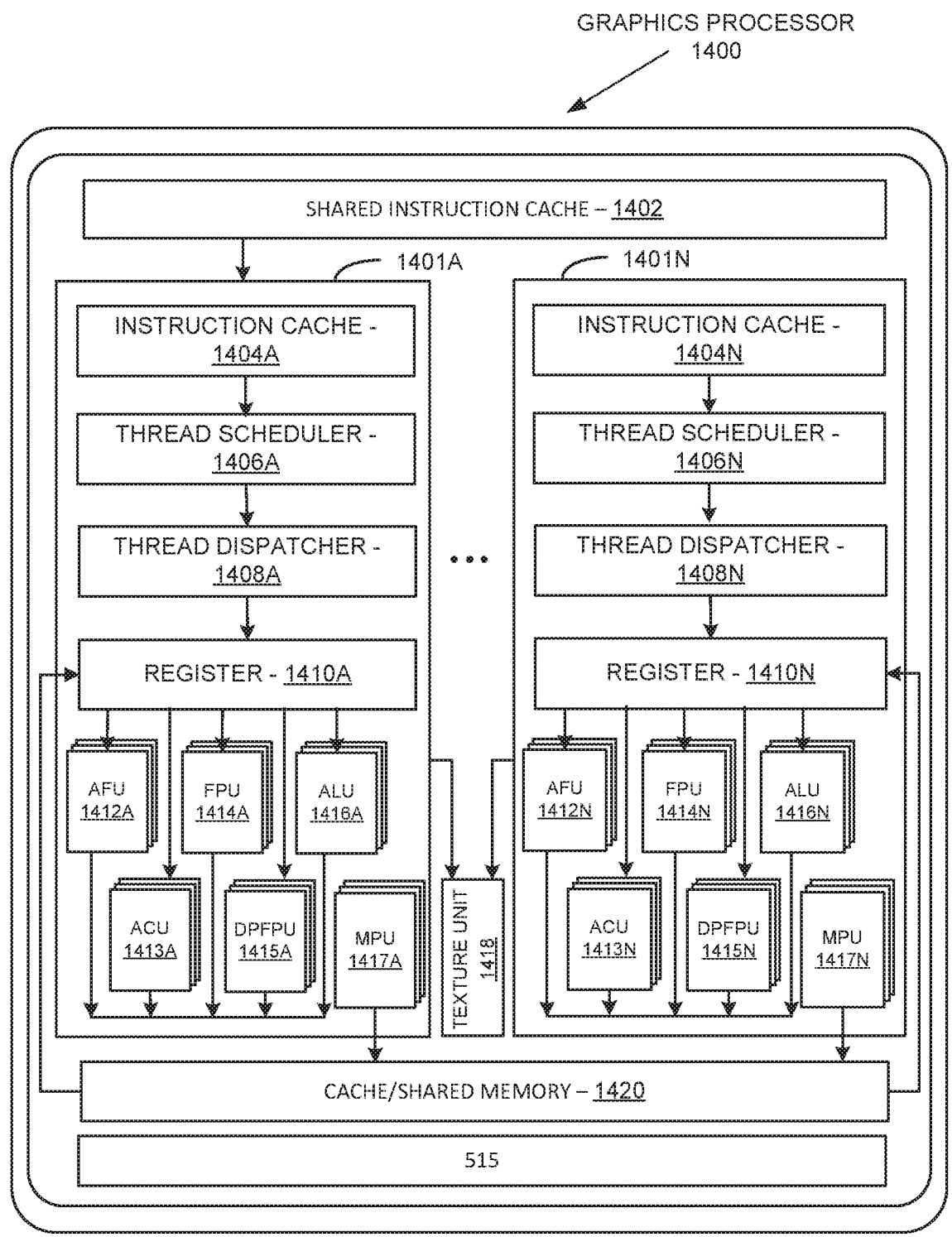
FIGS. 14A-14B illustrate additional exemplary graphics processor logic, according to at least one embodiment.
Figure 14B:
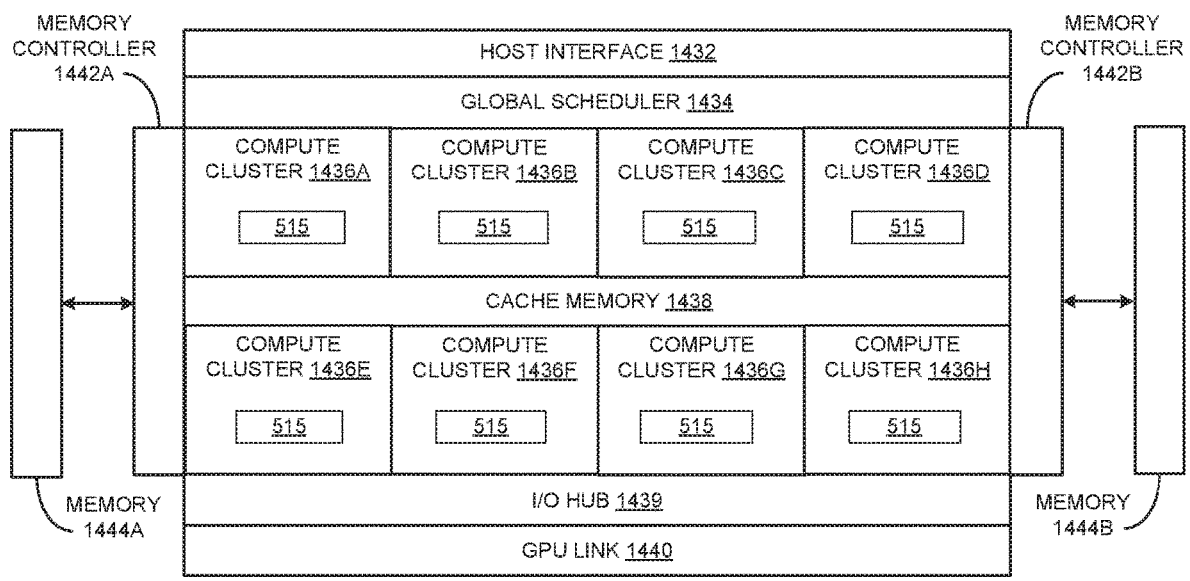

FIGS. 14A-14B illustrate additional exemplary graphics processor logic according to embodiments described herein. FIG. 14A illustrates a graphics core 1400 that may be included within graphics processor 1210 of FIG. 12, in at least one embodiment, and may be a unified shader core 1355A-1355N as in FIG. 13B in at least one embodiment. FIG. 14B illustrates a highly-parallel general-purpose graphics processing unit 1430 suitable for deployment on a multi-chip module in at least one embodiment.

In at least one embodiment, graphics core 1400 includes a shared instruction cache 1402, a texture unit 1418, and a cache/shared memory 1420 that are common to execution resources within graphics core 1400. In at least one embodiment, graphics core 1400 can include multiple slices 1401A-1401N or partition for each core, and a graphics processor can include multiple instances of graphics core 1400. Slices 1401A-1401N can include support logic including a local instruction cache 1404A-1404N, a thread scheduler 1406A-1406N, a thread dispatcher 1408A-1408N, and a set of registers 1410A-1410N. In at least one embodiment, slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

In at least one embodiment, FPUs 1414A-1414N can perform single-precision (32-bit) and half-precision (16-bit) floating point operations, while DPFPUs 1415A-1415N perform double precision (64-bit) floating point operations. In at least one embodiment, ALUs 1416A-1416N can perform variable precision integer operations at 8-bit, 16-bit, and 32-bit precision, and can be configured for mixed precision operations. In at least one embodiment, MPUs 1417A-1417N can also be configured for mixed precision matrix operations, including half-precision floating point and 8-bit integer operations. In at least one embodiment, MPUs 1417A-1417N can perform a variety of matrix operations to accelerate machine learning application frameworks, including enabling support for accelerated general matrix to matrix multiplication (GEMM). In at least one embodiment, AFUs 1412A-1412N can perform additional logic operations not supported by floating-point or integer units, including trigonometric operations (e.g., Sine, Cosine, etc.).

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in graphics core 1400 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

FIG. 14B illustrates a general-purpose processing unit (GPGPU) 1430 that can be configured to enable highly-parallel compute operations to be performed by an array of graphics processing units, in at least one embodiment. In at least one embodiment, GPGPU 1430 can be linked directly to other instances of GPGPU 1430 to create a multi-GPU cluster to improve training speed for deep neural networks. In at least one embodiment, GPGPU 1430 includes a host interface 1432 to enable a connection with a host processor. In at least one embodiment, host interface 1432 is a PCI Express interface. In at least one embodiment, host interface 1432 can be a vendor specific communications interface or communications fabric. In at least one embodiment, GPGPU 1430 receives commands from a host processor and uses a global scheduler 1434 to distribute execution threads associated with those commands to a set of compute clusters 1436A-1436H. In at least one embodiment, compute clusters 1436A-1436H share a cache memory 1438. In at least one embodiment, cache memory 1438 can serve as a higher-level cache for cache memories within compute clusters 1436A-1436H.

In at least one embodiment, GPGPU 1430 includes memory 1444A-1444B coupled with compute clusters 1436A-1436H via a set of memory controllers 1442A-1442B. In at least one embodiment, memory 1444A-1444B can include various types of memory devices including dynamic random access memory (DRAM) or graphics random access memory, such as synchronous graphics random access memory (SGRAM), including graphics double data rate (GDDR) memory.

In at least one embodiment, compute clusters 1436A-1436H each include a set of graphics cores, such as graphics core 1400 of FIG. 14A, which can include multiple types of integer and floating point logic units that can perform computational operations at a range of precisions including suited for machine learning computations. For example, in at least one embodiment, at least a subset of floating point units in each of compute clusters 1436A-1436H can be configured to perform 16-bit or 32-bit floating point operations, while a different subset of floating point units can be configured to perform 64-bit floating point operations.

In at least one embodiment, multiple instances of GPGPU 1430 can be configured to operate as a compute cluster. In at least one embodiment, communication used by compute clusters 1436A-1436H for synchronization and data exchange varies across embodiments. In at least one embodiment, multiple instances of GPGPU 1430 communicate over host interface 1432. In at least one embodiment, GPGPU 1430 includes an I/O hub 1439 that couples GPGPU 1430 with a GPU link 1440 that enables a direct connection to other instances of GPGPU 1430. In at least one embodiment, GPU link 1440 is coupled to a dedicated GPU-to-GPU bridge that enables communication and synchronization between multiple instances of GPGPU 1430. In at least one embodiment, GPU link 1440 couples with a high speed interconnect to transmit and receive data to other GPGPUs or parallel processors. In at least one embodiment, multiple instances of GPGPU 1430 are located in separate data processing systems and communicate via a network device that is accessible via host interface 1432. In at least one embodiment GPU, link 1440 can be configured to enable a connection to a host processor in addition to or as an alternative to host interface 1432.

In at least one embodiment, GPGPU 1430 can be configured to train neural networks. In at least one embodiment, GPGPU 1430 can be used within a inferencing platform. In at least one embodiment, in which GPGPU 1430 is used for inferencing, GPGPU may include fewer compute clusters 1436A-1436H relative to when GPGPU is used for training a neural network. In at least one embodiment, memory technology associated with memory 1444A-1444B may differ between inferencing and training configurations, with higher bandwidth memory technologies devoted to training configurations. In at least one embodiment, inferencing configuration of GPGPU 1430 can support inferencing specific instructions. For example, in at least one embodiment, an inferencing configuration can provide support for one or more 8-bit integer dot product instructions, which may be used during inferencing operations for deployed neural networks.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in GPGPU 1430 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 15:
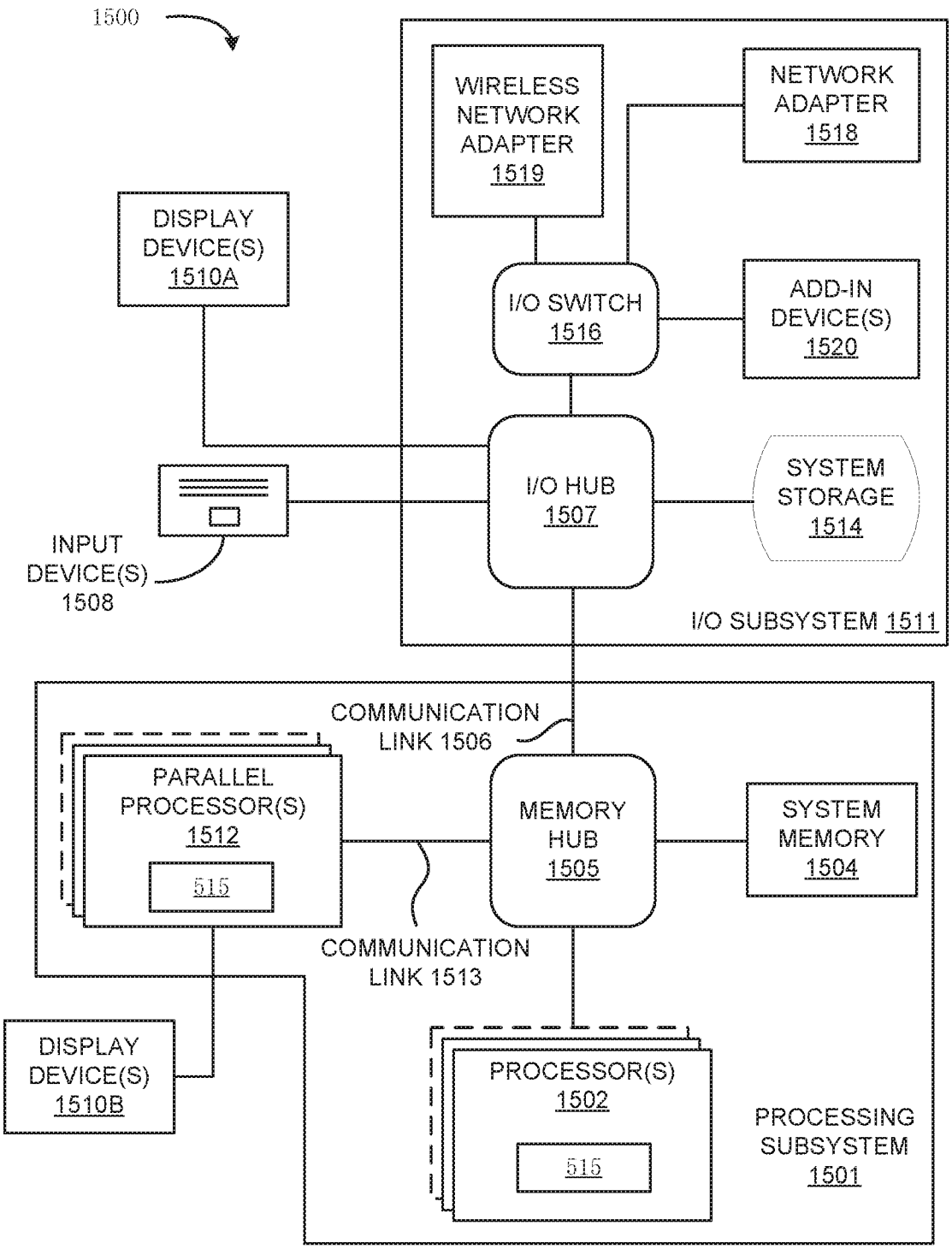
FIG. 15 illustrates a computer system, according to at least one embodiment.

FIG. 15 is a block diagram illustrating a computing system 1500 according to at least one embodiment. In at least one embodiment, computing system 1500 includes a processing subsystem 1501 having one or more processor(s) 1502 and a system memory 1504 communicating via an interconnection path that may include a memory hub 1505. In at least one embodiment, memory hub 1505 may be a separate component within a chipset component or may be integrated within one or more processor(s) 1502. In at least one embodiment, memory hub 1505 couples with an I/O subsystem 1511 via a communication link 1506. In at least one embodiment, I/O subsystem 1511 includes an I/O hub 1507 that can enable computing system 1500 to receive input from one or more input device(s) 1508. In at least one embodiment, I/O hub 1507 can enable a display controller, which may be included in one or more processor(s) 1502, to provide outputs to one or more display device(s) 1510A. In at least one embodiment, one or more display device(s) 1510A coupled with I/O hub 1507 can include a local, internal, or embedded display device.

In at least one embodiment, processing subsystem 1501 includes one or more parallel processor(s) 1512 coupled to memory hub 1505 via a bus or other communication link 1513. In at least one embodiment, communication link 1513 may be one of any number of standards based communication link technologies or protocols, such as, but not limited to PCI Express, or may be a vendor specific communications interface or communications fabric. In at least one embodiment, one or more parallel processor(s) 1512 form a computationally focused parallel or vector processing system that can include a large number of processing cores and/or processing clusters, such as a many integrated core (MIC) processor. In at least one embodiment, one or more parallel processor(s) 1512 form a graphics processing subsystem that can output pixels to one of one or more display device(s) 1510A coupled via I/O Hub 1507. In at least one embodiment, one or more parallel processor(s) 1512 can also include a display controller and display interface (not shown) to enable a direct connection to one or more display device(s) 1510B.

In at least one embodiment, a system storage unit 1514 can connect to I/O hub 1507 to provide a storage mechanism for computing system 1500. In at least one embodiment, an I/O switch 1516 can be used to provide an interface mechanism to enable connections between I/O hub 1507 and other components, such as a network adapter 1518 and/or wireless network adapter 1519 that may be integrated into a platform(s), and various other devices that can be added via one or more add-in device(s) 1520. In at least one embodiment, network adapter 1518 can be an Ethernet adapter or another wired network adapter. In at least one embodiment, wireless network adapter 1519 can include one or more of a Wi-Fi, Bluetooth, near field communication (NFC), or other network device that includes one or more wireless radios.

In at least one embodiment, computing system 1500 can include other components not explicitly shown, including USB or other port connections, optical storage drives, video capture devices, and so on, may also be connected to I/O hub 1507. In at least one embodiment, communication paths interconnecting various components in FIG. 15 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 1512 incorporate circuitry optimized for graphics and video processing, including, for example, video output circuitry, and constitutes a graphics processing unit (GPU). In at least one embodiment, one or more parallel processor(s) 1512 incorporate circuitry optimized for general purpose processing. In at least one embodiment, components of computing system 1500 may be integrated with one or more other system elements on a single integrated circuit. For example, in at least one embodiment, one or more parallel processor(s) 1512, memory hub 1505, processor(s) 1502, and I/O hub 1507 can be integrated into a system on chip (SoC) integrated circuit. In at least one embodiment, components of computing system 1500 can be integrated into a single package to form a system in package (SIP) configuration. In at least one embodiment, at least a portion of components of computing system 1500 can be integrated into a multi-chip module (MCM), which can be interconnected with other multi-chip modules into a modular computing system.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in system FIG. 1500 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Processors

Figure 16A:
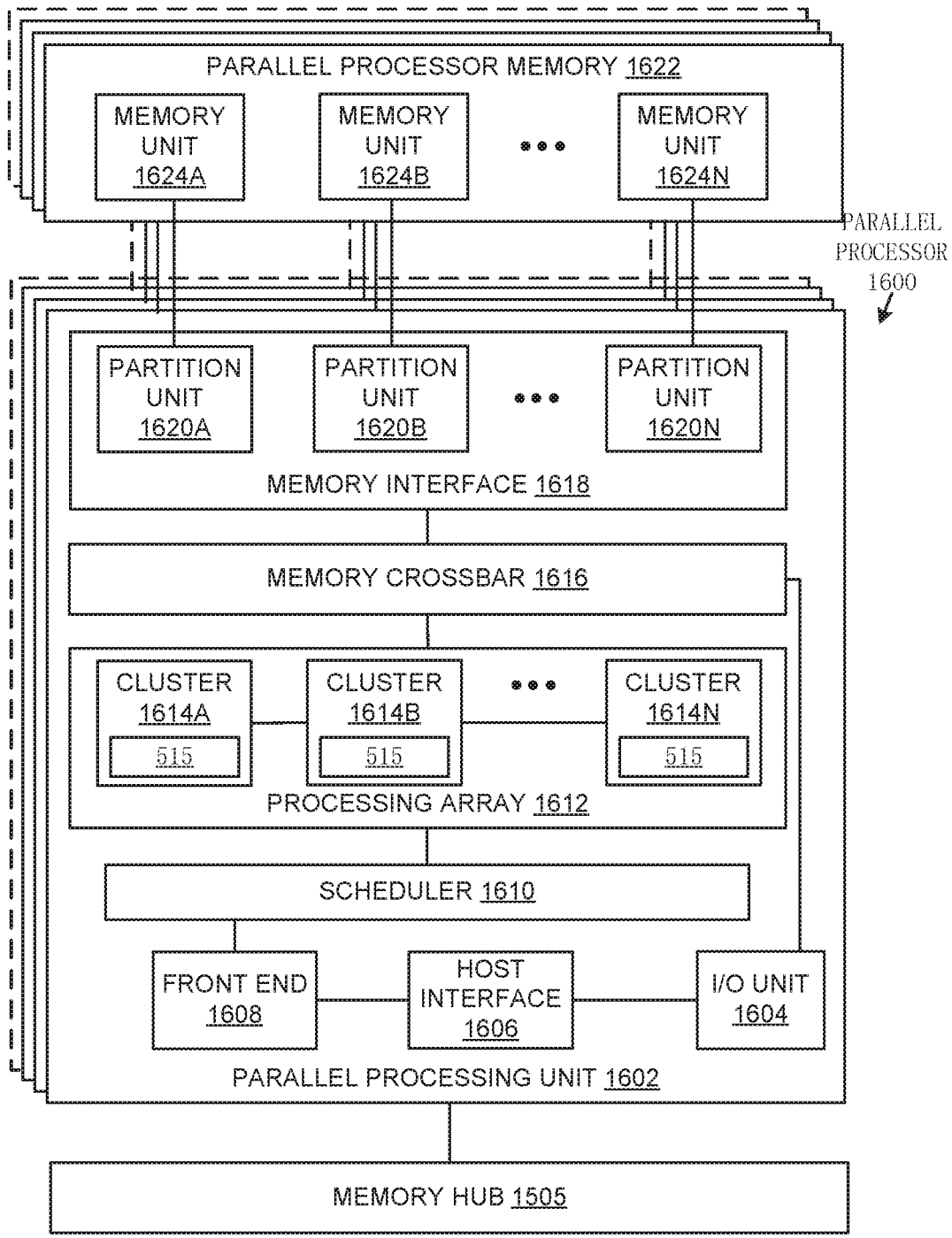
FIG. 16A illustrates a parallel processor, according to at least one embodiment.

FIG. 16A illustrates a parallel processor 1600 according to at least one embodiment. In at least one embodiment, various components of parallel processor 1600 may be implemented using one or more integrated circuit devices, such as programmable processors, application specific integrated circuits (ASICs), or field programmable gate arrays (FPGA). In at least one embodiment, illustrated parallel processor 1600 is a variant of one or more parallel processor(s) 1512 shown in FIG. 15 according to an exemplary embodiment.

In at least one embodiment, parallel processor 1600 includes a parallel processing unit 1602. In at least one embodiment, parallel processing unit 1602 includes an I/O unit 1604 that enables communication with other devices, including other instances of parallel processing unit 1602. In at least one embodiment, I/O unit 1604 may be directly connected to other devices. In at least one embodiment, I/O unit 1604 connects with other devices via use of a hub or switch interface, such as memory hub 1505. In at least one embodiment, connections between memory hub 1505 and I/O unit 1604 form a communication link 1513. In at least one embodiment, I/O unit 1604 connects with a host interface 1606 and a memory crossbar 1616, where host interface 1606 receives commands directed to performing processing operations and memory crossbar 1616 receives commands directed to performing memory operations.

In at least one embodiment, when host interface 1606 receives a command buffer via I/O unit 1604, host interface 1606 can direct work operations to perform those commands to a front end 1608. In at least one embodiment, front end 1608 couples with a scheduler 1610, which is configured to distribute commands or other work items to a processing cluster array 1612. In at least one embodiment, scheduler 1610 ensures that processing cluster array 1612 is properly configured and in a valid state before tasks are distributed to processing cluster array 1612. In at least one embodiment, scheduler 1610 is implemented via firmware logic executing on a microcontroller. In at least one embodiment, microcontroller implemented scheduler 1610 is configurable to perform complex scheduling and work distribution operations at coarse and fine granularity, enabling rapid preemption and context switching of threads executing on processing array 1612. In at least one embodiment, host software can prove workloads for scheduling on processing array 1612 via one of multiple graphics processing doorbells. In at least one embodiment, workloads can then be automatically distributed across processing array 1612 by scheduler 1610 logic within a microcontroller including scheduler 1610.

In at least one embodiment, processing cluster array 1612 can include up to "N" processing clusters (e.g., cluster 1614A, cluster 1614B, through cluster 1614N). In at least one embodiment, each cluster 1614A-1614N of processing cluster array 1612 can execute a large number of concurrent threads. In at least one embodiment, scheduler 1610 can allocate work to clusters 1614A-1614N of processing cluster array 1612 using various scheduling and/or work distribution algorithms, which may vary depending on workload arising for each type of program or computation. In at least one embodiment, scheduling can be handled dynamically by scheduler 1610, or can be assisted in part by compiler logic during compilation of program logic configured for execution by processing cluster array 1612. In at least one embodiment, different clusters 1614A-1614N of processing cluster array 1612 can be allocated for processing different types of programs or for performing different types of computations.

In at least one embodiment, processing cluster array 1612 can be configured to perform various types of parallel processing operations. In at least one embodiment, processing cluster array 1612 is configured to perform general-purpose parallel compute operations. For example, in at least one embodiment, processing cluster array 1612 can include logic to execute processing tasks including filtering of video and/or audio data, performing modeling operations, including physics operations, and performing data transformations.

In at least one embodiment, processing cluster array 1612 is configured to perform parallel graphics processing operations. In at least one embodiment, processing cluster array 1612 can include additional logic to support execution of such graphics processing operations, including, but not limited to texture sampling logic to perform texture operations, as well as tessellation logic and other vertex processing logic. In at least one embodiment, processing cluster array 1612 can be configured to execute graphics processing related shader programs such as, but not limited to vertex shaders, tessellation shaders, geometry shaders, and pixel shaders. In at least one embodiment, parallel processing unit 1602 can transfer data from system memory via I/O unit 1604 for processing. In at least one embodiment, during processing, transferred data can be stored to on-chip memory (e.g., parallel processor memory 1622) during processing, then written back to system memory.

In at least one embodiment, when parallel processing unit 1602 is used to perform graphics processing, scheduler 1610 can be configured to divide a processing workload into approximately equal sized tasks, to better enable distribution of graphics processing operations to multiple clusters 1614A-1614N of processing cluster array 1612. In at least one embodiment, portions of processing cluster array 1612 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1614A-1614N may be stored in buffers to allow intermediate data to be transmitted between clusters 1614A-1614N for further processing.

In at least one embodiment, processing cluster array 1612 can receive processing tasks to be executed via scheduler 1610, which receives commands defining processing tasks from front end 1608. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1610 may be configured to fetch indices corresponding to tasks or may receive indices from front end 1608. In at least one embodiment, front end 1608 can be configured to ensure processing cluster array 1612 is configured to a valid state before a workload specified by incoming command buffers (e.g., batch-buffers, push buffers, etc.) is initiated.

In at least one embodiment, each of one or more instances of parallel processing unit 1602 can couple with parallel processor memory 1622. In at least one embodiment, parallel processor memory 1622 can be accessed via memory crossbar 1616, which can receive memory requests from processing cluster array 1612 as well as I/O unit 1604. In at least one embodiment, memory crossbar 1616 can access parallel processor memory 1622 via a memory interface 1618. In at least one embodiment, memory interface 1618 can include multiple partition units (e.g., partition unit 1620A, partition unit 1620B, through partition unit 1620N) that can each couple to a portion (e.g., memory unit) of parallel processor memory 1622. In at least one embodiment, a number of partition units 1620A-1620N is configured to be equal to a number of memory units, such that a first partition unit 1620A has a corresponding first memory unit 1624A, a second partition unit 1620B has a corresponding memory unit 1624B, and a Nth partition unit 1620N has a corresponding Nth memory unit 1624N. In at least one embodiment, a number of partition units 1620A-1620N may not be equal to a number of memory devices.

In at least one embodiment, memory units 1624A-1624N can include various types of memory devices, including dynamic random access memory (DRAM) or graphics random access memory, such as synchronous graphics random access memory (SGRAM), including graphics double data rate (GDDR) memory. In at least one embodiment, memory units 1624A-1624N may also include 3D stacked memory, including but not limited to high bandwidth memory (HBM). In at least one embodiment, render targets, such as frame buffers or texture maps may be stored across memory units 1624A-1624N, allowing partition units 1620A-1620N to write portions of each render target in parallel to efficiently use available bandwidth of parallel processor memory 1622. In at least one embodiment, a local instance of parallel processor memory 1622 may be excluded in favor of a unified memory design that utilizes system memory in conjunction with local cache memory.

In at least one embodiment, any one of clusters 1614A-1614N of processing cluster array 1612 can process data that will be written to any of memory units 1624A-1624N within parallel processor memory 1622. In at least one embodiment, memory crossbar 1616 can be configured to transfer an output of each cluster 1614A-1614N to any partition unit 1620A-1620N or to another cluster 1614A-1614N, which can perform additional processing operations on an output. In at least one embodiment, each cluster 1614A-1614N can communicate with memory interface 1618 through memory crossbar 1616 to read from or write to various external memory devices. In at least one embodiment, memory crossbar 1616 has a connection to memory interface 1618 to communicate with I/O unit 1604, as well as a connection to a local instance of parallel processor memory 1622, enabling processing units within different processing clusters 1614A-1614N to communicate with system memory or other memory that is not local to parallel processing unit 1602. In at least one embodiment, memory crossbar 1616 can use virtual channels to separate traffic streams between clusters 1614A-1614N and partition units 1620A-1620N.

In at least one embodiment, multiple instances of parallel processing unit 1602 can be provided on a single add-in card, or multiple add-in cards can be interconnected. In at least one embodiment, different instances of parallel processing unit 1602 can be configured to inter-operate even if different instances have different numbers of processing cores, different amounts of local parallel processor memory, and/or other configuration differences. For example, in at least one embodiment, some instances of parallel processing unit 1602 can include higher precision floating point units relative to other instances. In at least one embodiment, systems incorporating one or more instances of parallel processing unit 1602 or parallel processor 1600 can be implemented in a variety of configurations and form factors, including but not limited to desktop, laptop, or handheld personal computers, servers, workstations, game consoles, and/or embedded systems.

Figure 16B:
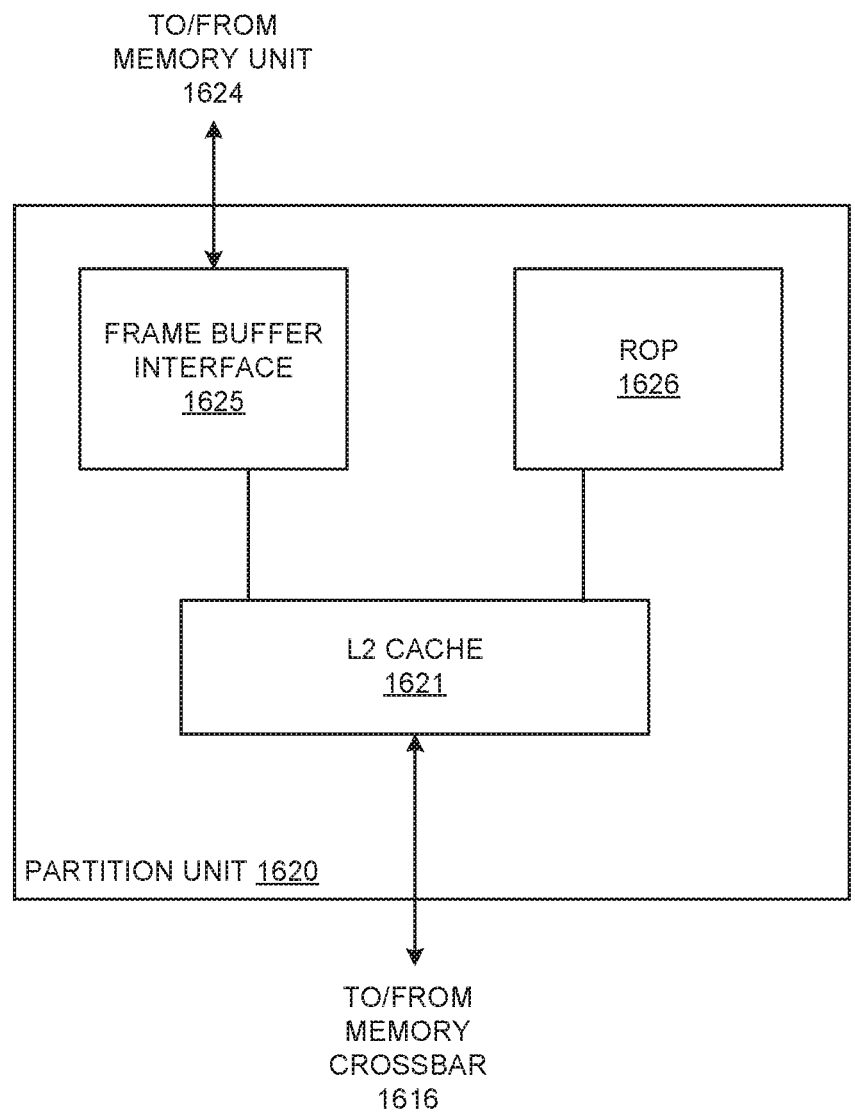
FIG. 16B illustrates a partition unit, according to at least one embodiment.

FIG. 16B is a block diagram of a partition unit 1620 according to at least one embodiment. In at least one embodiment, partition unit 1620 is an instance of one of partition units 1620A-1620N of FIG. 16A. In at least one embodiment, partition unit 1620 includes an L2 cache 1621, a frame buffer interface 1625, and a raster operations unit ("ROP") 1626. L2 cache 1621 is a read/write cache that is configured to perform load and store operations received from memory crossbar 1616 and ROP 1626. In at least one embodiment, read misses and urgent write-back requests are output by L2 cache 1621 to frame buffer interface 1625 for processing. In at least one embodiment, updates can also be sent to a frame buffer via frame buffer interface 1625 for processing. In at least one embodiment, frame buffer interface 1625 interfaces with one of memory units in parallel processor memory, such as memory units 1624A-1624N of FIG. 16 (e.g., within parallel processor memory 1622).

In at least one embodiment, ROP 1626 is a processing unit that performs raster operations such as stencil, z test, blending, and so forth. In at least one embodiment, ROP 1626 then outputs processed graphics data that is stored in graphics memory. In at least one embodiment, ROP 1626 includes compression logic to compress depth or color data that is written to memory and decompress depth or color data that is read from memory. In at least one embodiment, compression logic can be lossless compression logic that makes use of one or more of multiple compression algorithms. Compression logic that is performed by ROP 1626 can vary based on statistical characteristics of data to be compressed. For example, in at least one embodiment, delta color compression is performed on depth and color data on a per-tile basis.

In at least one embodiment, ROP 1626 is included within each processing cluster (e.g., cluster 1614A-1614N of FIG. 16A) instead of within partition unit 1620. In at least one embodiment, read and write requests for pixel data are transmitted over memory crossbar 1616 instead of pixel fragment data. In at least one embodiment, processed graphics data may be displayed on a display device, such as one of one or more display device(s) 1510 of FIG. 15, routed for further processing by processor(s) 1502, or routed for further processing by one of processing entities within parallel processor 1600 of FIG. 16A.

Figure 16C:
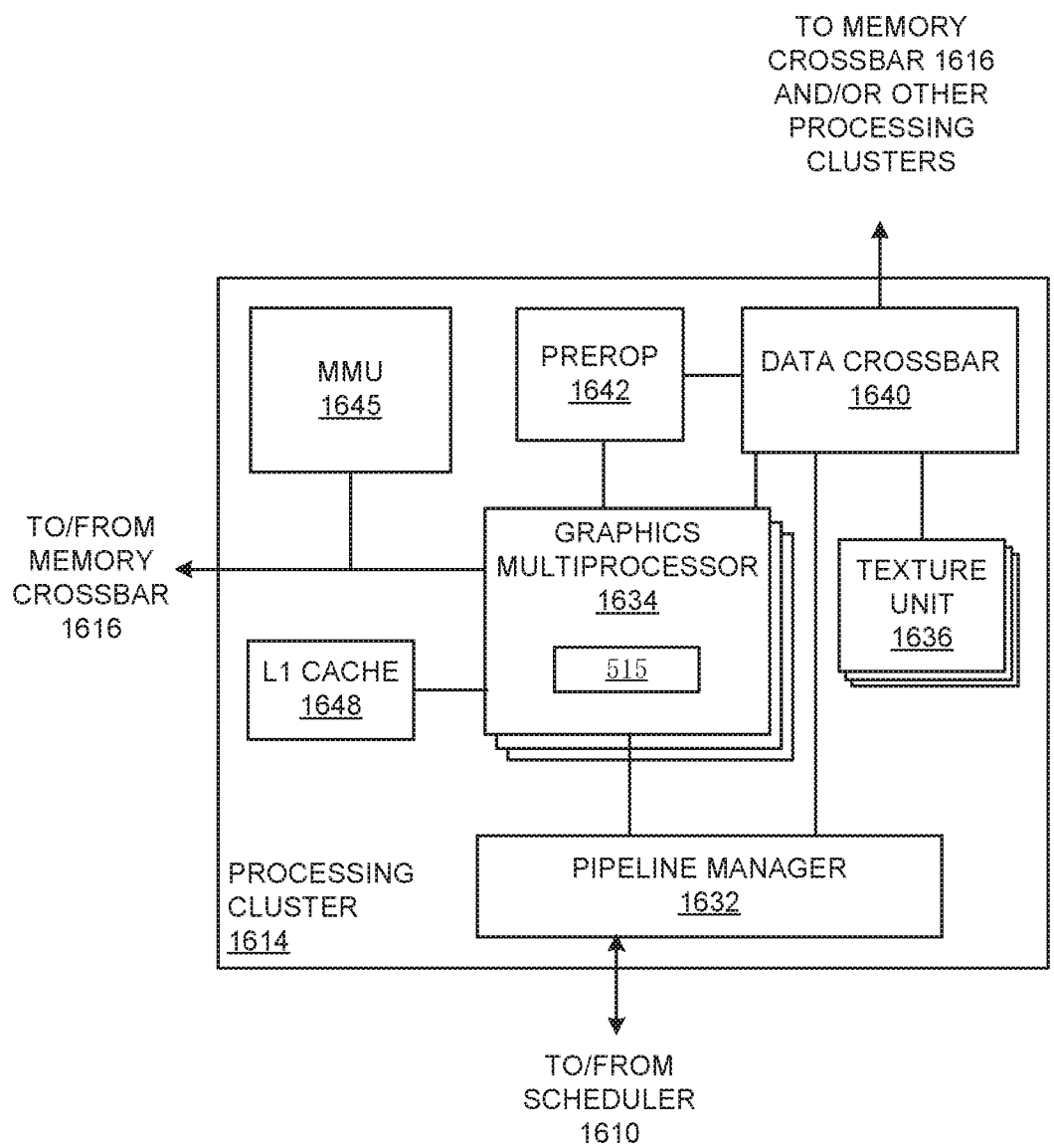
FIG. 16C illustrates a processing cluster, according to at least one embodiment.

FIG. 16C is a block diagram of a processing cluster 1614 within a parallel processing unit according to at least one embodiment. In at least one embodiment, a processing cluster is an instance of one of processing clusters 1614A-1614N of FIG. 16A. In at least one embodiment, one of more of processing cluster(s) 1614 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 1614 can be controlled via a pipeline manager 1632 that distributes processing tasks to SIMT parallel processors. In at least one embodiment, pipeline manager 1632 receives instructions from scheduler 1610 of FIG. 16A and manages execution of those instructions via a graphics multiprocessor 1634 and/or a texture unit 1636. In at least one embodiment, graphics multiprocessor 1634 is an exemplary instance of a SIMT parallel processor. However, in at least one embodiment, various types of SIMT parallel processors of differing architectures may be included within processing cluster 1614. In at least one embodiment, one or more instances of graphics multiprocessor 1634 can be included within a processing cluster 1614. In at least one embodiment, graphics multiprocessor 1634 can process data and a data crossbar 1640 can be used to distribute processed data to one of multiple possible destinations, including other shader units. In at least one embodiment, pipeline manager 1632 can facilitate distribution of processed data by specifying destinations for processed data to be distributed vis data crossbar 1640.

In at least one embodiment, each graphics multiprocessor 1634 within processing cluster 1614 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1614 constitute a thread. In at least one embodiment, a set of threads executing across a set of parallel processing engines is a thread group. In at least one embodiment, thread group executes a program on different input data. In at least one embodiment, each thread within a thread group can be assigned to a different processing engine within a graphics multiprocessor 1634. In at least one embodiment, a thread group may include fewer threads than a number of processing engines within graphics multiprocessor 1634. In at least one embodiment, when a thread group includes fewer threads than a number of processing engines, one or more processing engines may be idle during cycles in which that thread group is being processed. In at least one embodiment, a thread group may also include more threads than a number of processing engines within graphics multiprocessor 1634. In at least one embodiment, when a thread group includes more threads than processing engines within graphics multiprocessor 1634, processing can be performed over consecutive clock cycles. In at least one embodiment, multiple thread groups can be executed concurrently on a graphics multiprocessor 1634.

In at least one embodiment, graphics multiprocessor 1634 includes an internal cache memory to perform load and store operations. In at least one embodiment, graphics multiprocessor 1634 can forego an internal cache and use a cache memory (e.g., L1 cache 1648) within processing cluster 1614. In at least one embodiment, each graphics multiprocessor 1634 also has access to L2 caches within partition units (e.g., partition units 1620A-1620N of FIG. 16A) that are shared among all processing clusters 1614 and may be used to transfer data between threads. In at least one embodiment, graphics multiprocessor 1634 may also access off-chip global memory, which can include one or more of local parallel processor memory and/or system memory. In at least one embodiment, any memory external to parallel processing unit 1602 may be used as global memory. In at least one embodiment, processing cluster 1614 includes multiple instances of graphics multiprocessor 1634 can share common instructions and data, which may be stored in L1 cache 1648.

In at least one embodiment, each processing cluster 1614 may include a memory management unit ("MMU") 1645 that is configured to map virtual addresses into physical addresses. In at least one embodiment, one or more instances of MMU 1645 may reside within memory interface 1618 of FIG. 16A. In at least one embodiment, MMU 1645 includes a set of page table entries (PTEs) used to map a virtual address to a physical address of a tile and optionally a cache line index. In at least one embodiment, MMU 1645 may include address translation lookaside buffers (TLB) or caches that may reside within graphics multiprocessor 1634 or L1 cache or processing cluster 1614. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 1614 may be configured such that each graphics multiprocessor 1634 is coupled to a texture unit 1636 for performing texture mapping operations, e.g., determining texture sample positions, reading texture data, and filtering texture data. In at least one embodiment, texture data is read from an internal texture L1 cache (not shown) or from an L1 cache within graphics multiprocessor 1634 and is fetched from an L2 cache, local parallel processor memory, or system memory, as needed. In at least one embodiment, each graphics multiprocessor 1634 outputs processed tasks to data crossbar 1640 to provide processed task(s) to another processing cluster 1614 for further processing or to store processed task(s) in an L2 cache, local parallel processor memory, or system memory via memory crossbar 1616. In at least one embodiment, preROP 1642 (pre-raster operations unit) is configured to receive data from graphics multiprocessor 1634, direct data to ROP units, which may be located with partition units as described herein (e.g., partition units 1620A-1620N of FIG. 16A). In at least one embodiment, PreROP 1642 unit can perform optimizations for color blending, organize pixel color data, and perform address translations.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in graphics processing cluster 1614 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 16D:
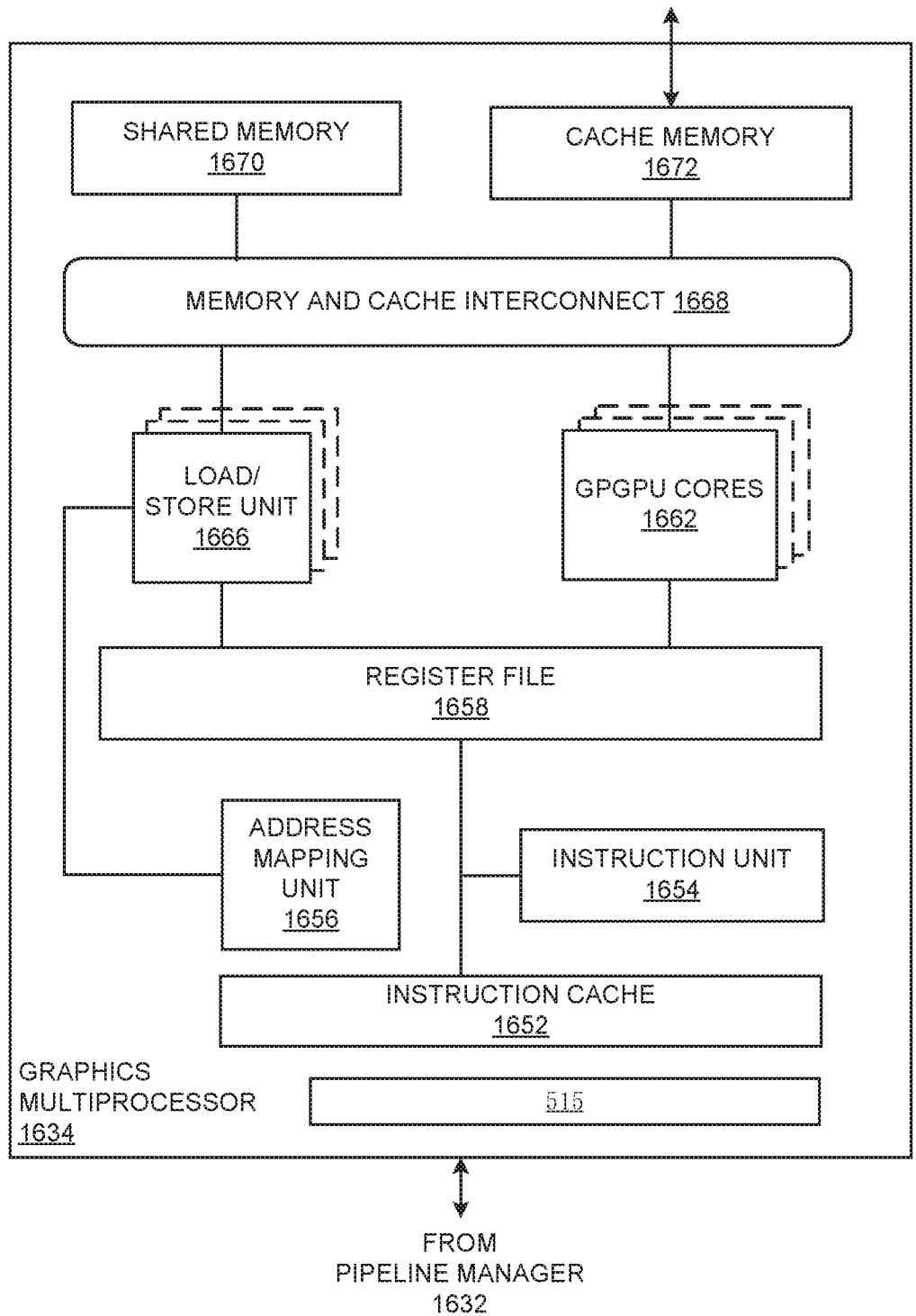
FIG. 16D illustrates a graphics multiprocessor, according to at least one embodiment.

FIG. 16D shows a graphics multiprocessor 1634 according to at least one embodiment. In at least one embodiment, graphics multiprocessor 1634 couples with pipeline manager 1632 of processing cluster 1614. In at least one embodiment, graphics multiprocessor 1634 has an execution pipeline including but not limited to an instruction cache 1652, an instruction unit 1654, an address mapping unit 1656, a register file 1658, one or more general purpose graphics processing unit (GPGPU) cores 1662, and one or more load/store units 1666. GPGPU core(s) 1662 and load/store unit(s) 1666 are coupled with cache memory 1672 and shared memory 1670 via a memory and cache interconnect 1668.

In at least one embodiment, instruction cache 1652 receives a stream of instructions to execute from pipeline manager 1632. In at least one embodiment, instructions are cached in instruction cache 1652 and dispatched for execution by instruction unit 1654. In at least one embodiment, instruction unit 1654 can dispatch instructions as thread groups (e.g., warps), with each thread group assigned to a different execution unit within GPGPU core(s) 1662. In at least one embodiment, an instruction can access any of a local, shared, or global address space by specifying an address within a unified address space. In at least one embodiment, address mapping unit 1656 can be used to translate addresses in a unified address space into a distinct memory address that can be accessed by load/store unit(s) 1666.

In at least one embodiment, register file 1658 provides a set of registers for functional units of graphics multiprocessor 1634. In at least one embodiment, register file 1658 provides temporary storage for operands connected to data paths of functional units (e.g., GPGPU cores 1662, load/store units 1666) of graphics multiprocessor 1634. In at least one embodiment, register file 1658 is divided between each of functional units such that each functional unit is allocated a dedicated portion of register file 1658. In at least one embodiment, register file 1658 is divided between different warps being executed by graphics multiprocessor 1634.

In at least one embodiment, GPGPU cores 1662 can each include floating point units (FPUs) and/or integer arithmetic logic units (ALUs) that are used to execute instructions of graphics multiprocessor 1634. GPGPU cores 1662 can be similar in architecture or can differ in architecture. In at least one embodiment, a first portion of GPGPU cores 1662 include a single precision FPU and an integer ALU while a second portion of GPGPU cores include a double precision FPU. In at least one embodiment, FPUs can implement IEEE 754-2008 standard for floating point arithmetic or enable variable precision floating point arithmetic. In at least one embodiment, graphics multiprocessor 1634 can additionally include one or more fixed function or special function units to perform specific functions such as copy rectangle or pixel blending operations. In at least one embodiment one or more of GPGPU cores can also include fixed or special function logic.

In at least one embodiment, GPGPU cores 1662 include SIMD logic capable of performing a single instruction on multiple sets of data. In at least one embodiment GPGPU cores 1662 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 1668 is an interconnect network that connects each functional unit of graphics multiprocessor 1634 to register file 1658 and to shared memory 1670. In at least one embodiment, memory and cache interconnect 1668 is a crossbar interconnect that allows load/store unit 1666 to implement load and store operations between shared memory 1670 and register file 1658. In at least one embodiment, register file 1658 can operate at a same frequency as GPGPU cores 1662, thus data transfer between GPGPU cores 1662 and register file 1658 is very low latency. In at least one embodiment, shared memory 1670 can be used to enable communication between threads that execute on functional units within graphics multiprocessor 1634. In at least one embodiment, cache memory 1672 can be used as a data cache for example, to cache texture data communicated between functional units and texture unit 1636. In at least one embodiment, shared memory 1670 can also be used as a program managed cache. In at least one embodiment, threads executing on GPGPU cores 1662 can programmatically store data within shared memory in addition to automatically cached data that is stored within cache memory 1672.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to host processor/cores over a bus or other interconnect (e.g., a high speed interconnect such as PCIe or NVLink). In at least one embodiment, GPU may be integrated on same package or chip as cores and communicatively coupled to cores over an internal processor bus/interconnect (i.e., internal to package or chip). In at least one embodiment, regardless of manner in which GPU is connected, processor cores may allocate work to GPU in form of sequences of commands/instructions contained in a work descriptor. In at least one embodiment, GPU then uses dedicated circuitry/logic for efficiently processing these commands/instructions.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in graphics multiprocessor 1634 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 17:
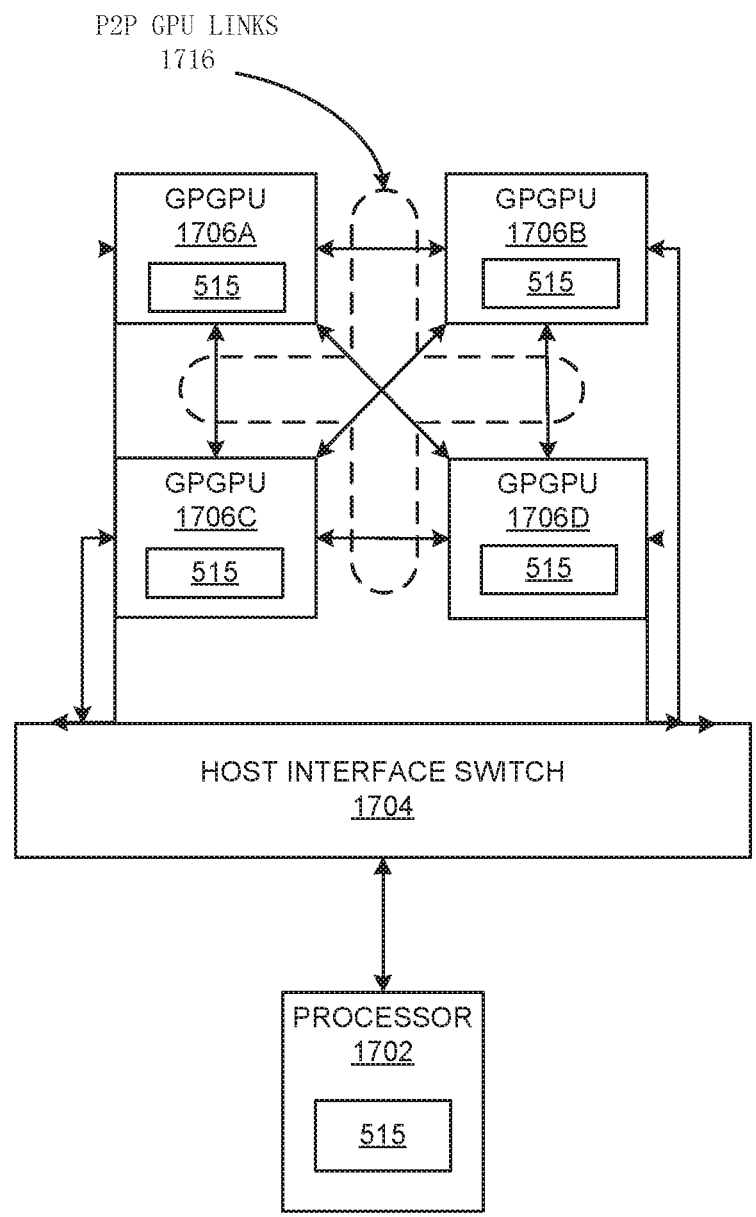
FIG. 17 illustrates a multi-graphics processing unit (GPU) system, according to at least one embodiment.

FIG. 17 illustrates a multi-GPU computing system 1700, according to at least one embodiment. In at least one embodiment, multi-GPU computing system 1700 can include a processor 1702 coupled to multiple general purpose graphics processing units (GPGPUs) 1706A-D via a host interface switch 1704. In at least one embodiment, host interface switch 1704 is a PCI express switch device that couples processor 1702 to a PCI express bus over which processor 1702 can communicate with GPGPUs 1706A-D. GPGPUs 1706A-D can interconnect via a set of high-speed point to point GPU to GPU links 1716. In at least one embodiment, GPU to GPU links 1716 connect to each of GPGPUs 1706A-D via a dedicated GPU link. In at least one embodiment, P2P GPU links 1716 enable direct communication between each of GPGPUs 1706A-D without requiring communication over host interface bus 1704 to which processor 1702 is connected. In at least one embodiment, with GPU-to-GPU traffic directed to P2P GPU links 1716, host interface bus 1704 remains available for system memory access or to communicate with other instances of multi-GPU computing system 1700, for example, via one or more network devices. While in at least one embodiment GPGPUs 1706A-D connect to processor 1702 via host interface switch 1704, in at least one embodiment processor 1702 includes direct support for P2P GPU links 1716 and can connect directly to GPGPUs 1706A-D.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in multi-GPU computing system 1700 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 18:
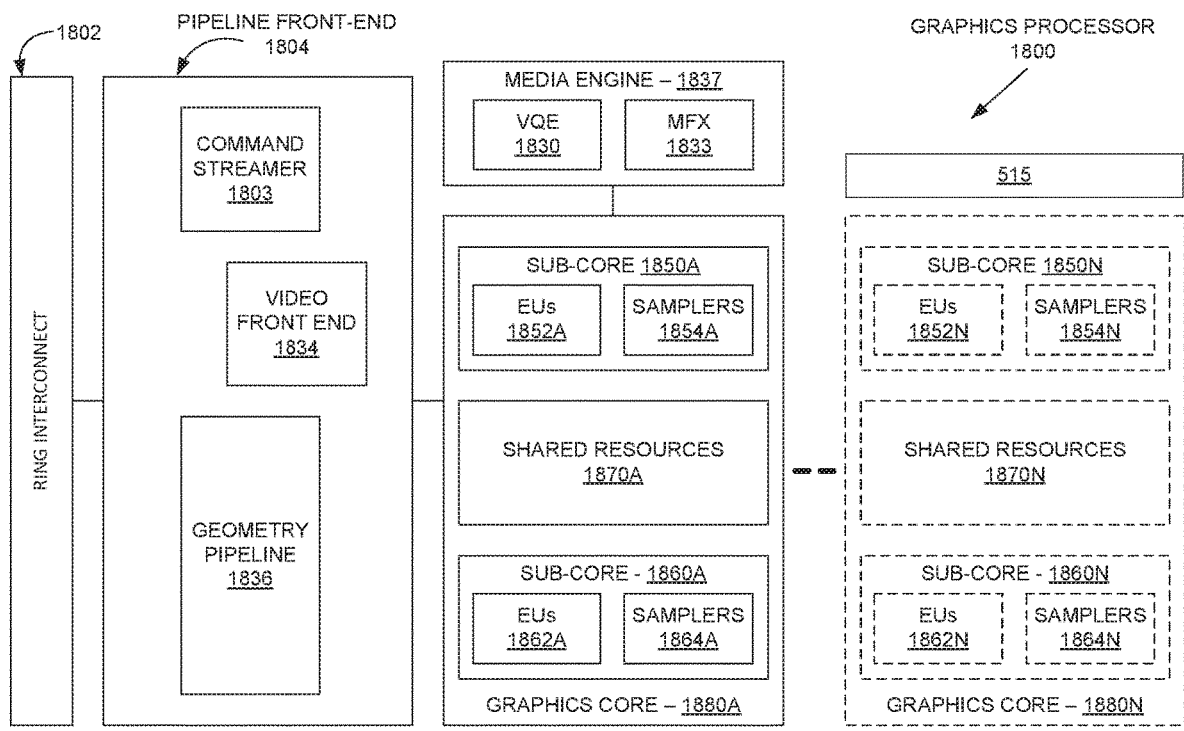
FIG. 18 illustrates a graphics processor, according to at least one embodiment.

FIG. 18 is a block diagram of a graphics processor 1800, according to at least one embodiment. In at least one embodiment, graphics processor 1800 includes a ring interconnect 1802, a pipeline front-end 1804, a media engine 1837, and graphics cores 1880A-1880N. In at least one embodiment, ring interconnect 1802 couples graphics processor 1800 to other processing units, including other graphics processors or one or more general-purpose processor cores. In at least one embodiment, graphics processor 1800 is one of many processors integrated within a multi-core processing system.

In at least one embodiment, graphics processor 1800 receives batches of commands via ring interconnect 1802. In at least one embodiment, incoming commands are interpreted by a command streamer 1803 in pipeline front-end 1804. In at least one embodiment, graphics processor 1800 includes scalable execution logic to perform 3D geometry processing and media processing via graphics core(s) 1880A-1880N. In at least one embodiment, for 3D geometry processing commands, command streamer 1803 supplies commands to geometry pipeline 1836. In at least one embodiment, for at least some media processing commands, command streamer 1803 supplies commands to a video front end 1834, which couples with a media engine 1837. In at least one embodiment, media engine 1837 includes a Video Quality Engine (VQE) 1830 for video and image postprocessing and a multi-format encode/decode (MFX) 1833 engine to provide hardware-accelerated media data encode and decode. In at least one embodiment, geometry pipeline 1836 and media engine 1837 each generate execution threads for thread execution resources provided by at least one graphics core 1880A.

In at least one embodiment, graphics processor 1800 includes scalable thread execution resources featuring modular cores 1880A-1880N (sometimes referred to as core slices), each having multiple sub-cores 1850A-1850N, 1860A-1860N (sometimes referred to as core sub-slices). In at least one embodiment, graphics processor 1800 can have any number of graphics cores 1880A through 1880N. In at least one embodiment, graphics processor 1800 includes a graphics core 1880A having at least a first sub-core 1850A and a second sub-core 1860A. In at least one embodiment, graphics processor 1800 is a low power processor with a single sub-core (e.g., 1850A). In at least one embodiment, graphics processor 1800 includes multiple graphics cores 1880A-1880N, each including a set of first sub-cores 1850A-1850N and a set of second sub-cores 1860A-1860N. In at least one embodiment, each sub-core in first sub-cores 1850A-1850N includes at least a first set of execution units 1852A-1852N and media/texture samplers 1854A-1854N. In at least one embodiment, each sub-core in second sub-cores 1860A-1860N includes at least a second set of execution units 1862A-1862N and samplers 1864A-1864N. In at least one embodiment, each sub-core 1850A-1850N, 1860A-1860N shares a set of shared resources 1870A-1870N. In at least one embodiment, shared resources include shared cache memory and pixel operation logic.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, inference and/or training logic 515 may be used in graphics processor 1800 for inferencing or predicting operations based, at least in part, on weight parameters calculated using neural network training operations, neural network functions and/or architectures, or neural network use cases described herein.

In at least one embodiment, such components can be used to manage communication links connecting processing devices. In at least one embodiment, this can include determining frequency states and power states for communication links between processors.

Figure 19:
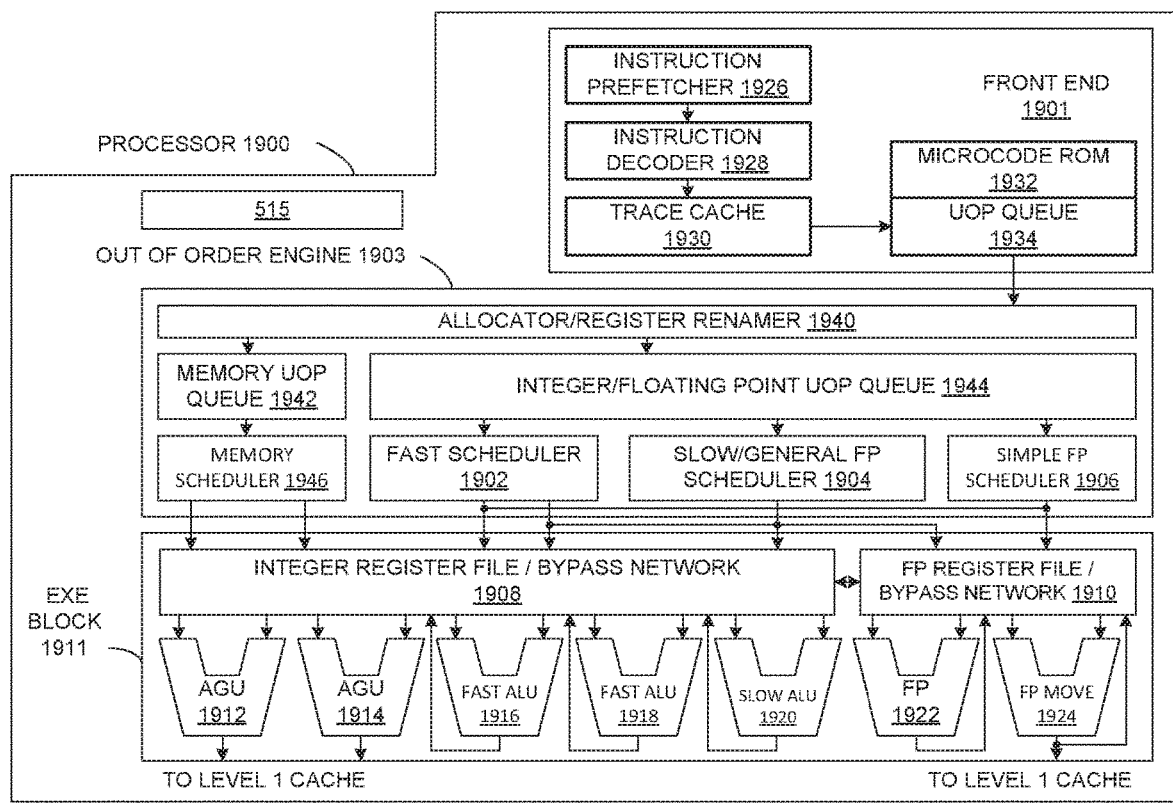
FIG. 19 illustrates a processor's micro-architecture, according to at least one embodiment.

FIG. 19 is a block diagram illustrating micro-architecture for a processor 1900 that may include logic circuits to perform instructions, according to at least one embodiment. In at least one embodiment, processor 1900 may perform instructions, including x86 instructions, ARM instructions, specialized instructions for application-specific integrated circuits (ASICs), etc. In at least one embodiment, processor 1900 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processor 1900 may perform instructions to accelerate machine learning or deep learning algorithms, training, or inferencing.

In at least one embodiment, processor 1900 includes an in-order front end ("front end") 1901 to fetch instructions to be executed and prepare instructions to be used later in processor pipeline. In at least one embodiment, front end 1901 may include several units. In at least one embodiment, an instruction prefetcher 1926 fetches instructions from memory and feeds instructions to an instruction decoder 1928 which in turn decodes or interprets instructions. For example, in at least one embodiment, instruction decoder 1928 decodes a received instruction into one or more operations called "micro-instructions" or "micro-operations" (also called "micro ops" or "uops") that machine may execute. In at least one embodiment, instruction decoder 1928 parses instruction into an opcode and corresponding data and control fields that may be used by micro-architecture to perform operations in accordance with at least one embodiment. In at least one embodiment, a trace cache 1930 may assemble decoded uops into program ordered sequences or traces in a uop queue 1934 for execution. In at least one embodiment, when trace cache 1930 encounters a complex instruction, a microcode ROM 1932 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 1928 may access microcode ROM 1932 to perform instruction. In at least one embodiment, an instruction may be decoded into a small number of micro-ops for processing at instruction decoder 1928. In at least one embodiment, an instruction may be stored within microcode ROM 1932 should a number of micro-ops be needed to accomplish operation. In at least one embodiment, trace cache 1930 refers to an entry point programmable logic array ("PLA") to determine a correct micro-instruction pointer for reading microcode sequences to complete one or more instructions from microcode ROM 1932 in accordance with at least one embodiment. In at least one embodiment, after microcode ROM 1932 finishes sequencing micro-ops for an instruction, front end 1901 of machine may resume fetching micro-ops from trace cache 1930.

In at least one embodiment, out-of-order execution engine ("out of order engine") 1903 may prepare instructions for execution. In at least one embodiment, out-of-order execution logic has a number of buffers to smooth out and re-order flow of instructions to optimize performance as they go down pipeline and get scheduled for execution. In at least one embodiment, out-of-order execution engine 1903 includes, without limitation, an allocator/register renamer 1940, a memory uop queue 1942, an integer/floating point uop queue 1944, a memory scheduler 1946, a fast scheduler 1902, a slow/general floating point scheduler ("slow/general FP scheduler") 1904, and a simple floating point scheduler ("simple FP scheduler") 1906. In at least one embodiment, fast schedule 1902, slow/general floating point scheduler 1904, and simple floating point scheduler 1906 are also collectively referred to herein as "uop schedulers 1902, 1904, 1906." In at least one embodiment, allocator/register renamer 1940 allocates machine buffers and resources that each uop needs in order to execute. In at least one embodiment, allocator/register renamer 1940 renames logic registers onto entries in a register file. In at least one embodiment, allocator/register renamer 1940 also allocates an entry for each uop in one of two uop queues, memory uop queue 1942 for memory operations and integer/floating point uop queue 1944 for non-memory operations, in front of memory scheduler 1946 and uop schedulers 1902, 1904, 1906. In at least one embodiment, uop schedulers 1902, 1904, 1906 determine when a uop is ready to execute based on readiness of their dependent input register operand sources and availability of execution resources uops need to complete their operation. In at least one embodiment, fast scheduler 1902 of at least one embodiment may schedule on each half of main clock cycle while slow/general floating point scheduler 1904 and simple floating point scheduler 1906 may schedule once per main processor clock cycle. In at least one embodiment, uop schedulers 1902, 1904, 1906 arbitrate for dispatch ports to schedule uops for execution.

In at least one embodiment, execution block 1911 includes, without limitation, an integer register file/bypass network 1908, a floating point register file/bypass network ("FP register file/bypass network") 1910, address generation units ("AGUs") 1912 and 1914, fast Arithmetic Logic Units (ALUs) ("fast ALUs") 1916 and 1918, a slow Arithmetic Logic Unit ("slow ALU") 1920, a floating point ALU ("FP") 1922, and a floating point move unit ("FP move") 1924. In at least one embodiment, integer register file/bypass network 1908 and floating point register file/bypass network 1910 are also referred to herein as "register files 1908, 1910." In at least one embodiment, AGUs 1912 and 1914, fast ALUs 1916 and 1918, slow ALU 1920, floating point ALU 1922, and floating point move unit 1924 are also referred to herein as "execution units 1912, 1914, 1916, 1918, 1920, 1922, and 1924." In at least one embodiment, execution block b11 may include, without limitation, any number (including zero) and type of register files, bypass networks, address generation units, and execution units, in any combination.

In at least one embodiment, register files 1908, 1910 may be arranged between uop schedulers 1902, 1904, 1906, and execution units 1912, 1914, 1916, 1918, 1920, 1922, and 1924. In at least one embodiment, integer register file/bypass network 1908 performs integer operations. In at least one embodiment, floating point register file/bypass network 1910 performs floating point operations. In at least one embodiment, each of register files 1908, 1910 may include, without limitation, a bypass network that may bypass or forward just completed results that have not yet been written into register file to new dependent uops. In at least one embodiment, register files 1908, 1910 may communicate data with each other. In at least one embodiment, integer register file/bypass network 1908 may include, without limitation, two separate register files, one register file for low-order thirty-two bits of data and a second register file for high order thirty-two bits of data. In at least one embodiment, floating point register file/bypass network 1910 may include, without limitation, 128-bit wide entries because floating point instructions typically have operands from 64 to 128 bits in width.

In at least one embodiment, execution units 1912, 1914, 1916, 1918, 1920, 1922, 1924 may execute instructions. In at least one embodiment, register files 1908, 1910 store integer and floating point data operand values that micro-instructions need to execute. In at least one embodiment, processor 1900 may include, without limitation, any number and combination of execution units 1912, 1914, 1916, 1918, 1920, 1922, 1924. In at least one embodiment, floating point ALU 1922 and floating point move unit 1924, may execute floating point, MMX, SIMD, AVX and SSE, or other operations, including specialized machine learning instructions. In at least one embodiment, floating point ALU 1922 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 1916, 1918. In at least one embodiment, fast ALUS 1916, 1918 may execute fast operations with an effective latency of half a clock cycle. In at least one embodiment, most complex integer operations go to slow ALU 1920 as slow ALU 1920 may include, without limitation, integer execution hardware for long-latency type of operations, such as a multiplier, shifts, flag logic, and branch processing. In at least one embodiment, memory load/store operations may be executed by AGUS 1912, 1914. In at least one embodiment, fast ALU 1916, fast ALU 1918, and slow ALU 1920 may perform integer operations on 64-bit data operands. In at least one embodiment, fast ALU 1916, fast ALU 1918, and slow ALU 1920 may be implemented to support a variety of data bit sizes including sixteen, thirty-two, 128, 256, etc. In at least one embodiment, floating point ALU 1922 and floating point move unit 1924 may be implemented to support a range of operands having bits of various widths. In at least one embodiment, floating point ALU 1922 and floating point move unit 1924 may operate on 128-bit wide packed data operands in conjunction with SIMD and multimedia instructions.

In at least one embodiment, uop schedulers 1902, 1904, 1906, dispatch dependent operations before parent load has finished executing. In at least one embodiment, as uops may be speculatively scheduled and executed in processor 1900, processor 1900 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 515 are used to perform inferencing and/or training operations associated with one or more embodiments. Details regarding inference and/or training logic 515 are provided below in conjunction with FIGS. 5A and/or 5B. In at least one embodiment portions or all of inference and/or training logic 515 may be incorporated into execution block 1911 and other memory or registers shown or not shown. For example, in at least one embodiment, training and/or inferencing techniques described herein may use one or more of ALUs illustrated in execution block 1911. Moreover, weight parameters may be stored in on-chip or off-chip memory and/or registers (shown or not shown) that configure ALUs of execution block 1911 to perform one or more machine learning algorithms, neural network architectures, use cases, or training techniques described herein.

In at least one embodiment, such components can be used to manage communication links connecting processing devices. In at least one embodiment, this can include determining frequency states and power states for communication links between processors.

Figure 20:
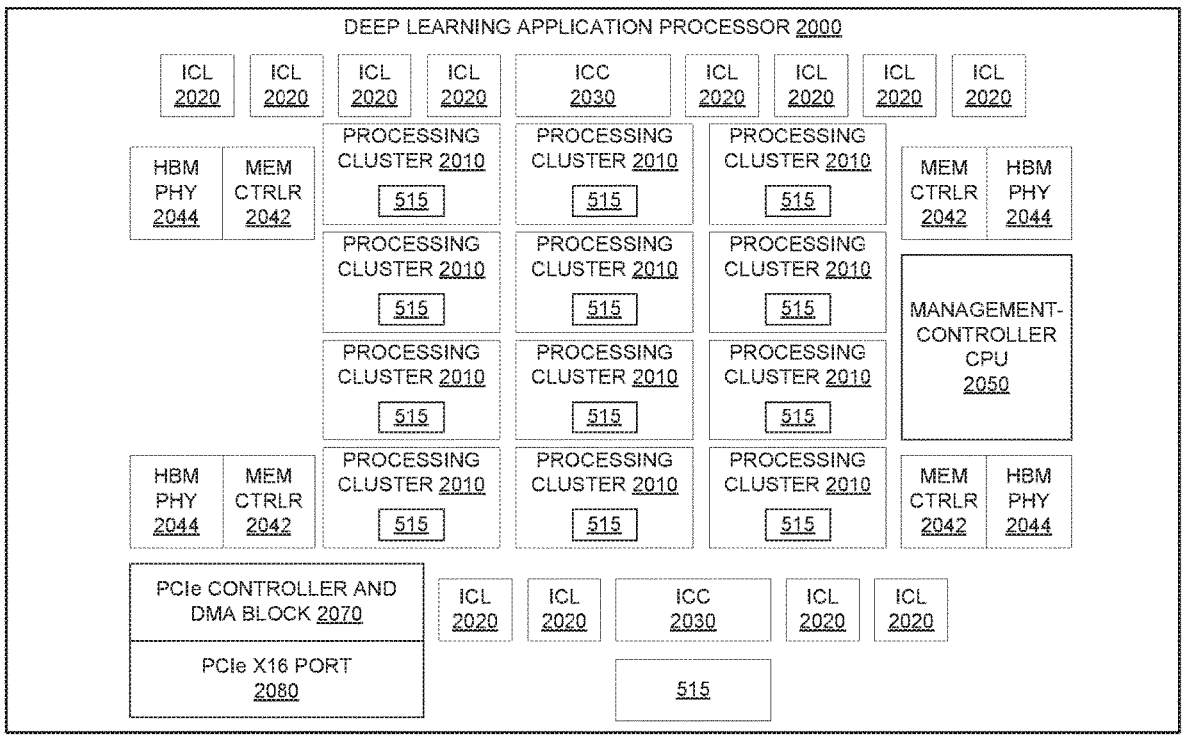
FIG. 20 illustrates a deep learning application processor, according to at least one embodiment.

FIG. 20 illustrates a deep learning application processor 2000, according to at least one embodiment. In at least one embodiment, deep learning application processor 2000 uses instructions that, if executed by deep learning application processor 2000, cause deep learning application processor 2000 to perform some or all of processes and techniques described throughout this disclosure. In at least one embodiment, deep learning application processor 2000 is an application-specific integrated circuit (ASIC). In at least one embodiment, application processor 2000 performs matrix multiply operations either "hard-wired" into hardware as a result of performing one or more instructions or both. In at least one embodiment, deep learning application processor 2000 includes, without limitation, processing clusters 2010(1)-2010(12), Inter-Chip Links ("ICLs") 2020(1)-2020(12), Inter-Chip Controllers ("ICCs") 2030(1)-2030(2), memory controllers ("Mem Ctrlrs") 2042(1)-2042(4), high bandwidth memory physical layer ("HBM PHY") 2044(1)-2044(4), a management-controller central processing unit ("management-controller CPU") 2050, a Serial Peripheral Interface, Inter-Integrated Circuit, and General Purpose Input/Output block ("SPI, I2C, GPIO"), a peripheral component interconnect express controller and direct memory access block ("PCIe Controller and DMA") 2070, and a sixteen-lane peripheral component interconnect express port ("PCI Express×16") 2080.

In at least one embodiment, processing clusters 2010 may perform deep learning operations, including inference or prediction operations based on weight parameters calculated one or more training techniques, including those described herein. In at least one embodiment, each processing cluster 2010 may include, without limitation, any number and type of processors. In at least one embodiment, deep learning application processor 2000 may include any number and type of processing clusters 2000. In at least one embodiment, Inter-Chip Links 2020 are bi-directional. In at least one embodiment, Inter-Chip Links 2020 and Inter-Chip Controllers 2030 enable multiple deep learning application processors 2000 to exchange information, including activation information resulting from performing one or more machine learning algorithms embodied in one or more neural networks. In at least one embodiment, deep learning application processor 2000 may include any number (including zero) and type of ICLs 2020 and ICCs 2030.

In at least one embodiment, HBM2s 2040 provide a total of 32 Gigabytes (GB) of memory. HBM2 2040($i$) is associated with both memory controller 2042($i$) and HBM PHY 2044($i$). In at least one embodiment, any number of HBM2s 2040 may provide any type and total amount of high bandwidth memory and may be associated with any number (including zero) and type of memory controllers 2042 and HBM PHYs 2044. In at least one embodiment, SPI, I2C, GPIO 2060, PCIe Controller and DMA 2070, and/or PCIe 2080 may be replaced with any number and type of blocks that enable any number and type of communication standards in any technically feasible fashion.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, deep learning application processor 2000 is used to train a machine learning model, such as a neural network, to predict or infer information provided to deep learning application processor 2000. In at least one embodiment, deep learning application processor 2000 is used to infer or predict information based on a trained machine learning model (e.g., neural network) that has been trained by another processor or system or by deep learning application processor 2000. In at least one embodiment, processor 2000 may be used to perform one or more neural network use cases described herein.

In at least one embodiment, such components can be used to manage communication links connecting processing devices. In at least one embodiment, this can include determining frequency states and power states for communication links between processors.

Figure 21:
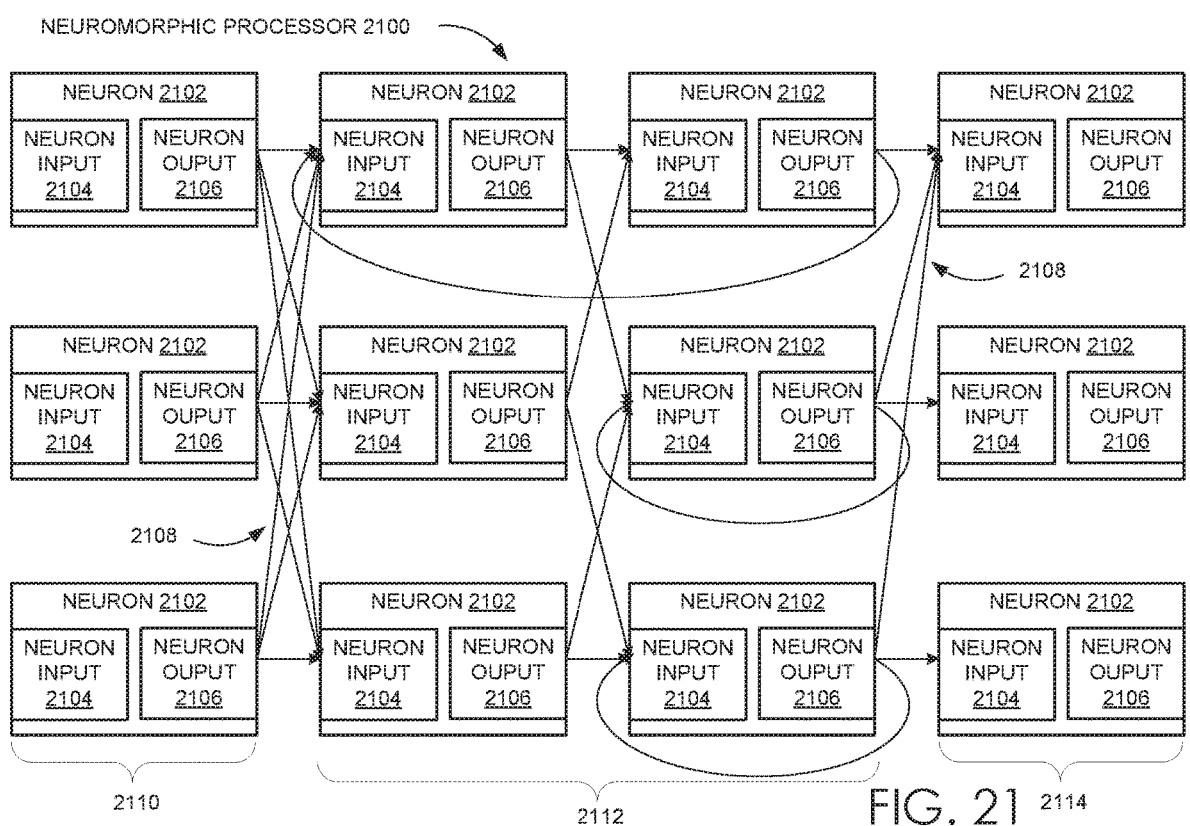
FIG. 21 illustrates an example neuromorphic processor, according to at least one embodiment.

FIG. 21 is a block diagram of a neuromorphic processor 2100, according to at least one embodiment. In at least one embodiment, neuromorphic processor 2100 may receive one or more inputs from sources external to neuromorphic processor 2100. In at least one embodiment, these inputs may be transmitted to one or more neurons 2102 within neuromorphic processor 2100. In at least one embodiment, neurons 2102 and components thereof may be implemented using circuitry or logic, including one or more arithmetic logic units (ALUs). In at least one embodiment, neuromorphic processor 2100 may include, without limitation, thousands or millions of instances of neurons 2102, but any suitable number of neurons 2102 may be used. In at least one embodiment, each instance of neuron 2102 may include a neuron input 2104 and a neuron output 2106. In at least one embodiment, neurons 2102 may generate outputs that may be transmitted to inputs of other instances of neurons 2102. For example, in at least one embodiment, neuron inputs 2104 and neuron outputs 2106 may be interconnected via synapses 2108.

In at least one embodiment, neurons 2102 and synapses 2108 may be interconnected such that neuromorphic processor 2100 operates to process or analyze information received by neuromorphic processor 2100. In at least one embodiment, neurons 2102 may transmit an output pulse (or "fire" or "spike") when inputs received through neuron input 2104 exceed a threshold. In at least one embodiment, neurons 2102 may sum or integrate signals received at neuron inputs 2104. For example, in at least one embodiment, neurons 2102 may be implemented as leaky integrate-and-fire neurons, wherein if a sum (referred to as a "membrane potential") exceeds a threshold value, neuron 2102 may generate an output (or "fire") using a transfer function such as a sigmoid or threshold function. In at least one embodiment, a leaky integrate-and-fire neuron may sum signals received at neuron inputs 2104 into a membrane potential and may also apply a decay factor (or leak) to reduce a membrane potential. In at least one embodiment, a leaky integrate-and-fire neuron may fire if multiple input signals are received at neuron inputs 2104 rapidly enough to exceed a threshold value (i.e., before a membrane potential decays too low to fire). In at least one embodiment, neurons 2102 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 2102 may include, without limitation, comparator circuits or logic that generate an output spike at neuron output 2106 when result of applying a transfer function to neuron input 2104 exceeds a threshold. In at least one embodiment, once neuron 2102 fires, it may disregard previously received input information by, for example, resetting a membrane potential to 0 or another suitable default value. In at least one embodiment, once membrane potential is reset to 0, neuron 2102 may resume normal operation after a suitable period of time (or refractory period).

In at least one embodiment, neurons 2102 may be interconnected through synapses 2108. In at least one embodiment, synapses 2108 may operate to transmit signals from an output of a first neuron 2102 to an input of a second neuron 2102. In at least one embodiment, neurons 2102 may transmit information over more than one instance of synapse 2108. In at least one embodiment, one or more instances of neuron output 2106 may be connected, via an instance of synapse 2108, to an instance of neuron input 2104 in same neuron 2102. In at least one embodiment, an instance of neuron 2102 generating an output to be transmitted over an instance of synapse 2108 may be referred to as a "pre-synaptic neuron" with respect to that instance of synapse 2108. In at least one embodiment, an instance of neuron 2102 receiving an input transmitted over an instance of synapse 2108 may be referred to as a "post-synaptic neuron" with respect to that instance of synapse 2108. Because an instance of neuron 2102 may receive inputs from one or more instances of synapse 2108, and may also transmit outputs over one or more instances of synapse 2108, a single instance of neuron 2102 may therefore be both a "pre-synaptic neuron" and "post-synaptic neuron," with respect to various instances of synapses 2108, in at least one embodiment.

In at least one embodiment, neurons 2102 may be organized into one or more layers. Each instance of neuron 2102 may have one neuron output 2106 that may fan out through one or more synapses 2108 to one or more neuron inputs 2104. In at least one embodiment, neuron outputs 2106 of neurons 2102 in a first layer 2110 may be connected to neuron inputs 2104 of neurons 2102 in a second layer 2112. In at least one embodiment, layer 2110 may be referred to as a "feed-forward layer." In at least one embodiment, each instance of neuron 2102 in an instance of first layer 2110 may fan out to each instance of neuron 2102 in second layer 2112. In at least one embodiment, first layer 2110 may be referred to as a "fully connected feed-forward layer." In at least one embodiment, each instance of neuron 2102 in an instance of second layer 2112 may fan out to fewer than all instances of neuron 2102 in a third layer 2114. In at least one embodiment, second layer 2112 may be referred to as a "sparsely connected feed-forward layer." In at least one embodiment, neurons 2102 in second layer 2112 may fan out to neurons 2102 in multiple other layers, including to neurons 2102 in (same) second layer 2112. In at least one embodiment, second layer 2112 may be referred to as a "recurrent layer." In at least one embodiment, neuromorphic processor 2100 may include, without limitation, any suitable combination of recurrent layers and feed-forward layers, including, without limitation, both sparsely connected feed-forward layers and fully connected feed-forward layers.

In at least one embodiment, neuromorphic processor 2100 may include, without limitation, a reconfigurable interconnect architecture or dedicated hard wired interconnects to connect synapse 2108 to neurons 2102. In at least one embodiment, neuromorphic processor 2100 may include, without limitation, circuitry or logic that allows synapses to be allocated to different neurons 2102 as needed based on neural network topology and neuron fan-in/out. For example, in at least one embodiment, synapses 2108 may be connected to neurons 2102 using an interconnect fabric, such as network-on-chip, or with dedicated connections. In at least one embodiment, synapse interconnections and components thereof may be implemented using circuitry or logic.

In at least one embodiment, such components can be used to manage communication links connecting processing devices. In at least one embodiment, this can include determining frequency states and power states for communication links between processors.

Figure 22:
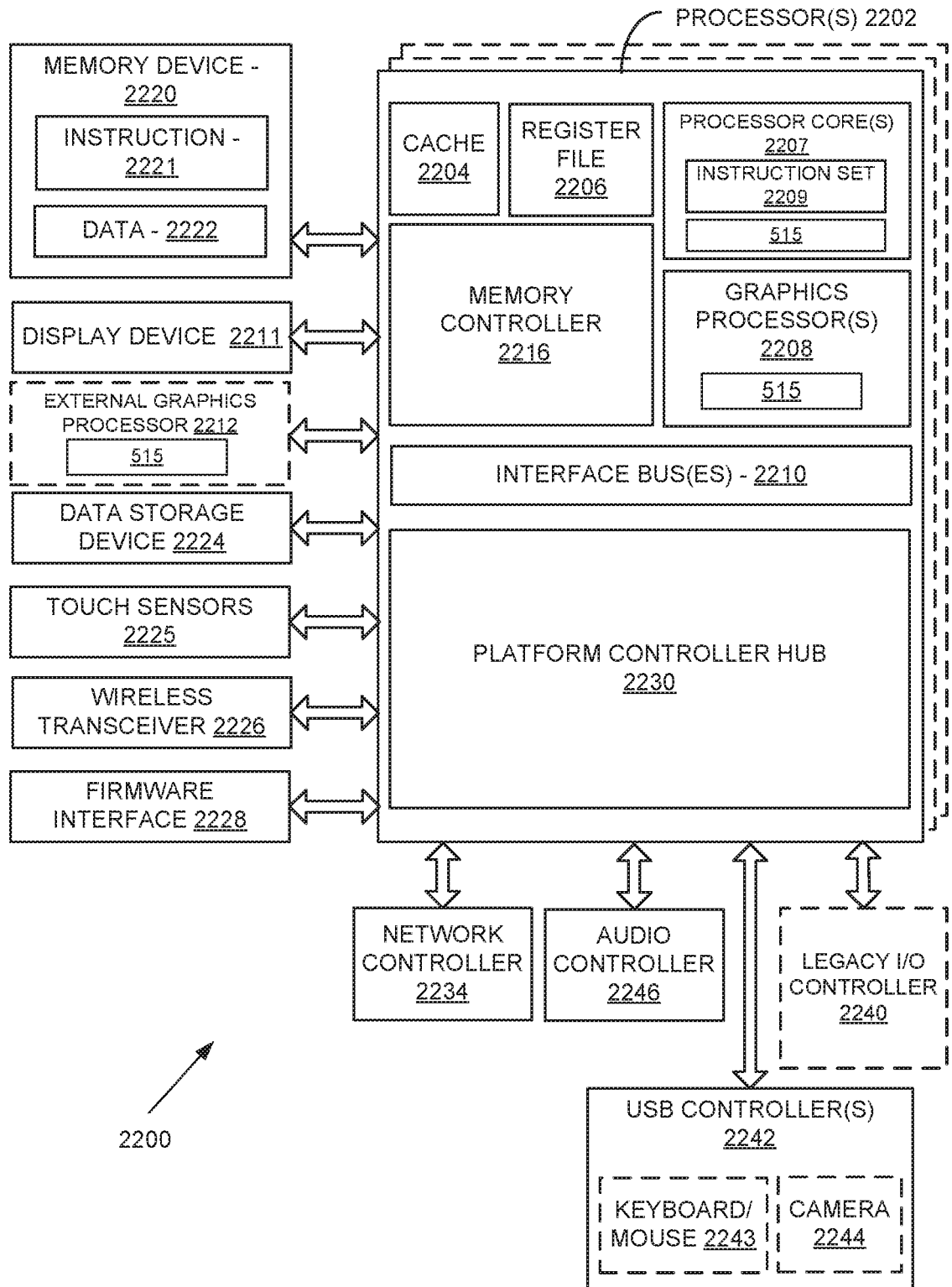
FIGS. 22 and 23 illustrate at least portions of a graphics processor, according to one or more embodiments.

FIG. 22 is a block diagram of a processing system, according to at least one embodiment. In at least one embodiment, system 2200 includes one or more processors 2202 and one or more graphics processors 2208, and may be a single processor desktop system, a multiprocessor workstation system, or a server system having a large number of processors 2202 or processor cores 2207. In at least one embodiment, system 2200 is a processing platform incorporated within a system-on-a-chip (SoC) integrated circuit for use in mobile, handheld, or embedded devices.

In at least one embodiment, system 2200 can include, or be incorporated within a server-based gaming platform, a game console, including a game and media console, a mobile gaming console, a handheld game console, or an online game console. In at least one embodiment, system 2200 is a mobile phone, smart phone, tablet computing device or mobile Internet device. In at least one embodiment, processing system 2200 can also include, couple with, or be integrated within a wearable device, such as a smart watch wearable device, smart eyewear device, augmented reality device, or virtual reality device. In at least one embodiment, processing system 2200 is a television or set top box device having one or more processors 2202 and a graphical interface generated by one or more graphics processors 2208.

In at least one embodiment, one or more processors 2202 each include one or more processor cores 2207 to process instructions which, when executed, perform operations for system and user software. In at least one embodiment, each of one or more processor cores 2207 is configured to process a specific instruction set 2209. In at least one embodiment, instruction set 2209 may facilitate Complex Instruction Set Computing (CISC), Reduced Instruction Set Computing (RISC), or computing via a Very Long Instruction Word (VLIW). In at least one embodiment, processor cores 2207 may each process a different instruction set 2209, which may include instructions to facilitate emulation of other instruction sets. In at least one embodiment, processor core 2207 may also include other processing devices, such a Digital Signal Processor (DSP).

In at least one embodiment, processor 2202 includes cache memory 2204. In at least one embodiment, processor 2202 can have a single internal cache or multiple levels of internal cache. In at least one embodiment, cache memory is shared among various components of processor 2202. In at least one embodiment, processor 2202 also uses an external cache (e.g., a Level-3 (L3) cache or Last Level Cache (LLC)) (not shown), which may be shared among processor cores 2207 using known cache coherency techniques. In at least one embodiment, register file 2206 is additionally included in processor 2202 which may include different types of registers for storing different types of data (e.g., integer registers, floating point registers, status registers, and an instruction pointer register). In at least one embodiment, register file 2206 may include general-purpose registers or other registers.

In at least one embodiment, one or more processor(s) 2202 are coupled with one or more interface bus(es) 2210 to transmit communication signals such as address, data, or control signals between processor 2202 and other components in system 2200. In at least one embodiment, interface bus 2210, in one embodiment, can be a processor bus, such as a version of a Direct Media Interface (DMI) bus. In at least one embodiment, interface 2210 is not limited to a DMI bus, and may include one or more Peripheral Component Interconnect buses (e.g., PCI, PCI Express), memory busses, or other types of interface busses. In at least one embodiment processor(s) 2202 include an integrated memory controller 2216 and a platform controller hub 2230. In at least one embodiment, memory controller 2216 facilitates communication between a memory device and other components of system 2200, while platform controller hub (PCH) 2230 provides connections to I/O devices via a local I/O bus.

In at least one embodiment, memory device 2220 can be a dynamic random access memory (DRAM) device, a static random access memory (SRAM) device, flash memory device, phase-change memory device, or some other memory device having suitable performance to serve as process memory. In at least one embodiment memory device 2220 can operate as system memory for system 2200, to store data 2222 and instructions 2221 for use when one or more processors 2202 executes an application or process. In at least one embodiment, memory controller 2216 also couples with an optional external graphics processor 2212, which may communicate with one or more graphics processors 2208 in processors 2202 to perform graphics and media operations. In at least one embodiment, a display device 2211 can connect to processor(s) 2202. In at least one embodiment display device 2211 can include one or more of an internal display device, as in a mobile electronic device or a laptop device or an external display device attached via a display interface (e.g., DisplayPort, etc.). In at least one embodiment, display device 2211 can include a head mounted display (HMD) such as a stereoscopic display device for use in virtual reality (VR) applications or augmented reality (AR) applications.

In at least one embodiment, platform controller hub 2230 enables peripherals to connect to memory device 2220 and processor 2202 via a high-speed I/O bus. In at least one embodiment, I/O peripherals include, but are not limited to, an audio controller 2246, a network controller 2234, a firmware interface 2228, a wireless transceiver 2226, touch sensors 2225, a data storage device 2224 (e.g., hard disk drive, flash memory, etc.). In at least one embodiment, data storage device 2224 can connect via a storage interface (e.g., SATA) or via a peripheral bus, such as a Peripheral Component Interconnect bus (e.g., PCI, PCI Express). In at least one embodiment, touch sensors 2225 can include touch screen sensors, pressure sensors, or fingerprint sensors. In at least one embodiment, wireless transceiver 2226 can be a Wi-Fi transceiver, a Bluetooth transceiver, or a mobile network transceiver such as a 3G, 4G, or Long Term Evolution (LTE) transceiver. In at least one embodiment, firmware interface 2228 enables communication with system firmware, and can be, for example, a unified extensible firmware interface (UEFI). In at least one embodiment, network controller 2234 can enable a network connection to a wired network. In at least one embodiment, a high-performance network controller (not shown) couples with interface bus 2210. In at least one embodiment, audio controller 2246 is a multi-channel high definition audio controller. In at least one embodiment, system 2200 includes an optional legacy I/O controller 2240 for coupling legacy (e.g., Personal System 2 (PS/2)) devices to system. In at least one embodiment, platform controller hub 2230 can also connect to one or more Universal Serial Bus (USB) controllers 2242 connect input devices, such as keyboard and mouse 2243 combinations, a camera 2244, or other USB input devices.

In at least one embodiment, an instance of memory controller 2216 and platform controller hub 2230 may be integrated into a discreet external graphics processor, such as external graphics processor 2212. In at least one embodiment, platform controller hub 2230 and/or memory controller 2216 may be external to one or more processor(s) 2202. For example, in at least one embodiment, system 2200 can include an external memory controller 2216 and platform controller hub 2230, which may be configured as a memory controller hub and peripheral controller hub within a system chipset that is in communication with processor(s) 2202.

Inference and/or training logic 515 are used to perform inferencing and/or training operations associated with one or more embodiments. Details regarding inference and/or training logic 515 are provided below in conjunction with FIGS. 5A and/or 5B. In at least one embodiment portions or all of inference and/or training logic 515 may be incorporated into graphics processor 2200. For example, in at least one embodiment, training and/or inferencing techniques described herein may use one or more of ALUs embodied in graphics processor 2212. Moreover, in at least one embodiment, inferencing and/or training operations described herein may be done using logic other than logic illustrated in FIG. 5A or 5B. In at least one embodiment, weight parameters may be stored in on-chip or off-chip memory and/or registers (shown or not shown) that configure ALUs of graphics processor 2200 to perform one or more machine learning algorithms, neural network architectures, use cases, or training techniques described herein.

In at least one embodiment, such components can be used to manage communication links connecting processing devices. In at least one embodiment, this can include determining frequency states and power states for communication links between processors.

Figure 23:
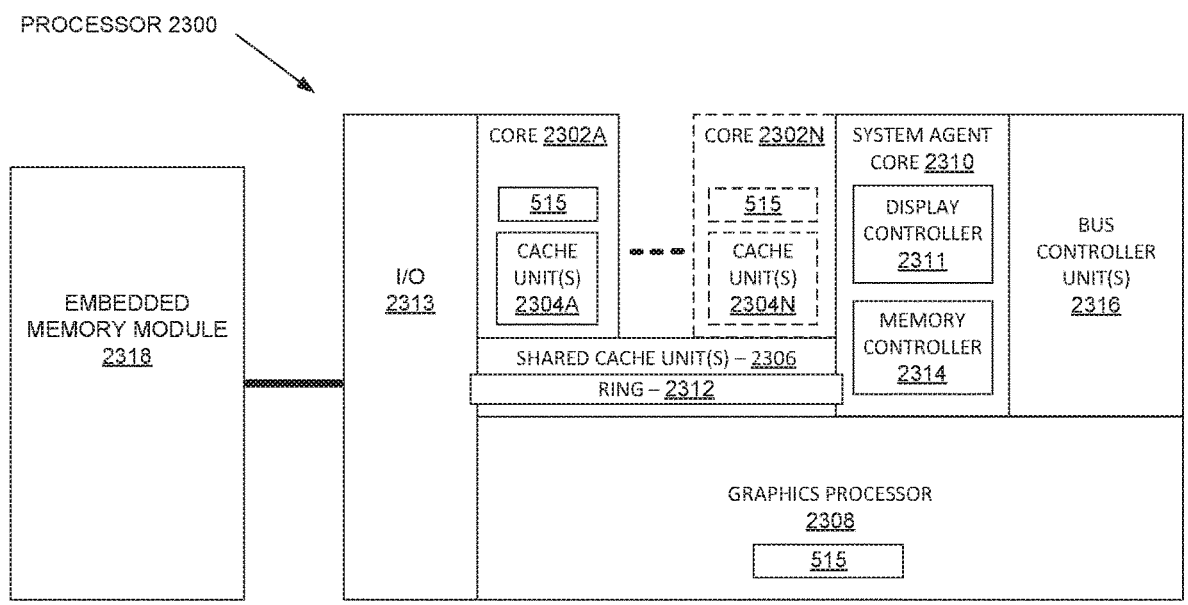

FIG. 23 is a block diagram of a processor 2300 having one or more processor cores 2302A-2302N, an integrated memory controller 2314, and an integrated graphics processor 2308, according to at least one embodiment. In at least one embodiment, processor 2300 can include additional cores up to and including additional core 2302N represented by dashed lined boxes. In at least one embodiment, each of processor cores 2302A-2302N includes one or more internal cache units 2304A-2304N. In at least one embodiment, each processor core also has access to one or more shared cached units 2306.

In at least one embodiment, internal cache units 2304A-2304N and shared cache units 2306 represent a cache memory hierarchy within processor 2300. In at least one embodiment, cache memory units 2304A-2304N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 2306 and 2304A-2304N.

In at least one embodiment, processor 2300 may also include a set of one or more bus controller units 2316 and a system agent core 2310. In at least one embodiment, one or more bus controller units 2316 manage a set of peripheral buses, such as one or more PCI or PCI express busses. In at least one embodiment, system agent core 2310 provides management functionality for various processor components. In at least one embodiment, system agent core 2310 includes one or more integrated memory controllers 2314 to manage access to various external memory devices (not shown).

In at least one embodiment, one or more of processor cores 2302A-2302N include support for simultaneous multi-threading. In at least one embodiment, system agent core 2310 includes components for coordinating and operating cores 2302A-2302N during multi-threaded processing. In at least one embodiment, system agent core 2310 may additionally include a power control unit (PCU), which includes logic and components to regulate one or more power states of processor cores 2302A-2302N and graphics processor 2308.

In at least one embodiment, processor 2300 additionally includes graphics processor 2308 to execute graphics processing operations. In at least one embodiment, graphics processor 2308 couples with shared cache units 2306, and system agent core 2310, including one or more integrated memory controllers 2314. In at least one embodiment, system agent core 2310 also includes a display controller 2311 to drive graphics processor output to one or more coupled displays. In at least one embodiment, display controller 2311 may also be a separate module coupled with graphics processor 2308 via at least one interconnect, or may be integrated within graphics processor 2308.

In at least one embodiment, a ring based interconnect unit 2312 is used to couple internal components of processor 2300. In at least one embodiment, an alternative interconnect unit may be used, such as a point-to-point interconnect, a switched interconnect, or other techniques. In at least one embodiment, graphics processor 2308 couples with ring interconnect 2312 via an I/O link 2313.

In at least one embodiment, I/O link 2313 represents at least one of multiple varieties of I/O interconnects, including an on package I/O interconnect which facilitates communication between various processor components and a high-performance embedded memory module 2318, such as an eDRAM module. In at least one embodiment, each of processor cores 2302A-2302N and graphics processor 2308 use embedded memory modules 2318 as a shared Last Level Cache.

In at least one embodiment, processor cores 2302A-2302N are homogenous cores executing a common instruction set architecture. In at least one embodiment, processor cores 2302A-2302N are heterogeneous in terms of instruction set architecture (ISA), where one or more of processor cores 2302A-2302N execute a common instruction set, while one or more other cores of processor cores 2302A-23-02N executes a subset of a common instruction set or a different instruction set. In at least one embodiment, processor cores 2302A-2302N are heterogeneous in terms of microarchitecture, where one or more cores having a relatively higher power consumption couple with one or more power cores having a lower power consumption. In at least one embodiment, processor 2300 can be implemented on one or more chips or as an SoC integrated circuit.

Inference and/or training logic 515 are used to perform inferencing and/or training operations associated with one or more embodiments. Details regarding inference and/or training logic 515 are provided below in conjunction with FIGS. 5A and/or 5B. In at least one embodiment portions or all of inference and/or training logic 515 may be incorporated into processor 2300. For example, in at least one embodiment, training and/or inferencing techniques described herein may use one or more of ALUs embodied in graphics processor 2212, graphics core(s) 2302A-2302N, or other components in FIG. 23. Moreover, in at least one embodiment, inferencing and/or training operations described herein may be done using logic other than logic illustrated in FIG. 5A or 5B. In at least one embodiment, weight parameters may be stored in on-chip or off-chip memory and/or registers (shown or not shown) that configure ALUs of graphics processor 2300 to perform one or more machine learning algorithms, neural network architectures, use cases, or training techniques described herein.

In at least one embodiment, such components can be used to manage communication links connecting processing devices. In at least one embodiment, this can include determining frequency states and power states for communication links between processors.

Figure 24:
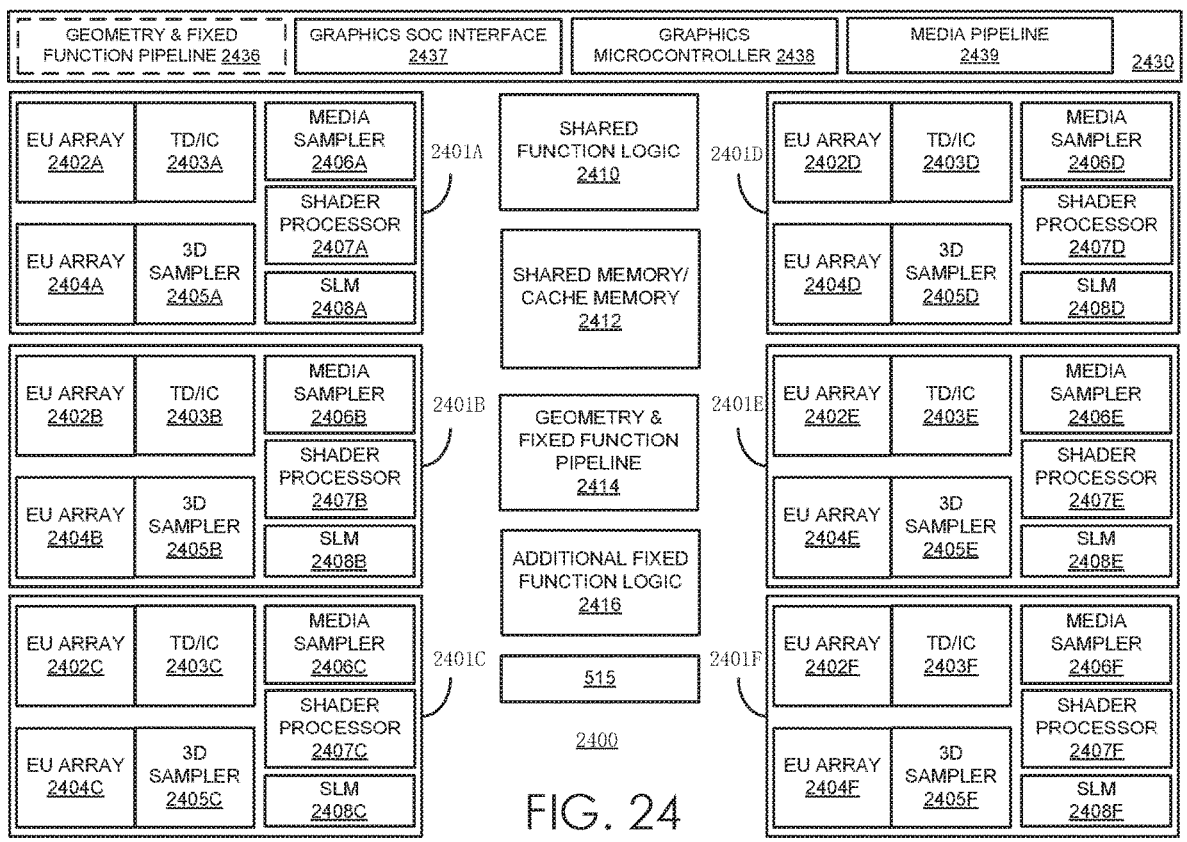
FIG. 24 illustrates at least portions of a graphics processor core, according to at least one embodiment.

FIG. 24 is a block diagram of hardware logic of a graphics processor core 2400, according to at least one embodiment described herein. In at least one embodiment, graphics processor core 2400 is included within a graphics core array. In at least one embodiment, graphics processor core 2400, sometimes referred to as a core slice, can be one or multiple graphics cores within a modular graphics processor. In at least one embodiment, graphics processor core 2400 is exemplary of one graphics core slice, and a graphics processor as described herein may include multiple graphics core slices based on target power and performance envelopes. In at least one embodiment, each graphics core 2400 can include a fixed function block 2430 coupled with multiple sub-cores 2401A-2401F, also referred to as sub-slices, that include modular blocks of general-purpose and fixed function logic.

In at least one embodiment, fixed function block 2430 includes a geometry/fixed function pipeline 2436 that can be shared by all sub-cores in graphics processor 2400, for example, in lower performance and/or lower power graphics processor implementations. In at least one embodiment, geometry/fixed function pipeline 2436 includes a 3D fixed function pipeline, a video front-end unit, a thread spawner and thread dispatcher, and a unified return buffer manager, which manages unified return buffers.

In at least one embodiment fixed, function block 2430 also includes a graphics SoC interface 2437, a graphics microcontroller 2438, and a media pipeline 2439. In at least one embodiment fixed, graphics SoC interface 2437 provides an interface between graphics core 2400 and other processor cores within a system on a chip integrated circuit. In at least one embodiment, graphics microcontroller 2438 is a programmable sub-processor that is configurable to manage various functions of graphics processor 2400, including thread dispatch, scheduling, and pre-emption. In at least one embodiment, media pipeline 2439 includes logic to facilitate decoding, encoding, pre-processing, and/or post-processing of multimedia data, including image and video data. In at least one embodiment, media pipeline 2439 implements media operations via requests to compute or sampling logic within sub-cores 2401-2401F.

In at least one embodiment, SoC interface 2437 enables graphics core 2400 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 2437 can also enable communication with fixed function devices within an SoC, such as camera imaging pipelines, and enables use of and/or implements global memory atomics that may be shared between graphics core 2400 and CPUs within an SoC. In at least one embodiment, SoC interface 2437 can also implement power management controls for graphics core 2400 and enable an interface between a clock domain of graphic core 2400 and other clock domains within an SoC. In at least one embodiment, SoC interface 2437 enables receipt of command buffers from a command streamer and global thread dispatcher that are configured to provide commands and instructions to each of one or more graphics cores within a graphics processor. In at least one embodiment, commands and instructions can be dispatched to media pipeline 2439, when media operations are to be performed, or a geometry and fixed function pipeline (e.g., geometry and fixed function pipeline 2436, geometry and fixed function pipeline 2414) when graphics processing operations are to be performed.

In at least one embodiment, graphics microcontroller 2438 can be configured to perform various scheduling and management tasks for graphics core 2400. In at least one embodiment, graphics microcontroller 2438 can perform graphics and/or compute workload scheduling on various graphics parallel engines within execution unit (EU) arrays 2402A-2402F, 2404A-2404F within sub-cores 2401A-2401F. In at least one embodiment, host software executing on a CPU core of an SoC including graphics core 2400 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 2438 can also facilitate low-power or idle states for graphics core 2400, providing graphics core 2400 with an ability to save and restore registers within graphics core 2400 across low-power state transitions independently from an operating system and/or graphics driver software on a system.

In at least one embodiment, graphics core 2400 may have greater than or fewer than illustrated sub-cores 2401A-2401F, up to N modular sub-cores. For each set of N sub-cores, in at least one embodiment, graphics core 2400 can also include shared function logic 2410, shared and/or cache memory 2412, a geometry/fixed function pipeline 2414, as well as additional fixed function logic 2416 to accelerate various graphics and compute processing operations. In at least one embodiment, shared function logic 2410 can include logic units (e.g., sampler, math, and/or inter-thread communication logic) that can be shared by each N sub-cores within graphics core 2400. In at least one embodiment fixed, shared and/or cache memory 2412 can be a last-level cache for N sub-cores 2401A-2401F within graphics core 2400 and can also serve as shared memory that is accessible by multiple sub-cores. In at least one embodiment, geometry/fixed function pipeline 2414 can be included instead of geometry/fixed function pipeline 2436 within fixed function block 2430 and can include same or similar logic units.

In at least one embodiment, graphics core 2400 includes additional fixed function logic 2416 that can include various fixed function acceleration logic for use by graphics core 2400. In at least one embodiment, additional fixed function logic 2416 includes an additional geometry pipeline for use in position only shading. In position-only shading, at least two geometry pipelines exist, whereas in a full geometry pipeline within geometry/fixed function pipeline 2416, 2436, and a cull pipeline, which is an additional geometry pipeline which may be included within additional fixed function logic 2416. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 2416 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 2416 can also include machine-learning acceleration logic, such as fixed function matrix multiplication logic, for implementations including optimizations for machine learning training or inferencing.

In at least one embodiment, within each graphics sub-core 2401A-2401F includes a set of execution resources that may be used to perform graphics, media, and compute operations in response to requests by graphics pipeline, media pipeline, or shader programs. In at least one embodiment, graphics sub-cores 2401A-2401F include multiple EU arrays 2402A-2402F, 2404A-2404F, thread dispatch and inter-thread communication (TD/IC) logic 2403A-2403F, a 3D (e.g., texture) sampler 2405A-2405F, a media sampler 2406A-2406F, a shader processor 2407A-2407F, and shared local memory (SLM) 2408A-2408F. EU arrays 2402A-2402F, 2404A-2404F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 2403A-2403F performs local thread dispatch and thread control operations for execution units within a sub-core and facilitate communication between threads executing on execution units of a sub-core. In at least one embodiment, 3D sampler 2405A-2405F can read texture or other 3D graphics related data into memory. In at least one embodiment, 3D sampler can read texture data differently based on a configured sample state and texture format associated with a given texture. In at least one embodiment, media sampler 2406A-2406F can perform similar read operations based on a type and format associated with media data. In at least one embodiment, each graphics sub-core 2401A-2401F can alternately include a unified 3D and media sampler. In at least one embodiment, threads executing on execution units within each of sub-cores 2401A-2401F can make use of shared local memory 2408A-2408F within each sub-core, to enable threads executing within a thread group to execute using a common pool of on-chip memory.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, portions or all of inference and/or training logic 515 may be incorporated into graphics processor 2410. For example, in at least one embodiment, training and/or inferencing techniques described herein may use one or more of ALUs embodied in graphics processor 2212, graphics microcontroller 2438, geometry & fixed function pipeline 2414 and 2436, or other logic in FIG. 23. Moreover, in at least one embodiment, inferencing and/or training operations described herein may be done using logic other than logic illustrated in FIG. 5A or 5B. In at least one embodiment, weight parameters may be stored in on-chip or off-chip memory and/or registers (shown or not shown) that configure ALUs of graphics processor 2400 to perform one or more machine learning algorithms, neural network architectures, use cases, or training techniques described herein.

In at least one embodiment, such components can be used to manage communication links connecting processing devices. In at least one embodiment, this can include determining frequency states and power states for communication links between processors.

Figure 25A:
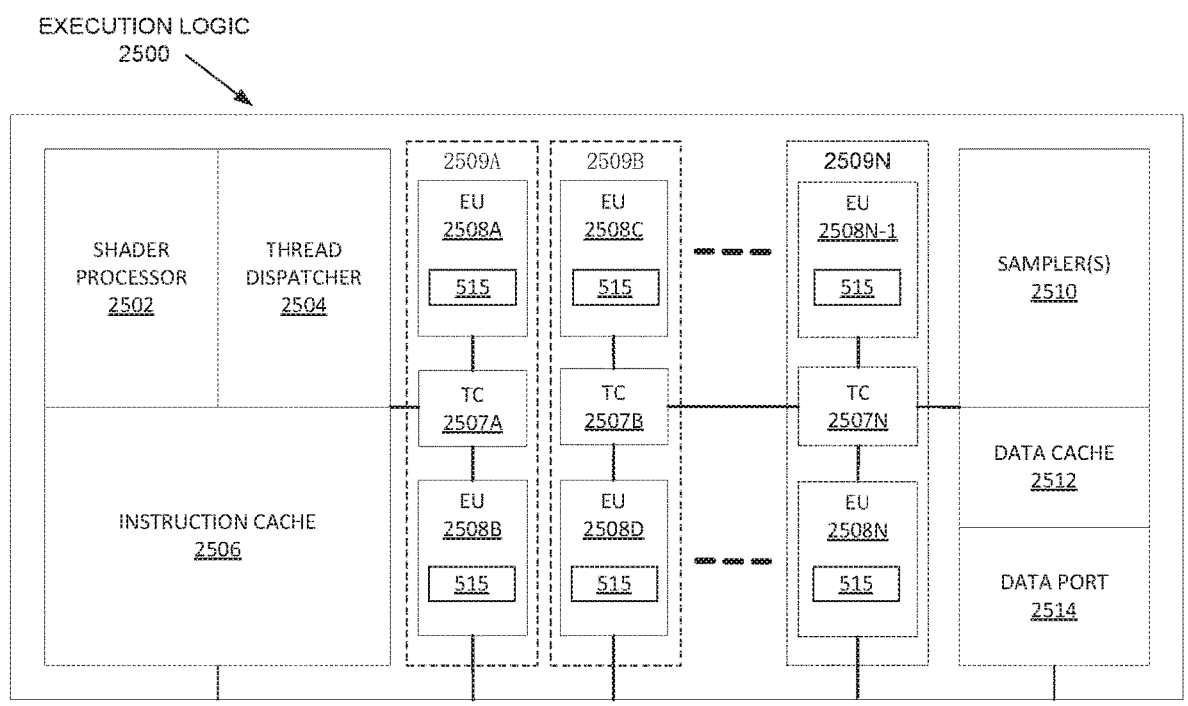
FIGS. 25A-25B illustrate at least portions of a graphics processor core, according to at least one embodiment.
Figure 25B:
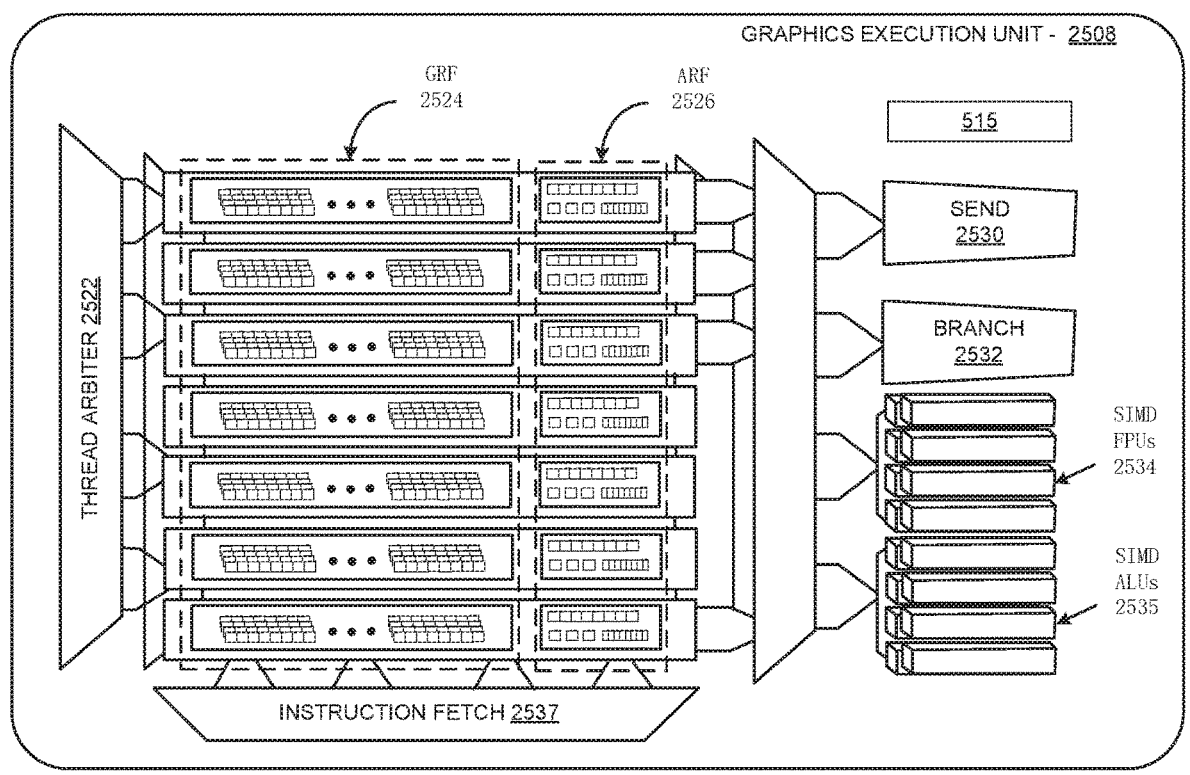

FIGS. 25A-25B illustrate thread execution logic 2500 including an array of processing elements of a graphics processor core according to at least one embodiment. FIG. 25A illustrates at least one embodiment, in which thread execution logic 2500 is used. FIG. 25B illustrates exemplary internal details of an execution unit, according to at least one embodiment.

As illustrated in FIG. 25A, in at least one embodiment, thread execution logic 2500 includes a shader processor 2502, a thread dispatcher 2504, instruction cache 2506, a scalable execution unit array including a plurality of execution units 2508A-2508N, sampler(s) 2510, a data cache 2512, and a data port 2514. In at least one embodiment a scalable execution unit array can dynamically scale by enabling or disabling one or more execution units (e.g., any of execution unit 2508A, 2508B, 2508C, 2508D, through 2508N-1 and 2508N) based on computational requirements of a workload, for example. In at least one embodiment, scalable execution units are interconnected via an interconnect fabric that links to each of execution unit. In at least one embodiment, thread execution logic 2500 includes one or more connections to memory, such as system memory or cache memory, through one or more of instruction cache 2506, data port 2514, sampler 2510, and execution units 2508A-2508N. In at least one embodiment, each execution unit (e.g., 2508A) is a stand-alone programmable general-purpose computational unit that is capable of executing multiple simultaneous hardware threads while processing multiple data elements in parallel for each thread. In at least one embodiment, array of execution units 2508A-2508N is scalable to include any number individual execution units.

In at least one embodiment, execution units 2508A-2508N are primarily used to execute shader programs. In at least one embodiment, shader processor 2502 can process various shader programs and dispatch execution threads associated with shader programs via a thread dispatcher 2504. In at least one embodiment, thread dispatcher 2504 includes logic to arbitrate thread initiation requests from graphics and media pipelines and instantiate requested threads on one or more execution units in execution units 2508A-2508N. For example, in at least one embodiment, a geometry pipeline can dispatch vertex, tessellation, or geometry shaders to thread execution logic for processing. In at least one embodiment, thread dispatcher 2504 can also process runtime thread spawning requests from executing shader programs.

In at least one embodiment, execution units 2508A-2508N support an instruction set that includes native support for many standard 3D graphics shader instructions, such that shader programs from graphics libraries (e.g., Direct 3D and OpenGL) are executed with a minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 2508A-2508N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one of shared functions, dependency logic within execution units 2508A-2508N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 2508A-2508N operates on arrays of data elements. In at least one embodiment, a number of data elements is "execution size," or number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 2508A-2508N support integer and floating-point data types.

In at least one embodiment, an execution unit instruction set includes SIMD instructions. In at least one embodiment, various data elements can be stored as a packed data type in a register and an execution unit will process various elements based on data size of elements. For example, in at least one embodiment, when operating on a 256-bit wide vector, 256 bits of a vector are stored in a register and an execution unit operates on a vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 2509A-2509N having thread control logic (2507A-2507N) that is common to fused EUs. In at least one embodiment, multiple EUs can be fused into an EU group. In at least one embodiment, each EU in fused EU group can be configured to execute a separate SIMD hardware thread. Number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 2509A-2509N includes at least two execution units. For example, in at least one embodiment, fused execution unit 2509A includes a first EU 2508A, second EU 2508B, and thread control logic 2507A that is common to first EU 2508A and second EU 2508B. In at least one embodiment, thread control logic 2507A controls threads executed on fused graphics execution unit 2509A, allowing each EU within fused execution units 2509A-2509N to execute using a common instruction pointer register.

In at least one embodiment, one or more internal instruction caches (e.g., 2506) are included in thread execution logic 2500 to cache thread instructions for execution units. In at least one embodiment, one or more data caches (e.g., 2512) are included to cache thread data during thread execution. In at least one embodiment, a sampler 2510 is included to provide texture sampling for 3D operations and media sampling for media operations. In at least one embodiment, sampler 2510 includes specialized texture or media sampling functionality to process texture or media data during a sampling process before providing sampled data to an execution unit.

During execution, in at least one embodiment, graphics and media pipelines send thread initiation requests to thread execution logic 2500 via thread spawning and dispatch logic. In at least one embodiment, once a group of geometric objects has been processed and rasterized into pixel data, pixel processor logic (e.g., pixel shader logic, fragment shader logic, etc.) within shader processor 2502 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 2502 then executes an application programming interface (API)-supplied pixel or fragment shader program. In at least one embodiment, to execute a shader program, shader processor 2502 dispatches threads to an execution unit (e.g., 2508A) via thread dispatcher 2504. In at least one embodiment, shader processor 2502 uses texture sampling logic in sampler 2510 to access texture data in texture maps stored in memory. In at least one embodiment, arithmetic operations on texture data and input geometry data compute pixel color data for each geometric fragment, or discards one or more pixels from further processing.

In at least one embodiment, data port 2514 provides a memory access mechanism for thread execution logic 2500 to output processed data to memory for further processing on a graphics processor output pipeline. In at least one embodiment, data port 2514 includes or couples to one or more cache memories (e.g., data cache 2512) to cache data for memory access via a data port.

As illustrated in FIG. 25B, in at least one embodiment, a graphics execution unit 2508 can include an instruction fetch unit 2537, a general register file array (GRF) 2524, an architectural register file array (ARF) 2526, a thread arbiter 2522, a send unit 2530, a branch unit 2532, a set of SIMD floating point units (FPUs) 2534, and, in at least one embodiment, a set of dedicated integer SIMD ALUs 2535. In at least one embodiment, GRF 2524 and ARF 2526 includes a set of general register files and architecture register files associated with each simultaneous hardware thread that may be active in graphics execution unit 2508. In at least one embodiment, per thread architectural state is maintained in ARF 2526, while data used during thread execution is stored in GRF 2524. In at least one embodiment, execution state of each thread, including instruction pointers for each thread, can be held in thread-specific registers in ARF 2526.

In at least one embodiment, graphics execution unit 2508 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 2508 can co-issue multiple instructions, which may each be different instructions. In at least one embodiment, thread arbiter 2522 of graphics execution unit thread 2508 can dispatch instructions to one of send unit 2530, branch unit 2542, or SIMD FPU(s) 2534 for execution. In at least one embodiment, each execution thread can access 128 general-purpose registers within GRF 2524, where each register can store 32 bytes, accessible as a SIMD 8-element vector of 32-bit data elements. In at least one embodiment, each execution unit thread has access to 4 Kbytes within GRF 2524, although embodiments are not so limited, and greater or fewer register resources may be provided in other embodiments. In at least one embodiment, up to seven threads can execute simultaneously, although a number of threads per execution unit can also vary according to embodiments. In at least one embodiment, in which seven threads may access 4 Kbytes, GRF 2524 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 2530. In at least one embodiment, branch instructions are dispatched to a dedicated branch unit 2532 to facilitate SIMD divergence and eventual convergence.

In at least one embodiment graphics execution unit 2508 includes one or more SIMD floating point units (FPU(s)) 2534 to perform floating-point operations. In at least one embodiment, FPU(s) 2534 also support integer computation. In at least one embodiment FPU(s) 2534 can SIMD execute up to M number of 32-bit floating-point (or integer) operations, or SIMD execute up to 2M 16-bit integer or 16-bit floating-point operations. In at least one embodiment, at least one of FPU(s) provides extended math capability to support high-throughput transcendental math functions and double precision 64-bit floating-point. In at least one embodiment, a set of 8-bit integer SIMD ALUs 2535 are also present, and may be specifically optimized to perform operations associated with machine learning computations.

In at least one embodiment, arrays of multiple instances of graphics execution unit 2508 can be instantiated in a graphics sub-core grouping (e.g., a sub-slice). In at least one embodiment, execution unit 2508 can execute instructions across a plurality of execution channels. In at least one embodiment, each thread executed on graphics execution unit 2508 is executed on a different channel.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, portions or all of inference and/or training logic 515 may be incorporated into execution logic 2500. Moreover, in at least one embodiment, inferencing and/or training operations described herein may be done using logic other than logic illustrated in FIG. 5A or 5B. In at least one embodiment, weight parameters may be stored in on-chip or off-chip memory and/or registers (shown or not shown) that configure ALUs of execution logic 2500 to perform one or more machine learning algorithms, neural network architectures, use cases, or training techniques described herein.

In at least one embodiment, such components can be used to manage communication links connecting processing devices. In at least one embodiment, this can include determining frequency states and power states for communication links between processors.

Figure 26:
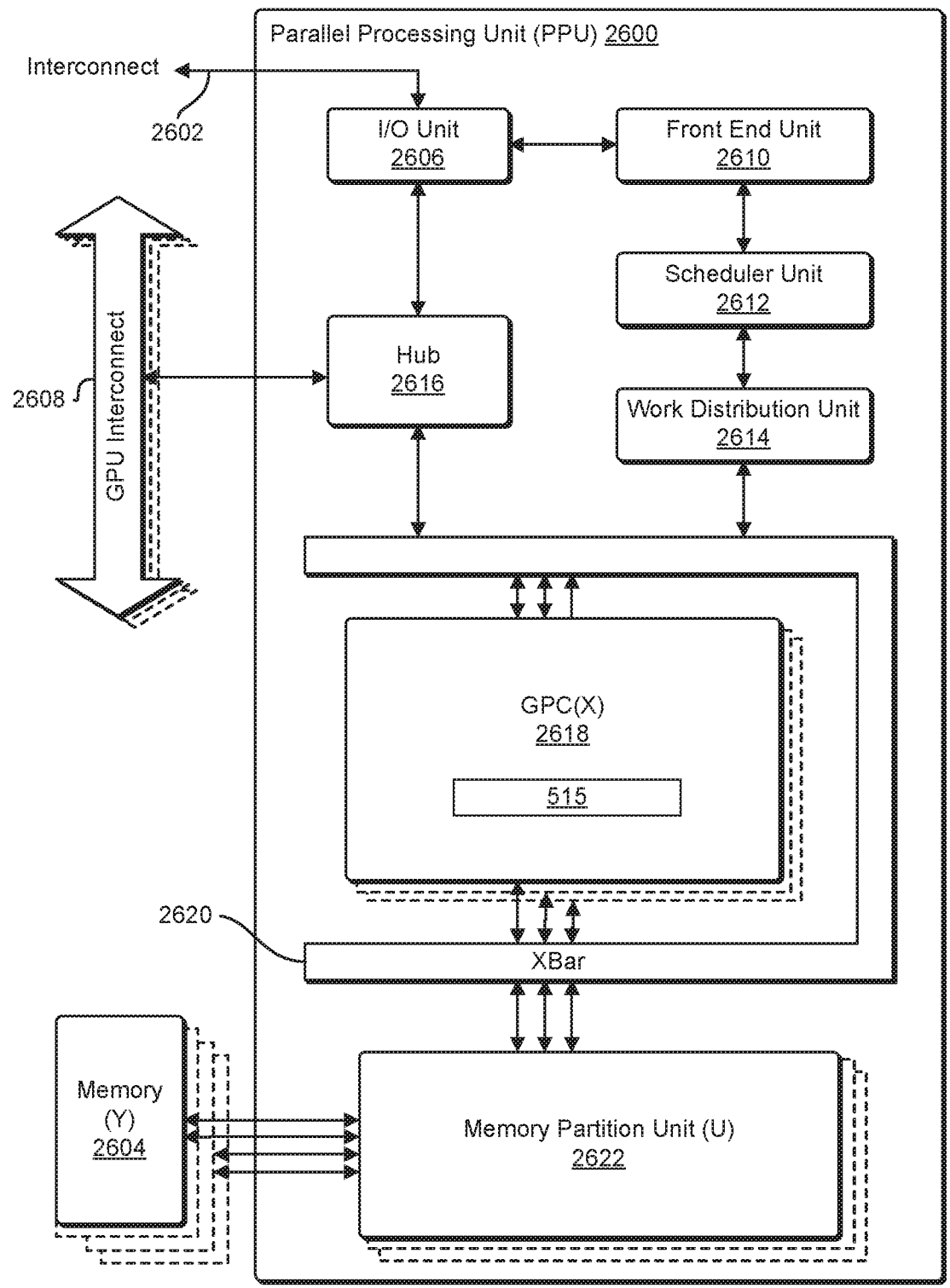
FIG. 26 illustrates a parallel processing unit ("PPU"), according to at least one embodiment.

FIG. 26 illustrates a parallel processing unit ("PPU") 2600, according to at least one embodiment. In at least one embodiment, PPU 2600 is configured with machine-readable code that, if executed by PPU 2600, causes PPU 2600 to perform some or all of processes and techniques described throughout this disclosure. In at least one embodiment, PPU 2600 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2600. In at least one embodiment, PPU 2600 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 2600 is utilized to perform computations such as linear algebra operations and machine-learning operations. FIG. 26 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 2600 are configured to accelerate High Performance Computing ("HPC"), data center, and machine learning applications. In at least one embodiment, PPU 2600 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 2600 includes, without limitation, an Input/Output ("I/O") unit 2606, a front-end unit 2610, a scheduler unit 2612, a work distribution unit 2614, a hub 2616, a crossbar ("Xbar") 2620, one or more general processing clusters ("GPCs") 2618, and one or more partition units ("memory partition units") 2622. In at least one embodiment, PPU 2600 is connected to a host processor or other PPUs 2600 via one or more high-speed GPU interconnects ("GPU interconnects") 2608. In at least one embodiment, PPU 2600 is connected to a host processor or other peripheral devices via an interconnect 2602. In at least one embodiment, PPU 2600 is connected to a local memory comprising one or more memory devices ("memory") 2604. In at least one embodiment, memory devices 2604 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2608 may refer to a wire-based multi-lane communications link that is used by systems to scale and include one or more PPUs 2600 combined with one or more central processing units ("CPUs"), supports cache coherence between PPUs 2600 and CPUs, and CPU mastering. In at least one embodiment, data and/or commands are transmitted by high-speed GPU interconnect 2608 through hub 2616 to/from other units of PPU 2600 such as one or more copy engines, video encoders, video decoders, power management units, and other components which may not be explicitly illustrated in FIG. 26.

In at least one embodiment, I/O unit 2606 is configured to transmit and receive communications (e.g., commands, data) from a host processor (not illustrated in FIG. 26) over system bus 2602. In at least one embodiment, I/O unit 2606 communicates with host processor directly via system bus 2602 or through one or more intermediate devices such as a memory bridge. In at least one embodiment, I/O unit 2606 may communicate with one or more other processors, such as one or more of PPUs 2600 via system bus 2602. In at least one embodiment, I/O unit 2606 implements a Peripheral Component Interconnect Express ("PCIe") interface for communications over a PCIe bus. In at least one embodiment, I/O unit 2606 implements interfaces for communicating with external devices.

In at least one embodiment, I/O unit 2606 decodes packets received via system bus 2602. In at least one embodiment, at least some packets represent commands configured to cause PPU 2600 to perform various operations. In at least one embodiment, I/O unit 2606 transmits decoded commands to various other units of PPU 2600 as specified by commands. In at least one embodiment, commands are transmitted to front-end unit 2610 and/or transmitted to hub 2616 or other units of PPU 2600 such as one or more copy engines, a video encoder, a video decoder, a power management unit, etc. (not explicitly illustrated in FIG. 26). In at least one embodiment, I/O unit 2606 is configured to route communications between and among various logical units of PPU 2600.

In at least one embodiment, a program executed by host processor encodes a command stream in a buffer that provides workloads to PPU 2600 for processing. In at least one embodiment, a workload comprises instructions and data to be processed by those instructions. In at least one embodiment, buffer is a region in a memory that is accessible (e.g., read/write) by both host processor and PPU 2600—a host interface unit may be configured to access buffer in a system memory connected to system bus 2602 via memory requests transmitted over system bus 2602 by I/O unit 2606. In at least one embodiment, host processor writes command stream to buffer and then transmits a pointer to start of command stream to PPU 2600 such that front-end unit 2610 receives pointers to one or more command streams and manages one or more command streams, reading commands from command streams and forwarding commands to various units of PPU 2600.

In at least one embodiment, front-end unit 2610 is coupled to scheduler unit 2612 that configures various GPCs 2618 to process tasks defined by one or more command streams. In at least one embodiment, scheduler unit 2612 is configured to track state information related to various tasks managed by scheduler unit 2612 where state information may indicate which of GPCs 2618 a task is assigned to, whether task is active or inactive, a priority level associated with task, and so forth. In at least one embodiment, scheduler unit 2612 manages execution of a plurality of tasks on one or more of GPCs 2618.

In at least one embodiment, scheduler unit 2612 is coupled to work distribution unit 2614 that is configured to dispatch tasks for execution on GPCs 2618. In at least one embodiment, work distribution unit 2614 tracks a number of scheduled tasks received from scheduler unit 2612 and work distribution unit 2614 manages a pending task pool and an active task pool for each of GPCs 2618. In at least one embodiment, pending task pool comprises a number of slots (e.g., 32 slots) that contain tasks assigned to be processed by a particular GPC 2618; active task pool may comprise a number of slots (e.g., 4 slots) for tasks that are actively being processed by GPCs 2618 such that as one of GPCs 2618 completes execution of a task, that task is evicted from active task pool for GPC 2618 and one of other tasks from pending task pool is selected and scheduled for execution on GPC 2618. In at least one embodiment, if an active task is idle on GPC 2618, such as while waiting for a data dependency to be resolved, then active task is evicted from GPC 2618 and returned to pending task pool while another task in pending task pool is selected and scheduled for execution on GPC 2618.

In at least one embodiment, work distribution unit 2614 communicates with one or more GPCs 2618 via XBar 2620. In at least one embodiment, XBar 2620 is an interconnect network that couples many of units of PPU 2600 to other units of PPU 2600 and can be configured to couple work distribution unit 2614 to a particular GPC 2618. In at least one embodiment, one or more other units of PPU 2600 may also be connected to XBar 2620 via hub 2616.

In at least one embodiment, tasks are managed by scheduler unit 2612 and dispatched to one of GPCs 2618 by work distribution unit 2614. GPC 2618 is configured to process task and generate results. In at least one embodiment, results may be consumed by other tasks within GPC 2618, routed to a different GPC 2618 via XBar 2620, or stored in memory 2604. In at least one embodiment, results can be written to memory 2604 via partition units 2622, which implement a memory interface for reading and writing data to/from memory 2604. In at least one embodiment, results can be transmitted to another PPU 2604 or CPU via high-speed GPU interconnect 2608. In at least one embodiment, PPU 2600 includes, without limitation, a number U of partition units 2622 that is equal to number of separate and distinct memory devices 2604 coupled to PPU 2600. In at least one embodiment, partition unit 2622 will be described in more detail below in conjunction with FIG. 28.

In at least one embodiment, a host processor executes a driver kernel that implements an application programming interface ("API") that enables one or more applications executing on host processor to schedule operations for execution on PPU 2600. In at least one embodiment, multiple compute applications are simultaneously executed by PPU 2600 and PPU 2600 provides isolation, quality of service ("QoS"), and independent address spaces for multiple compute applications. In at least one embodiment, an application generates instructions (e.g., in form of API calls)

that cause driver kernel to generate one or more tasks for execution by PPU 2600 and driver kernel outputs tasks to one or more streams being processed by PPU 2600. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 28.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, deep learning application processor is used to train a machine learning model, such as a neural network, to predict or infer information provided to PPU 2600. In at least one embodiment, PPU 2600 is used to infer or predict information based on a trained machine learning model (e.g., neural network) that has been trained by another processor or system or by PPU 2600. In at least one embodiment, PPU 2600 may be used to perform one or more neural network use cases described herein.

In at least one embodiment, such components can be used to manage communication links connecting processing devices. In at least one embodiment, this can include determining frequency states and power states for communication links between processors.

Figure 27:
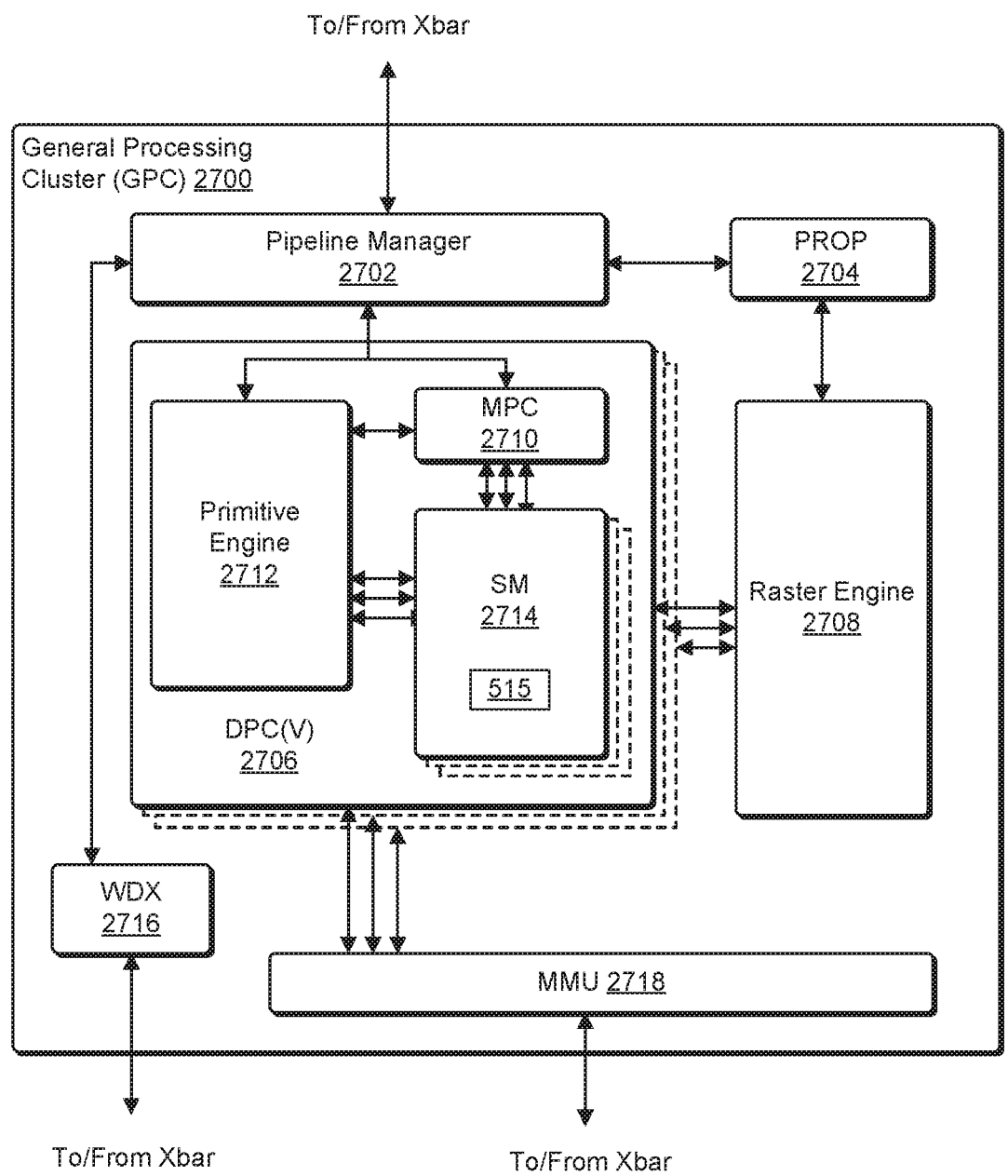
FIG. 27 illustrates a general processing cluster ("GPC"), according to at least one embodiment.

FIG. 27 illustrates a general processing cluster ("GPC") 2700, according to at least one embodiment. In at least one embodiment, GPC 2700 is GPC 2618 of FIG. 26. In at least one embodiment, each GPC 2700 includes, without limitation, a number of hardware units for processing tasks and each GPC 2700 includes, without limitation, a pipeline manager 2702, a pre-raster operations unit ("PROP") 2704, a raster engine 2708, a work distribution crossbar ("WDX") 2716, a memory management unit ("MMU") 2718, one or more Data Processing Clusters ("DPCs") 2706, and any suitable combination of parts.

In at least one embodiment, operation of GPC 2700 is controlled by pipeline manager 2702. In at least one embodiment, pipeline manager 2702 manages configuration of one or more DPCs 2706 for processing tasks allocated to GPC 2700. In at least one embodiment, pipeline manager 2702 configures at least one of one or more DPCs 2706 to implement at least a portion of a graphics rendering pipeline. In at least one embodiment, DPC 2706 is configured to execute a vertex shader program on a programmable streaming multi-processor ("SM") 2714. In at least one embodiment, pipeline manager 2702 is configured to route packets received from a work distribution unit to appropriate logical units within GPC 2700, in at least one embodiment, and some packets may be routed to fixed function hardware units in PROP 2704 and/or raster engine 2708 while other packets may be routed to DPCs 2706 for processing by a primitive engine 2712 or SM 2714. In at least one embodiment, pipeline manager 2702 configures at least one of DPCs 2706 to implement a neural network model and/or a computing pipeline.

In at least one embodiment, PROP unit 2704 is configured, in at least one embodiment, to route data generated by raster engine 2708 and DPCs 2706 to a Raster Operations ("ROP") unit in partition unit 2622, described in more detail above in conjunction with FIG. 26. In at least one embodiment, PROP unit 2704 is configured to perform optimizations for color blending, organize pixel data, perform address translations, and more. In at least one embodiment, raster engine 2708 includes, without limitation, a number of fixed function hardware units configured to perform various raster operations, in at least one embodiment, and raster engine 2708 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 2708 comprises fragments to be processed by any suitable entity such as by a fragment shader implemented within DPC 2706.

In at least one embodiment, each DPC 2706 included in GPC 2700 comprise, without limitation, an M-Pipe Controller ("MPC") 2710; primitive engine 2712; one or more SMs 2714; and any suitable combination thereof. In at least one embodiment, MPC 2710 controls operation of DPC 2706, routing packets received from pipeline manager 2702 to appropriate units in DPC 2706. In at least one embodiment, packets associated with a vertex are routed to primitive engine 2712, which is configured to fetch vertex attributes associated with vertex from memory; in contrast, packets associated with a shader program may be transmitted to SM 2714.

In at least one embodiment, SM 2714 comprises, without limitation, a programmable streaming processor that is configured to process tasks represented by a number of threads. In at least one embodiment, SM 2714 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 2714 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state is maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 2714 are described in more detail below.

In at least one embodiment, MMU 2718 provides an interface between GPC 2700 and memory partition unit (e.g., partition unit 2622 of FIG. 26) and MMU 2718 provides translation of virtual addresses into physical addresses, memory protection, and arbitration of memory requests. In at least one embodiment, MMU 2718 provides one or more translation lookaside buffers ("TLBs") for performing translation of virtual addresses into physical addresses in memory.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, deep learning application processor is used to train a machine learning model, such as a neural network, to predict or infer information provided to GPC 2700. In at least one embodiment, GPC 2700 is used to infer or predict information based on a trained machine learning model (e.g., neural network) that has been trained by another processor or system or by GPC 2700. In at least one embodiment, GPC 2700 may be used to perform one or more neural network use cases described herein.

In at least one embodiment, such components can be used to manage communication links connecting processing devices. In at least one embodiment, this can include determining frequency states and power states for communication links between processors.

Figure 28:
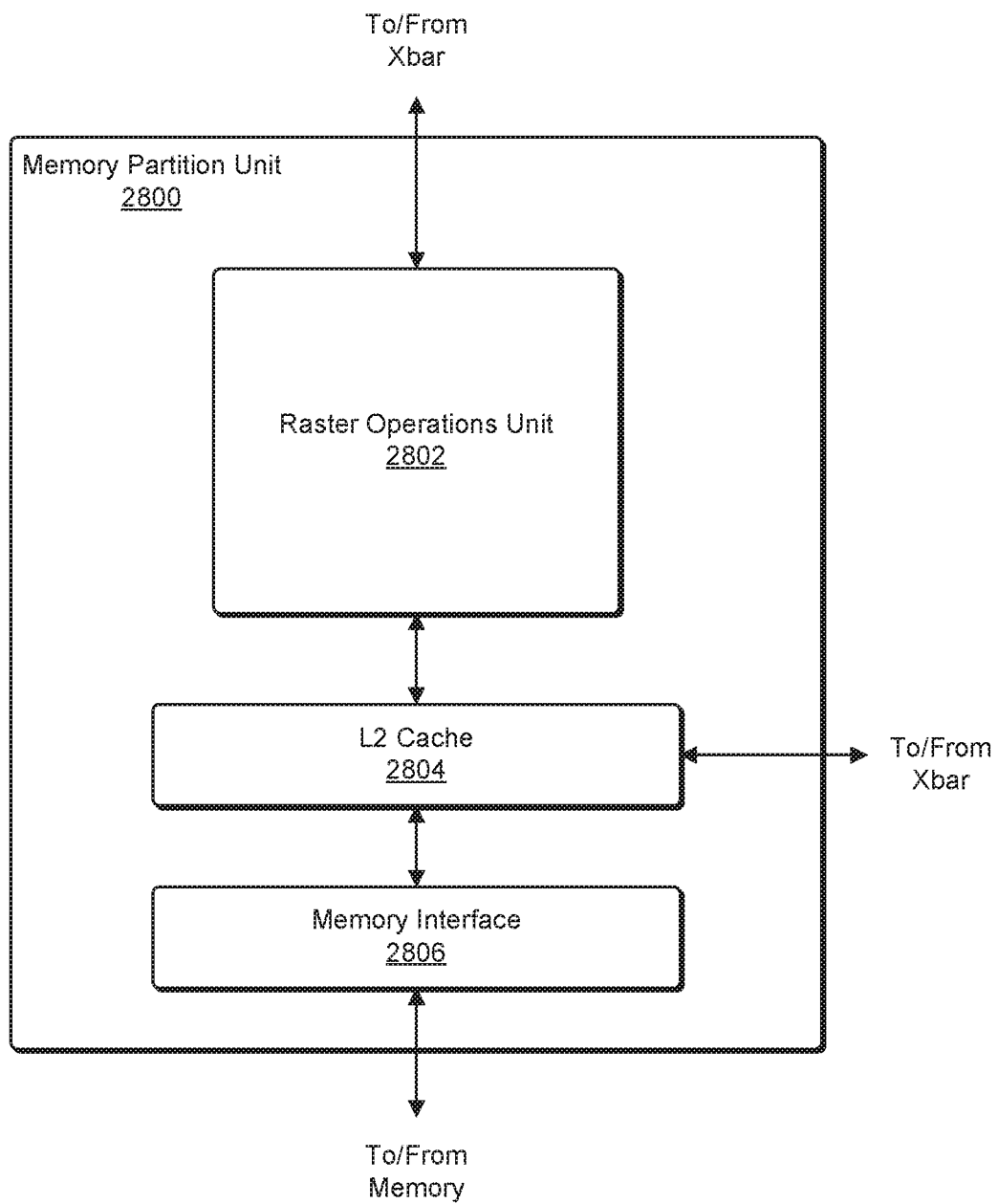
FIG. 28 illustrates a memory partition unit of a parallel processing unit ("PPU"), according to at least one embodiment.

FIG. 28 illustrates a memory partition unit 2800 of a parallel processing unit ("PPU"), in accordance with at least one embodiment. In at least one embodiment, memory partition unit 2800 includes, without limitation, a Raster Operations ("ROP") unit 2802; a level two ("L2") cache 2804; a memory interface 2806; and any suitable combination thereof. In at least one embodiment, memory interface 2806 is coupled to memory. In at least one embodiment, memory interface 2806 may implement 32, 64, 128, 1024-bit data buses, or similar implementations, for high-speed data transfer. In at least one embodiment, PPU incorporates U memory interfaces 2806, one memory interface 2806 per pair of partition units 2800, where each pair of partition units 2800 is connected to a corresponding memory device. For example, in at least one embodiment, PPU may be connected to up to Y memory devices, such as high bandwidth memory stacks or graphics double-data-rate, version 5, synchronous dynamic random a28ess memory ("GDDR5 SDRAM").

In at least one embodiment, memory interface 2806 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. In at least one embodiment, ECC provides higher reliability for compute applications that are sensitive to data corruption.

In at least one embodiment, PPU implements a multi-level memory hierarchy. In at least one embodiment, memory partition unit 2800 supports a unified memory to provide a single unified virtual address space for central processing unit ("CPU") and PPU memory, enabling data sharing between virtual memory systems. In at least one embodiment, frequency of accesses by a PPU to memory located on other processors is traced to ensure that memory pages are moved to physical memory of PPU that is accessing pages more frequently. In at least one embodiment, high-speed GPU interconnect 2608 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 2800 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 2604 of FIG. 26 or other system memory is fetched by memory partition unit 2800 and stored in L2 cache 2804, which is located on-chip and is shared between various GPCs, in accordance with at least one embodiment. Each memory partition unit 2800, in at least one embodiment, includes, without limitation, at least a portion of L2 cache associated with a corresponding memory device. In at least one embodiment, lower level caches are implemented in various units within GPCs. In at least one embodiment, each of SMs 2714 may implement a level one ("L1") cache wherein L1 cache is private memory that is dedicated to a particular SM 2714 and data from L2 cache 2804 is fetched and stored in each of L1 caches for processing in functional units of SMs 2714. In at least one embodiment, L2 cache 2804 is coupled to memory interface 2806 and XBar 2620.

ROP unit 2802 performs graphics raster operations related to pixel color, such as color compression, pixel blending, and more, in at least one embodiment. ROP unit 2802, in at least one embodiment, implements depth testing in conjunction with raster engine 2708, receiving a depth for a sample location associated with a pixel fragment from culling engine of raster engine 2708. In at least one embodiment, depth is tested against a corresponding depth in a depth buffer for a sample location associated with fragment. In at least one embodiment, if fragment passes depth test for sample location, then ROP unit 2802 updates depth buffer and transmits a result of depth test to raster engine 2708. It will be appreciated that number of partition units 2800 may be different than number of GPCs and, therefore, each ROP unit 2802 can, in at least one embodiment, be coupled to each of GPCs. In at least one embodiment, ROP unit 2802 tracks packets received from different GPCs and determines which that a result generated by ROP unit 2802 is routed to through XBar 2620.

Figure 29:
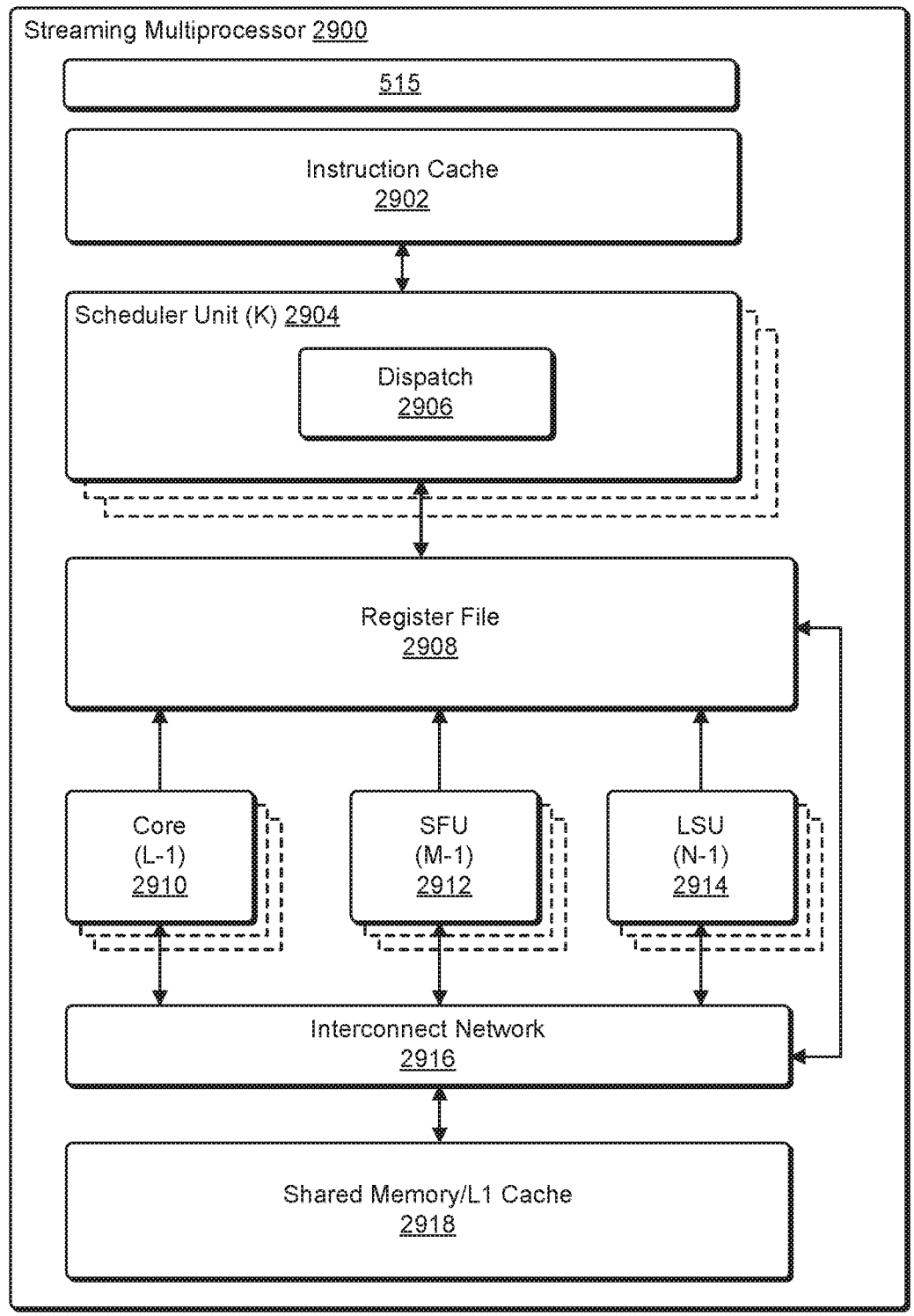
FIG. 29 illustrates a streaming multi-processor, according to at least one embodiment.

FIG. 29 illustrates a streaming multi-processor ("SM") 2900, according to at least one embodiment. In at least one embodiment, SM 2900 is SM 2714 of FIG. 27. In at least one embodiment, SM 2900 includes, without limitation, an instruction cache 2902; one or more scheduler units 2904; a register file 2908; one or more processing cores ("cores") 2910; one or more special function units ("SFUs") 2912; one or more load/store units ("LSUs") 2914; an interconnect network 2916; a shared memory/level one ("L1") cache 2918; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 2900. In at least one embodiment, scheduler unit 2904 receives tasks from work distribution unit and manages instruction scheduling for one or more thread blocks assigned to SM 2900. In at least one embodiment, scheduler unit 2904 schedules thread blocks for execution as warps of parallel threads, wherein each thread block is allocated at least one warp. In at least one embodiment, each warp executes threads. In at least one embodiment, scheduler unit 2904 manages a plurality of different thread blocks, allocating warps to different thread blocks and then dispatching instructions from plurality of different cooperative groups to various functional units (e.g., processing cores 2910, SFUs 2912, and LSUs 2914) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, In at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 2906 is configured to transmit instructions to one or more of functional units and scheduler unit 2904 includes, without limitation, two dispatch units 2906 that enable two different instructions from same warp to be dispatched during each clock cycle. In at least one embodiment, each scheduler unit 2904 includes a single dispatch unit 2906 or additional dispatch units 2906.

In at least one embodiment, each SM 2900, in at least one embodiment, includes, without limitation, register file 2908 that provides a set of registers for functional units of SM 2900. In at least one embodiment, register file 2908 is divided between each of functional units such that each functional unit is allocated a dedicated portion of register file 2908. In at least one embodiment, register file 2908 is divided between different warps being executed by SM 2900 and register file 2908 provides temporary storage for operands connected to data paths of functional units. In at least one embodiment, each SM 2900 comprises, without limitation, a plurality of L processing cores 2910. In at least one embodiment, SM 2900 includes, without limitation, a large number (e.g., 128 or more) of distinct processing cores 2910. In at least one embodiment, each processing core 2910, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 2910 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 2910. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 2900 comprises, without limitation, M SFUs 2912 that perform special functions (e.g., attribute evaluation, reciprocal square root, etc.). In at least one embodiment, SFUs 2912 include, without limitation, a tree traversal unit configured to traverse a hierarchical tree data structure. In at least one embodiment, SFUs 2912 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 2900. In at least one embodiment, texture maps are stored in shared memory/L1 cache 2918. In at least one embodiment, texture units implement texture operations such as filtering operations using mip-maps (e.g., texture maps of varying levels of detail), in accordance with at least one embodiment. In at least one embodiment, each SM 2900 includes, without limitation, two texture units.

Each SM 2900 comprises, without limitation, N LSUs 2914 that implement load and store operations between shared memory/L1 cache 2918 and register file 2908, in at least one embodiment. Each SM 2900 includes, without limitation, interconnect network 2916 that connects each of functional units to register file 2908 and LSU 2914 to register file 2908 and shared memory/L1 cache 2918 in at least one embodiment. In at least one embodiment, interconnect network 2916 is a crossbar that can be configured to connect any of functional units to any of registers in register file 2908 and connect LSUs 2914 to register file 2908 and memory locations in shared memory/L1 cache 2918.

In at least one embodiment, shared memory/L1 cache 2918 is an array of on-chip memory that allows for data storage and communication between SM 2900 and primitive engine and between threads in SM 2900, in at least one embodiment. In at least one embodiment, shared memory/L1 cache 2918 comprises, without limitation, 128 KB of storage capacity and is in path from SM 2900 to partition unit. In at least one embodiment, shared memory/L1 cache 2918, in at least one embodiment, is used to cache reads and writes. In at least one embodiment, one or more of shared memory/L1 cache 2918, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 2918 enables shared memory/L1 cache 2918 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 2900 to execute program and perform calculations, shared memory/L1 cache 2918 to communicate between threads, and LSU 2914 to read and write global memory through shared memory/L1 cache 2918 and memory partition unit. In at least one embodiment, when configured for general purpose parallel computation, SM 2900 writes commands that scheduler unit 2904 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. A graphics card may be configured to interface with a PCIe slot on a motherboard of a desktop computer. In at least one embodiment, PPU may be an integrated graphics processing unit ("iGPU") included in chipset of motherboard.

Inference and/or training logic 515 are used to perform inferencing and/or training operations associated with one or more embodiments. Details regarding inference and/or training logic 515 are provided below in conjunction with FIGS. 5A and/or 5B. In at least one embodiment, deep learning application processor is used to train a machine learning model, such as a neural network, to predict or infer information provided to SM 2900. In at least one embodiment, SM 2900 is used to infer or predict information based on a trained machine learning model (e.g., neural network) that has been trained by another processor or system or by SM 2900. In at least one embodiment, SM 2900 may be used to perform one or more neural network use cases described herein.

In at least one embodiment, such components can be used to manage communication links connecting processing devices. In at least one embodiment, this can include determining frequency states and power states for communication links between processors.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 904 and/or secondary storage. Computer programs, if executed by one or more processors, enable system 900 to perform various functions in accordance with at least one embodiment. In at least one embodiment, memory 904, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 902; parallel processing system 912; an integrated circuit capable of at least a portion of capabilities of both CPU 902; parallel processing system 912; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 900 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a handheld electronic device, a mobile phone device, a television, workstation, game consoles, embedded system, and/or any other type of logic.

In at least one embodiment, parallel processing system 912 includes, without limitation, a plurality of parallel processing units ("PPUs") 914 and associated memories 916. In at least one embodiment, PPUs 914 are connected to a host processor or other peripheral devices via an interconnect 918 and a switch 920 or multiplexer. In at least one embodiment, parallel processing system 912 distributes computational tasks across PPUs 914 which can be parallelizable—for example, as part of distribution of computational tasks across multiple graphics processing unit ("GPU") thread blocks. In at least one embodiment, memory is shared and accessible (e.g., for read and/or write access) across some or all of PPUs 914, although such shared memory may incur performance penalties relative to use of local memory and registers resident to a PPU 914. In at least one embodiment, operation of PPUs 914 is synchronized through use of a command such as _syncthreads( ) wherein all threads in a block (e.g., executed across multiple PPUs 914) to reach a certain point of execution of code before proceeding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system, comprising:
   at least three processors, wherein the at least three processors are to use one or more neural networks to predict traffic on one or more interconnects and to cause bandwidth of the one or more interconnects to be adjusted based, at least in part, on prior traffic associated with the one or more interconnects.

2. The system of claim 1, wherein the at least three processors include one or more graphics processing units (GPUs).

3. The system of claim 1, wherein the bandwidth of the one or more interconnects are to be further adjusted by the at least three processors based, at least in part, on performance metrics including instruction throughput, transfer frequency, byte throughput, data toggle patterns, operating frequency, operating voltage, memory bandwidth, streaming multiprocessor (SM) utilization, cache hit rates, or power values.

4. The system of claim 1,
   wherein the one or more neural networks are trained using graphics processing unit frequency information.

5. The system of claim 1, wherein to adjust includes one or more adjustments to operating frequencies of one or more graphics processing units and temporarily applying a turbo-boost or selecting a different frequency state.

6. The system of claim 1, wherein to adjust includes one or more dynamic voltage and frequency scaling (DVFS) adjustments determined using a binary algorithm or one or more other neural networks.

7. A method comprising:
   using one or more neural networks to predict traffic on one or more interconnects and to cause bandwidth of the one or more interconnects to be adjusted based, at least in part, on prior traffic associated with the one or more interconnects.

8. The method of claim 7, wherein the method comprises using at least three processors, wherein the at least three processors include graphics processing units (GPUs).

9. The method of claim 8, further comprising: receiving, via an application interface, information about anticipated performance of one or more processors.

10. The method of claim 7, wherein the bandwidth of the one or more interconnects are to be further adjusted based, at least in part, on performance metrics including instruction throughput, transfer frequency, byte throughput, data toggle patterns, operating frequency, operating voltage, memory bandwidth, streaming multiprocessor (SM) utilization, cache hit rates, or power values.

11. The method of claim 7, further comprising: adjusting operating frequencies of one or more processors by temporarily applying a turbo-boost or selecting a different frequency state.

12. The method of claim 7, wherein to be adjusted includes one or more dynamic voltage and frequency scaling (DVFS) adjustments determined by using a binary algorithm or one or more other neural networks.

13. A non-transitory machine-readable storage medium having stored thereon a set of instructions, which if performed by one or more processors, cause the one or more processors to at least:
use one or more neural networks to predict traffic on one or more interconnects and to cause bandwidth of the one or more interconnects to be adjusted based, at least in part, on prior traffic associated with the one or more interconnects.

14. The non-transitory machine-readable storage medium of claim 13, wherein the one or more processors include graphics processing units (GPUs).

15. The non-transitory machine-readable medium of claim 13, further comprising:
receiving, via an application interface, information about anticipated performance of the one or more processors.

16. The non-transitory machine-readable storage medium of claim 13, wherein to be adjusted includes adjusting one or more performance metrics including instruction throughput, transfer frequency, byte throughput, data toggle patterns, operating frequency, operating voltage, memory bandwidth, streaming multiprocessor (SM) utilization, cache hit rates, or power values.

17. The non-transitory machine-readable storage medium of claim 13, wherein the instructions when performed further cause the one or more processors to:
adjust operating frequencies of one or more graphics processing units by temporarily applying a turbo-boost or selecting a different frequency state.

18. The non-transitory machine-readable storage medium of claim 13, wherein to be adjusted includes applying one or more adjustments including one or more dynamic voltage and frequency scaling (DVFS) adjustments determined by using a binary algorithm or one or more other neural networks.

19. A processor comprising:
one or more circuits are to use one or more neural networks to predict traffic on one or more interconnects and to cause bandwidth of the one or more interconnects to be adjusted based, at least in part, on prior traffic associated with the one or more interconnects.

20. The processor of claim 19, wherein the processor includes graphics processing units (GPUs).

21. The processor of claim 19, further comprises one or more ALUs used to receive, as input, information about anticipated performance for determining adjustments to be made to operating frequencies of one or more processors.

22. The processor of claim 19, wherein to be adjusted includes to adjust one or more performance metrics including instruction throughput, transfer frequency, byte throughput, data toggle patterns, operating frequency, operating voltage, memory bandwidth, streaming multiprocessor (SM) utilization, cache hit rates, or power values.

23. The processor of claim 19, wherein to be adjusted includes adjust applying a turbo-boost, selecting a different frequency state, or adjusting one or more dynamic voltage and frequency scaling (DVFS) values.

* * * * *